US011898841B2

(12) United States Patent
Suzuki et al.

(10) Patent No.: US 11,898,841 B2
(45) Date of Patent: Feb. 13, 2024

(54) OPTICAL MODULE, SIGNAL PROCESSING SYSTEM, AND SIGNAL PROCESSING METHOD

(71) Applicant: HAMAMATSU PHOTONICS K.K., Hamamatsu (JP)

(72) Inventors: Tomofumi Suzuki, Hamamatsu (JP); Yuya Iwazaki, Hamamatsu (JP); Kyosuke Kotani, Hamamatsu (JP); Tatsuya Sugimoto, Hamamatsu (JP); Hiromichi Tozuka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 177 days.

(21) Appl. No.: 17/426,325

(22) PCT Filed: Jan. 17, 2020

(86) PCT No.: PCT/JP2020/001620
§ 371 (c)(1),
(2) Date: Jul. 28, 2021

(87) PCT Pub. No.: WO2020/158470
PCT Pub. Date: Aug. 6, 2020

(65) Prior Publication Data
US 2022/0099430 A1  Mar. 31, 2022

(30) Foreign Application Priority Data

Jan. 30, 2019 (JP) .................................. 2019-014080

(51) Int. Cl.
*G01B 9/02* (2022.01)
*G01B 9/02015* (2022.01)
*G01J 3/45* (2006.01)

(52) U.S. Cl.
CPC ............ *G01B 9/02015* (2013.01); *G01J 3/45* (2013.01)

(58) Field of Classification Search
CPC ... G01B 9/02015; G01B 9/02069; G01J 3/45; G01J 3/4535; G02B 26/0841
See application file for complete search history.

(56) References Cited

U.S. PATENT DOCUMENTS

| 5,923,422 A | 7/1999 | Keens et al. |
| 9,025,156 B2* | 5/2015 | Hirao .................... G01J 3/02 356/451 |

(Continued)

FOREIGN PATENT DOCUMENTS

| CN | 104145177 A | 11/2014 |
| CN | 107479182 A | 12/2017 |

(Continued)

OTHER PUBLICATIONS

Andreas Kenda, Christian Drabe, Harald Schenk, Albert Frank, Martin Lenzhofer, Werner Scherf, "Application of a micromachined translatory actuator to an optical FTIR spectrometer," Proc. SPIE 6186, MEMS, MOEMS, and Micromachining II, 618609 (Apr. 21, 2006); https://doi.org/10.1117/12.662008 (Year: 2006).*

(Continued)

*Primary Examiner* — Uzma Alam
*Assistant Examiner* — Jonathon Cook
(74) *Attorney, Agent, or Firm* — Faegre Drinker Biddle & Reath LLP

(57) ABSTRACT

A processer of an optical module is configured to control a voltage signal having a frequency for causing a movable mirror to resonate, and perform an intensity acquisition process. The intensity acquisition process is a process of acquiring a measurement light intensity of the interference light of the measurement light M times at a first time interval (Continued)

based on the frequency in each of a plurality of cycles among P cycles continuous in the voltage signal, acquiring an addition value of a plurality of the measurement light intensities mutually corresponding for the same number of times, acquiring a laser light intensity of the interference light of the laser light N times at a second time interval based on the frequency in each of the plurality of cycles, and acquiring an addition value of a plurality of the laser light intensities mutually corresponding for the same number of times.

14 Claims, 36 Drawing Sheets

(56) References Cited

U.S. PATENT DOCUMENTS

| | | | |
|---|---|---|---|
| 2002/0075483 A1* | 6/2002 | Harris, Jr. | G01J 3/45 |
| | | | 356/451 |
| 2018/0120156 A1* | 5/2018 | Suzuki | G01N 21/95 |
| 2019/0033136 A1* | 1/2019 | Warashina | G01J 3/02 |
| 2021/0132367 A1* | 5/2021 | Sugimoto | G01J 3/45 |
| 2021/0191106 A1* | 6/2021 | Sugimoto | H02N 1/008 |

FOREIGN PATENT DOCUMENTS

| | | |
|---|---|---|
| JP | 2013-250127 A | 12/2013 |
| JP | 2017-138390 A | 8/2017 |
| JP | 2018-165775 A | 10/2018 |
| WO | WO 2012/124294 A1 | 9/2012 |
| WO | WO-2012/140980 A1 | 10/2012 |
| WO | WO-2014/112027 A1 | 7/2014 |
| WO | WO 2014/199888 A1 | 12/2014 |
| WO | WO-2018/168929 A1 | 9/2018 |
| WO | WO-2019/009391 A1 | 1/2019 |
| WO | WO-2019/009396 A1 | 1/2019 |
| WO | WO-2019/009398 A1 | 1/2019 |
| WO | WO-2019/009400 A1 | 1/2019 |

OTHER PUBLICATIONS

International Preliminary Report on Patentability dated Aug. 12, 2021 for PCT/JP2020/001620.

Anonymous, "FTIR Engine Technical Note", Retrieved from the Internet: URL: https://www.hamamatsu.com/content/dam/hamamatsu-photonics/sites/documents/99_SALES_LIBRARY/ssd/ftir_engine_kacc9012e.pdf [retrieved on Oct. 11, 2022], May 2, 2021, p. 1-p. 15, XP055970037.

* cited by examiner

Fig.27
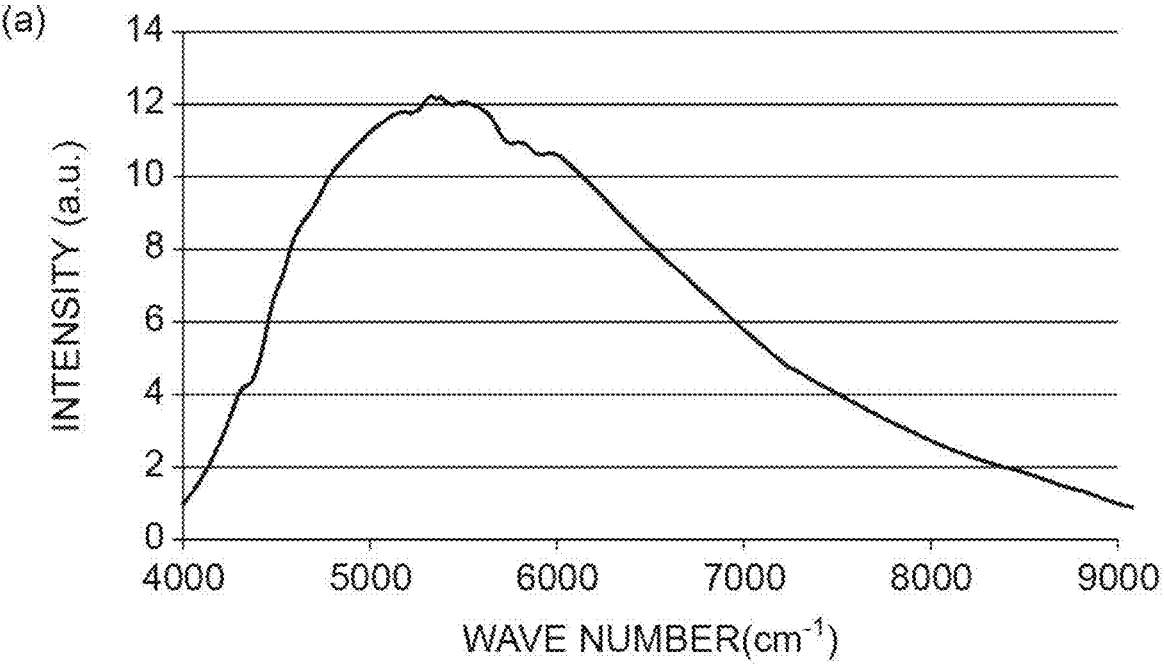
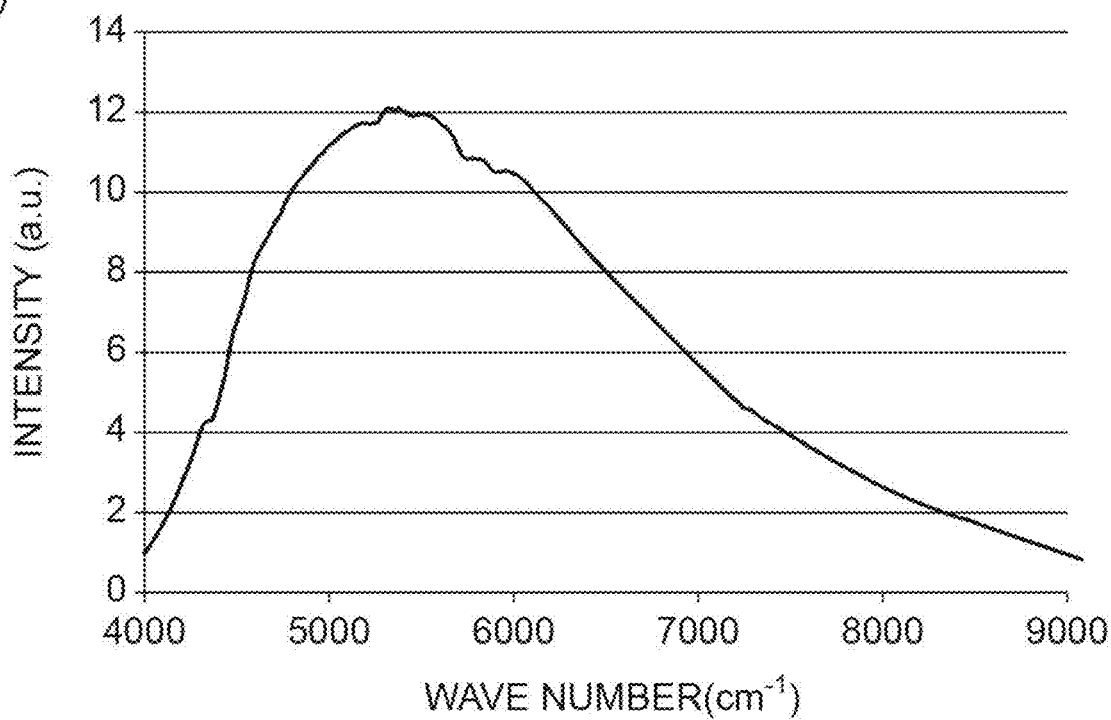

OPTICAL MODULE, SIGNAL PROCESSING SYSTEM, AND SIGNAL PROCESSING METHOD

TECHNICAL FIELD

The present disclosure relates to an optical module, a signal processing system, and a signal processing method.

BACKGROUND ART

As a signal processing method for Fourier transformation type spectral analysis, Patent Literature 1 discloses a method in which a plurality of pieces of measurement data are acquired from a signal representing the intensity of interference light of light to be measured which is generated by an interference system at timing at which a signal representing the intensity of interference light of monochromatic light generated by the interference system intersects a reference voltage, and a plurality of interferograms in accordance with the plurality of pieces of measurement data are integrated while performing alignment at a center burst position.

CITATION LIST

Patent Literature

Patent Literature 1: Japanese Unexamined Patent Publication No. 2013-250127

SUMMARY OF INVENTION

Technical Problem

In the signal processing method described in Patent Literature 1, since it is necessary to perform the alignment at the center burst position to integrate the plurality of interferograms, it is difficult to perform Fourier transformation type spectral analysis in a short time.

An object of the present disclosure is to provide an optical module, a signal processing system, and a signal processing method which enable Fourier transformation type spectral analysis to be performed in a short time.

Solution to Problem

An optical module according to an aspect of the present disclosure includes: a mirror device that includes a base, a movable mirror including a mirror surface, an elastic support portion that is connected between the base and the movable mirror and supports the movable mirror so that the movable mirror is movable along a direction intersecting the mirror surface, a first comb electrode that is provided in the base and includes a plurality of first comb fingers, and a second comb electrode that is provided in at least one of the movable mirror and the elastic support portion and includes a plurality of second comb fingers arranged alternately with the plurality of first comb fingers; at least one fixed mirror; at least one beam splitter that constitutes an interference optical system in combination with the movable mirror and the at least one fixed mirror; a first light detector that detects interference light of measurement light emitted from the interference optical system; a second light detector that detects interference light of laser light emitted from the interference optical system; and a signal processing unit that is electrically connected to each of the mirror device, the first light detector, and the second light detector. The signal processing unit includes a voltage signal control unit that controls a voltage signal having a frequency for causing the movable mirror to resonate in the mirror device, so that the voltage signal is applied between the first comb electrode and the second comb electrode, and an intensity acquisition unit that performs an intensity acquisition process of acquiring a measurement light intensity of the interference light of the measurement light M times (M is an integer of two or greater) at a first time interval based on the frequency in each of a plurality of cycles among P cycles (P is an integer of two or greater) continuous in the voltage signal, acquiring an addition value of a plurality of the measurement light intensities mutually corresponding for the same number of times, acquiring a laser light intensity of the interference light of the laser light N times (N is an integer of two or greater) at a second time interval based on the frequency in each of the plurality of cycles, and acquiring an addition value of a plurality of the laser light intensities mutually corresponding for the same number of times.

In the optical module, a voltage signal is controlled so that a voltage signal having a frequency for causing the movable mirror to resonate in the mirror device is applied between the first comb electrode and the second comb electrode. The frequency of the voltage signal ideally becomes a value two times a resonance frequency of the movable mirror. Accordingly, when acquiring the measurement light intensity of the interference light of the measurement light M times at the first time interval based on the frequency of the voltage signal in each of a plurality of cycles among P cycles continuous in the voltage signal, and acquiring the addition value of the plurality of measurement light intensities mutually corresponding for the same number of times, the addition value of the measurement light intensities can be easily and accurately acquired for every same position in a case where the movable mirror moves. Similarly, when acquiring the laser light intensity of the interference light of the laser light N times at the second time interval based on the frequency of the voltage signal in each of the plurality of cycles, and acquiring the addition value of the plurality of laser light intensities mutually corresponding for the same number of times, the addition value of the laser light intensities can be easily and accurately acquired for every same position in a case where the movable mirror moves. Accordingly, the optical module enables Fourier transformation type spectral analysis to be performed in a short time.

In the optical module according to the aspect of the present disclosure, the intensity acquisition unit may perform at least one of a first intensity acquisition process and a second intensity acquisition process as the intensity acquisition process, the first intensity acquisition process may be a process of acquiring a first measurement light intensity the M times at the first time interval in each of odd-numbered cycles among P cycles (P is an integer of four or greater) continuous in the voltage signal as the measurement light intensity, acquiring an addition value of a plurality of the first measurement light intensities mutually corresponding for the same number of times, acquiring a first laser light intensity the N times at the second time interval in each of the odd-numbered cycles as the laser light intensity, and acquiring an addition value of a plurality of the first laser light intensities mutually corresponding for the same number of times, and the second intensity acquisition process may be a process of acquiring a second measurement light intensity the M times at the first time interval in each of even-numbered cycles among the P cycles (P is an integer of four or greater) as the measurement light intensity, acquiring an addition value of a plurality of the second measurement light intensities mutually corresponding for the same number of times, acquiring a second laser light intensity the N times at the second time interval in each of the even-numbered cycles as the laser light intensity, and acquiring an addition value of a plurality of the second laser light intensities mutually corresponding for the same number of times. According to this, when acquiring the first measurement light intensity M times at the first time interval in each of odd-numbered cycles among P cycles continuous in the voltage signal as the measurement light intensity, and acquiring the addition value of the plurality of first measurement light intensities mutually corresponding for the same number of times, the addition value of the first measurement light intensities can be easily and accurately acquired for every same position in a case where the movable mirror moves in one direction of reciprocation directions. Similarly, when acquiring the first laser light intensity N times at the second time interval in each of the odd-numbered cycles as the laser light intensity, and acquiring the addition value of the plurality of first laser light intensities mutually corresponding for the same number of times, the addition value of the first laser light intensities can be easily and accurately acquired for every same position in a case where the movable mirror moves in the one direction of the reciprocation directions. In addition, when acquiring the second measurement light intensity M times at the first time interval in each of even-numbered cycles among the P cycles continuous in the voltage signal as the measurement light intensity, and acquiring an addition value of a plurality of the second measurement light intensities mutually corresponding for the same number of times, the addition value of the second measurement light intensities can be easily and accurately acquired for every same position in a case where the movable mirror moves in the other direction of the reciprocation directions. Similarly, when acquiring the second laser light intensity N times at the second time interval in each of the even-numbered cycles as the laser light intensity, and acquiring the addition value of the plurality of second laser light intensities mutually corresponding for the same number of times, the addition value of the second laser light intensities can be easily and accurately acquired for every same position in a case where the movable mirror moves in the other direction of the reciprocation directions. Accordingly, the optical module enables more accurate Fourier transformation type spectral analysis to be performed in a short time.

The optical module according to the aspect of the present disclosure may further include a storage unit that includes at least one of a first storage region and a second storage region. The first storage region may be a region that stores values obtained by integrating or averaging each of the first measurement light intensity and the first laser light intensity acquired in each of the odd-numbered cycles for every one cycle in a case where the first intensity acquisition process is performed, and the second storage region may be a region that stores values obtained by integrating or averaging each of the second measurement light intensity and the second laser light intensity acquired in each of the even-numbered cycles for every one cycle in a case where the second intensity acquisition process is performed. According to this, the first intensity acquisition process and the second intensity acquisition process can be reliably performed while suppressing storage capacity of the storage unit.

In the optical module according to the aspect of the present disclosure, the storage unit may further include a third storage region, and the third storage region may be a region that stores each of the first measurement light intensity and the first laser light intensity acquired in the latest one cycle among the P cycles (P is an integer of four or greater) until transmitting the first measurement light intensity and the first laser light intensity to the first storage region in a case where the first intensity acquisition process is performed, and stores each of the second measurement light intensity and the second laser light intensity acquired in the latest one cycle among the P cycles (P is an integer of four or greater) until transmitting the second measurement light intensity and the second laser light intensity to the second storage region in a case where the second intensity acquisition process is performed. According to this, it is possible to confirm whether or not each piece of intensity data is correct during temporarily storing each piece of intensity data in the third storage region.

In the optical module according to the aspect of the present disclosure, a zero optical path difference position of the movable mirror, at which an optical path length on the movable mirror side with which the interference light of the measurement light is caused to occur becomes the same as an optical path length on the at least one fixed mirror side with which the interference light of the measurement light is caused to occur, may deviate from a central position of the resonance operation of the movable mirror, and the intensity acquisition unit may perform a process of acquiring the addition value of the plurality of first measurement light intensities mutually corresponding for the same number of times, and acquiring the addition value of the plurality of first laser light intensities mutually corresponding for the same number of times as the first intensity acquisition process in a first half or a second half in each of the odd-numbered cycles, and may perform a process of acquiring the addition value of the plurality of second measurement light intensities mutually corresponding for the same number of times, and acquiring the addition value of the plurality of second laser light intensities mutually corresponding for the same number of times as the second intensity acquisition process in a first half or a second half in each of the even-numbered cycles. According to this, a signal to noise ratio (SNR) can be improved by lowering resolution of each piece of intensity data.

In the optical module according to the aspect of the present disclosure, the first time interval and the second time interval may be the same time interval. According to this, the first intensity acquisition process and the second intensity acquisition process can be more easily performed.

In the optical module according to the aspect of the present disclosure, the voltage signal control unit may adjust the frequency of the voltage signal on the basis of a temporal variation of capacitance which occurs between the first comb electrode and the second comb electrode. According to this, for example, even though a resonance frequency of the movable mirror varies due to a variation in a use environment, the frequency of the voltage signal can be adjusted to be a value two times the resonance frequency of the movable mirror, and as a result, the first intensity acquisition process and the second intensity acquisition process can be more accurately performed.

A signal processing system according to another aspect of the present disclosure includes: an optical module; and a signal processing device that is electrically connected to the optical module. The optical module includes a mirror device that includes a base, a movable mirror including a mirror surface, an elastic support portion that is connected between the base and the movable mirror and supports the movable mirror so that the movable mirror is movable along a direction intersecting the mirror surface, a first comb electrode that is provided in the base and includes a plurality of first comb fingers, and a second comb electrode that is provided in at least one of the movable mirror and the elastic support portion and includes a plurality of second comb fingers arranged alternately with the plurality of first comb fingers, at least one fixed mirror, at least one beam splitter that constitutes an interference optical system in combination with the movable mirror and the at least one fixed mirror, a first light detector that detects interference light of measurement light emitted from the interference optical system, a second light detector that detects interference light of laser light emitted from the interference optical system. The signal processing device includes a voltage signal control unit that controls a voltage signal having a frequency for causing the movable mirror to resonate in the mirror device, so that the voltage signal is applied between the first comb electrode and the second comb electrode, and an intensity acquisition unit that performs an intensity acquisition process of acquiring a measurement light intensity of the interference light of the measurement light M times (M is an integer of two or greater) at a first time interval based on the frequency in each of a plurality of cycles among P cycles (P is an integer of two or greater) continuous in the voltage signal, acquiring an addition value of a plurality of the measurement light intensities mutually corresponding for the same number of times, acquiring a laser light intensity of the interference light of the laser light N times (N is an integer of two or greater) at a second time interval based on the frequency in each of the plurality of cycles, and acquiring an addition value of a plurality of the laser light intensities mutually corresponding for the same number of times.

In the signal processing system, the same signal processing is performed as in the optical module. Accordingly, the signal processing system enables the Fourier transformation type spectral analysis to be performed in a short time.

A signal processing method according to still another aspect of the present disclosure is carried out to detect interference light of measurement light emitted from an interference optical system and interference light of laser light emitted from the interference optical system, the interference optical system being constituted by a mirror device that includes a base, a movable mirror including a mirror surface, an elastic support portion that is connected between the base and the movable mirror and supports the movable mirror so that the movable mirror is movable along a direction intersecting the mirror surface, a first comb electrode that is provided in the base and includes a plurality of first comb fingers, and a second comb electrode that is provided in at least one of the movable mirror and the elastic support portion and includes a plurality of second comb fingers arranged alternately with the plurality of first comb fingers, at least one fixed mirror, at least one beam splitter. The signal processing method includes: a step of controlling a voltage signal having a frequency for causing the movable mirror to resonate in the mirror device, so that the voltage signal is applied between the first comb electrode and the second comb electrode; and a step of performing an intensity acquisition process of acquiring a measurement light intensity of the interference light of the measurement light M times (M is an integer of two or greater) at a first time interval based on the frequency in each of a plurality of cycles among P cycles (P is an integer of two or greater) continuous in the voltage signal, acquiring an addition value of a plurality of the measurement light intensities mutually corresponding for the same number of times, acquiring a laser light intensity of the interference light of the laser light N times (N is an integer of two or greater) at a second time interval based on the frequency in each of the plurality of cycles, and acquiring an addition value of a plurality of the laser light intensities mutually corresponding for the same number of times.

In the signal processing method, the same signal processing is performed as in the optical module. Accordingly, the signal processing method enables the Fourier transformation type spectral analysis to be performed in a short time.

In the signal processing method according to the aspect of the present disclosure, in the step of performing the intensity acquisition process, at least one of a first intensity acquisition process and a second intensity acquisition process may be performed as the intensity acquisition process, the first intensity acquisition process may be a process of acquiring a first measurement light intensity the M times at the first time interval in each of odd-numbered cycles among P cycles (P is an integer of four or greater) continuous in the voltage signal as the measurement light intensity, acquiring an addition value of a plurality of the first measurement light intensities mutually corresponding for the same number of times, acquiring a first laser light intensity the N times at the second time interval in each of the odd-numbered cycles as the laser light intensity, and acquiring an addition value of a plurality of the first laser light intensities mutually corresponding for the same number of times, and the second intensity acquisition process may be a process of acquiring a second measurement light intensity the M times at the first time interval in each of even-numbered cycles among the P cycles (P is an integer of four or greater) as the measurement light intensity, acquiring an addition value of a plurality of the second measurement light intensities mutually corresponding for the same number of times, acquiring a second laser light intensity the N times at the second time interval in each of the even-numbered cycles as the laser light intensity, and acquiring an addition value of a plurality of the second laser light intensities mutually corresponding for the same number of times. According to this, the addition value of the first measurement light intensities can be easily and accurately acquired for every same position in a case where the movable mirror moves in one direction of the reciprocation directions. Similarly, the addition value of the first laser light intensities can be easily and accurately acquired for every same position in a case where the movable mirror moves in the one direction of the reciprocation directions. In addition, the addition value of the second measurement light intensities can be easily and accurately acquired for every same position in a case where the movable mirror moves in the other direction of the reciprocation directions. Similarly, the addition value of the second laser light intensities can be easily and accurately acquired for every same position in a case where the movable mirror moves in the other direction of the reciprocation directions. Accordingly, this signal processing method enables more accurate Fourier transformation type spectral analysis to be performed in a short time.

In the signal processing method according to the aspect of the present disclosure, a zero optical path difference position of the movable mirror, at which an optical path length on the movable mirror side with which the interference light of the measurement light is caused to occur becomes the same as an optical path length on the at least one fixed mirror side with which the interference light of the measurement light is caused to occur, may deviate from a central position of the resonance operation of the movable mirror, and in the step of performing the intensity acquisition process, a process of acquiring the addition value of the plurality of first measurement light intensities mutually corresponding for the same number of times, and acquiring the addition value of the plurality of first laser light intensities mutually corresponding for the same number of times may be performed as the first intensity acquisition process in a first half or a second half in each of the odd-numbered cycles, and a process of acquiring the addition value of the plurality of second measurement light intensities mutually corresponding for the same number of times, and acquiring the addition value of the plurality of second laser light intensities mutually corresponding for the same number of times may be performed as the second intensity acquisition process in a first half or a second half in each of the even-numbered cycles. According to this, the SNR can be improved by lowering resolution of each piece of intensity data.

In the signal processing method according to the aspect of the present disclosure, the first time interval and the second time interval may be the same time interval. According to this, the first intensity acquisition process and the second intensity acquisition process can be more easily performed.

In the signal processing method according to the aspect of the present disclosure, in the step of controlling the voltage signal, the frequency of the voltage signal may be adjusted on the basis of a temporal variation of capacitance which occurs between the first comb electrode and the second comb electrode. According to this, for example, even though a resonance frequency of the movable mirror varies due to a variation in a use environment, the frequency of the voltage signal can be adjusted to be a value two times the resonance frequency of the movable mirror, and as a result, the first intensity acquisition process and the second intensity acquisition process can be more accurately performed.

The signal processing method according to the aspect of the present disclosure may further include a step of performing a spectrum acquisition process of acquiring an intensity value from a temporal variation of the addition value of the measurement light intensity at timing at which at least one of a maximum value and a minimum value appears in a temporal variation of the addition values of the laser light intensity, acquiring a relationship between an optical path difference and the intensity value on the basis of the wavelength of the laser light, and acquiring a spectrum of the measurement light by Fourier transformation. According to this, a spectrum of the measurement light can be easily and accurately acquired. That is, the Fourier transformation type spectral analysis relating to the measurement light can be easily and accurately performed.

Advantageous Effects of Invention

According to the present disclosure, it is possible to provide an optical module, a signal processing system, and a signal processing method which enable Fourier transformation type spectral analysis to be performed in a short time.

BRIEF DESCRIPTION OF DRAWINGS

FIG. 27 is a graph illustrating a spectrum of the measurement light.

DESCRIPTION OF EMBODIMENTS

Figure 1:
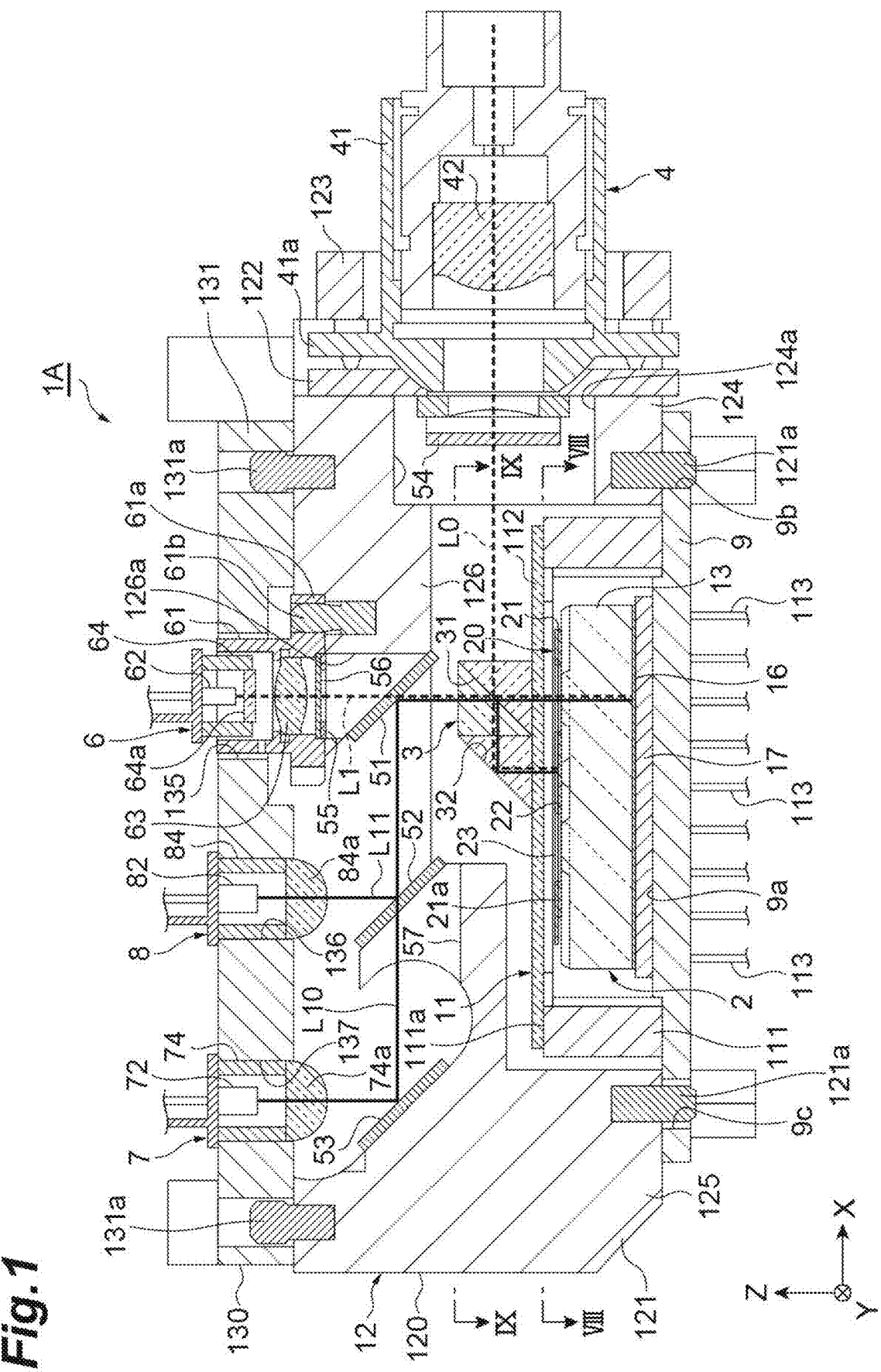
FIG. 1 is a cross-sectional view of an optical module of an embodiment.

Hereinafter, embodiments of the present disclosure will be described in detail with reference to the accompanying drawings. Note that, the same reference numeral will be given to the same or equivalent portion in the drawings, and redundant description thereof will be omitted.

[Configuration of Optical Module]

As illustrated in FIG. 1, an optical module 1A includes a mirror unit 2, a beam splitter unit 3, a light incident unit 4, a first light detector 6, a second light source 7, a second light detector 8, a support 9, a first support structure 11, and a second support structure 12. The mirror unit 2 is disposed on one side of the support 9 in a Z-axis direction (a first direction), and is attached to the support 9, for example, by an adhesive. For example, the support 9 is formed of copper tungsten, and has a rectangular plate shape. The mirror unit 2 includes a movable mirror 22 that moves along the Z-axis direction, and a fixed mirror 16 of which a position is fixed (details thereof will be described later). Note that, for example, the Z-axis direction is a vertical direction, and the one side in the Z-axis direction is an upper side.

The beam splitter unit 3 is disposed on one side of the mirror unit 2 in the Z-axis direction, and is supported by the first support structure 11. For example, the first support structure 11 is attached to the support 9 by an adhesive. The light incident unit 4 is disposed on one side of the beam splitter unit 3 in an X-axis direction (a second direction intersecting the first direction), and is supported by the second support structure 12. The first light detector 6, the second light source 7, and the second light detector 8 are disposed on one side of the beam splitter unit 3 in the Z-axis direction, and are supported by the second support structure 12. For example, the second support structure 12 is attached to the support 9 by a bolt.

In the optical module 1A, an interference optical system is constituted by the beam splitter unit 3, the movable mirror 22, and the fixed mirror 16 with respect to each of measurement light L0 and laser light L10. The interference optical system which is constituted with respect to each of the measurement light L0 and the laser light L10 is, for example, a Michelson interference optical system.

With regard to the measurement light L0, interference light L1 of measurement light is detected as follows. That is, when the measurement light L0 that is incident from a first light source (not illustrated) through a measurement target (not illustrated) or the measurement light L0 that is generated from the measurement target (for example, light emitted from the measurement target itself, or the like) is incident to the beam splitter unit 3 from the light incident unit 4, the measurement light L0 is divided into a part and the remainder in the beam splitter unit 3. Then, the part of the measurement light L0 is reflected by the movable mirror 22 that reciprocates in the Z-axis direction, and returns to the beam splitter unit 3. On the other hand, the remainder of the measurement light L0 is reflected by the fixed mirror 16 and returns to the beam splitter unit 3. The part and the remainder of the measurement light L0, which return to the beam splitter unit 3, are emitted from the beam splitter unit 3 as the interference light L1, and the interference light L1 of the measurement light is detected by the first light detector 6.

With regard to the laser light L10, interference light L11 of laser light is detected as follows. That is, when the laser light L10 emitted from the second light source 7 is incident to the beam splitter unit 3, the laser light L10 is divided into a part and the remainder in the beam splitter unit 3. Then, the part of the laser light L10 is reflected by the movable mirror 22 that reciprocates in the Z-axis direction, and returns to the beam splitter unit 3. On the other hand, the remainder of the laser light L10 is reflected by the fixed mirror 16 and returns to the beam splitter unit 3. The part and the remainder of the laser light L10, which return to the beam splitter unit 3, are emitted from the beam splitter unit 3 as the interference light L11, and the interference light L11 of the laser light is detected by the second light detector 8.

According to the optical module 1A, measurement of a position of the movable mirror 22 in the Z-axis direction can be measured based on a detection result of the interference light L11 of the laser light, and spectral analysis with respect to the measurement target can be performed based on a measurement result of the position, and a detection result of the interference light L1 of the measurement light.

[Configuration of Mirror Unit]

Figure 2:
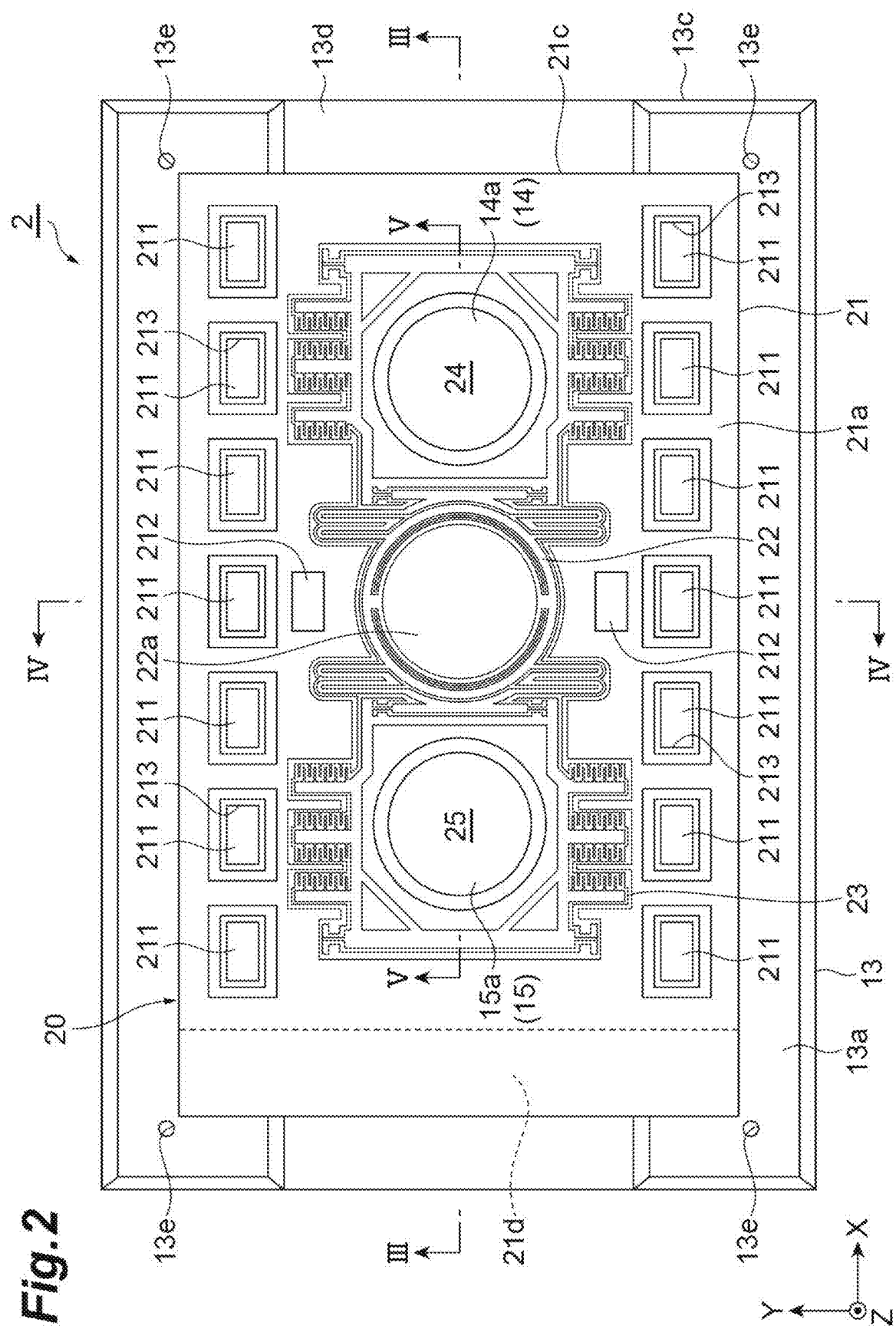
FIG. 2 is a plan view of a mirror unit illustrate in FIG. 1.
Figure 3:
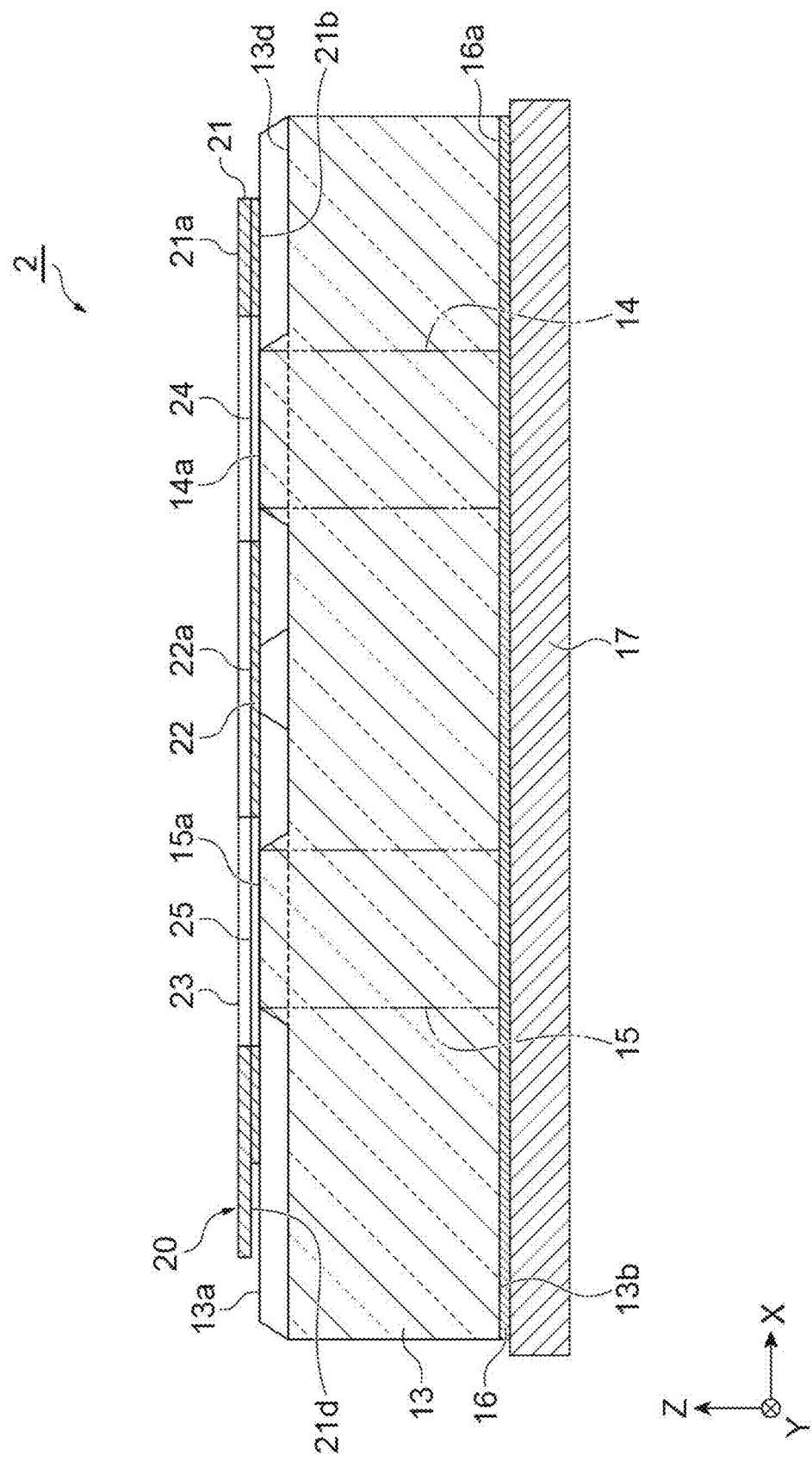
FIG. 3 is a cross-sectional view of the mirror unit along line III-III in FIG. 2.
Figure 4:
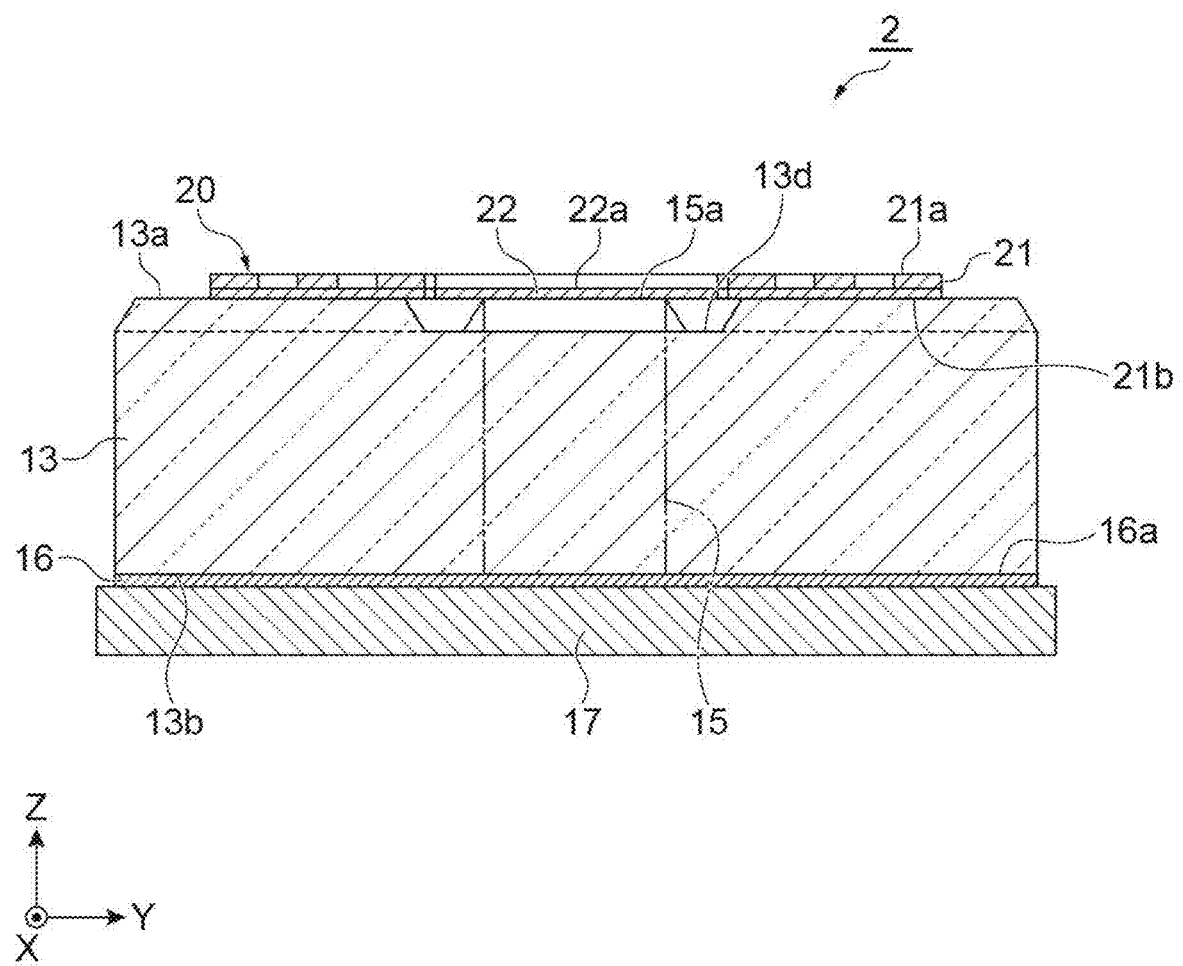
FIG. 4 is a cross-sectional view of the mirror unit along line IV-IV in FIG. 2.

As illustrated in FIG. 2, FIG. 3, and FIG. 4, the mirror unit 2 includes a mirror device 20, an optical function member 13, a fixed mirror 16, and a stress mitigation substrate 17. The mirror device 20 includes a base 21, a movable mirror 22, and a drive unit 23.

The base 21 includes a first surface 21a (surface on one side in the Z-axis direction), and a second surface 21b opposite to the first surface 21a. Each of the first surface 21a and the second surface 21b is a main surface of the base 21. For example, the base 21 has a rectangular plate shape, and a size of approximately 10 mm×15 mm×0.35 mm (thickness). The movable mirror 22 includes a mirror surface 22a and a movable unit 22b in which a mirror surface 22a is provided. The movable mirror 22 is supported in the base 21 to be movable along the Z-axis direction (the first direction interesting the first surface) perpendicular to the first surface 21a. The drive unit 23 is configured to move the movable mirror 22 along the Z-axis direction.

The mirror device 20 is provided with a pair of light passage portions 24 and 25. The pair of light passage portions 24 and 25 are respectively disposed on both sides of the movable mirror 22 in the X-axis direction. The light passage portion 24 constitutes a first portion of an optical path between the beam splitter unit 3 and the fixed mirror 16. Note that, in this embodiment, the light passage portion 25 does not function as a light passage portion.

Figure 5:
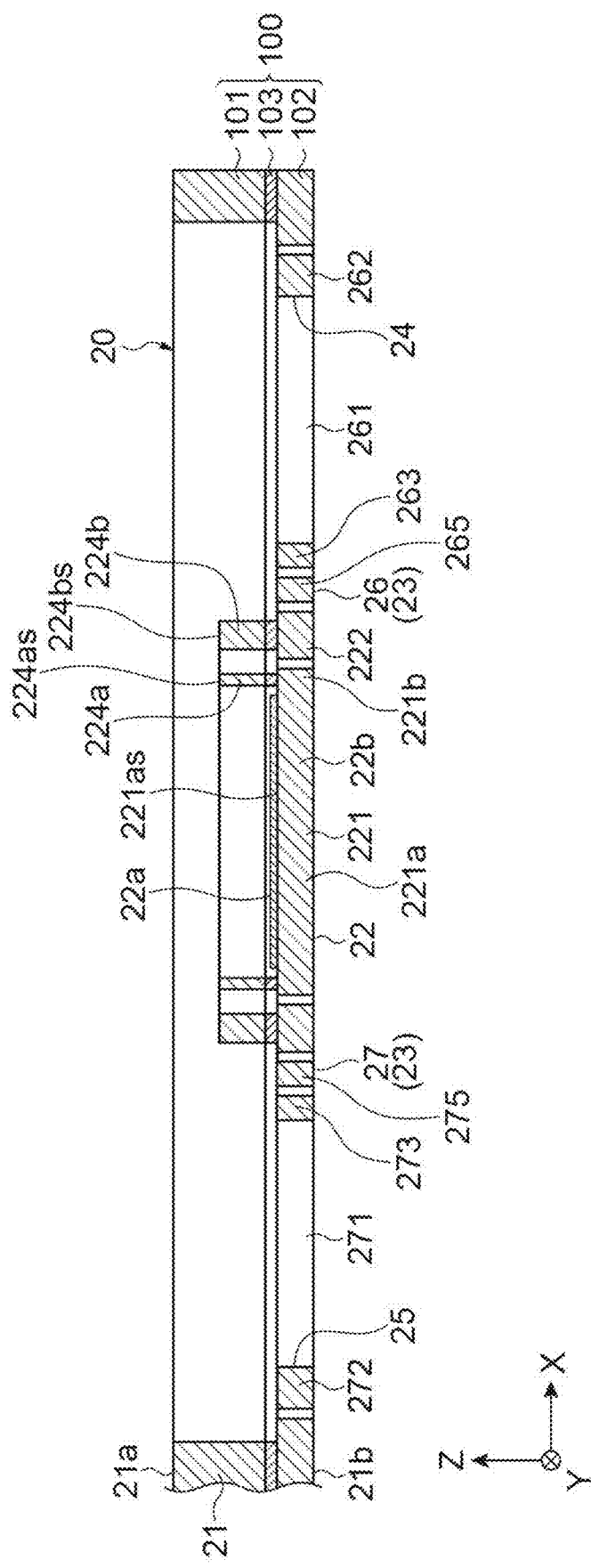
FIG. 5 is a schematic cross-sectional view of the mirror device along line V-V in FIG. 2.
Figure 6:
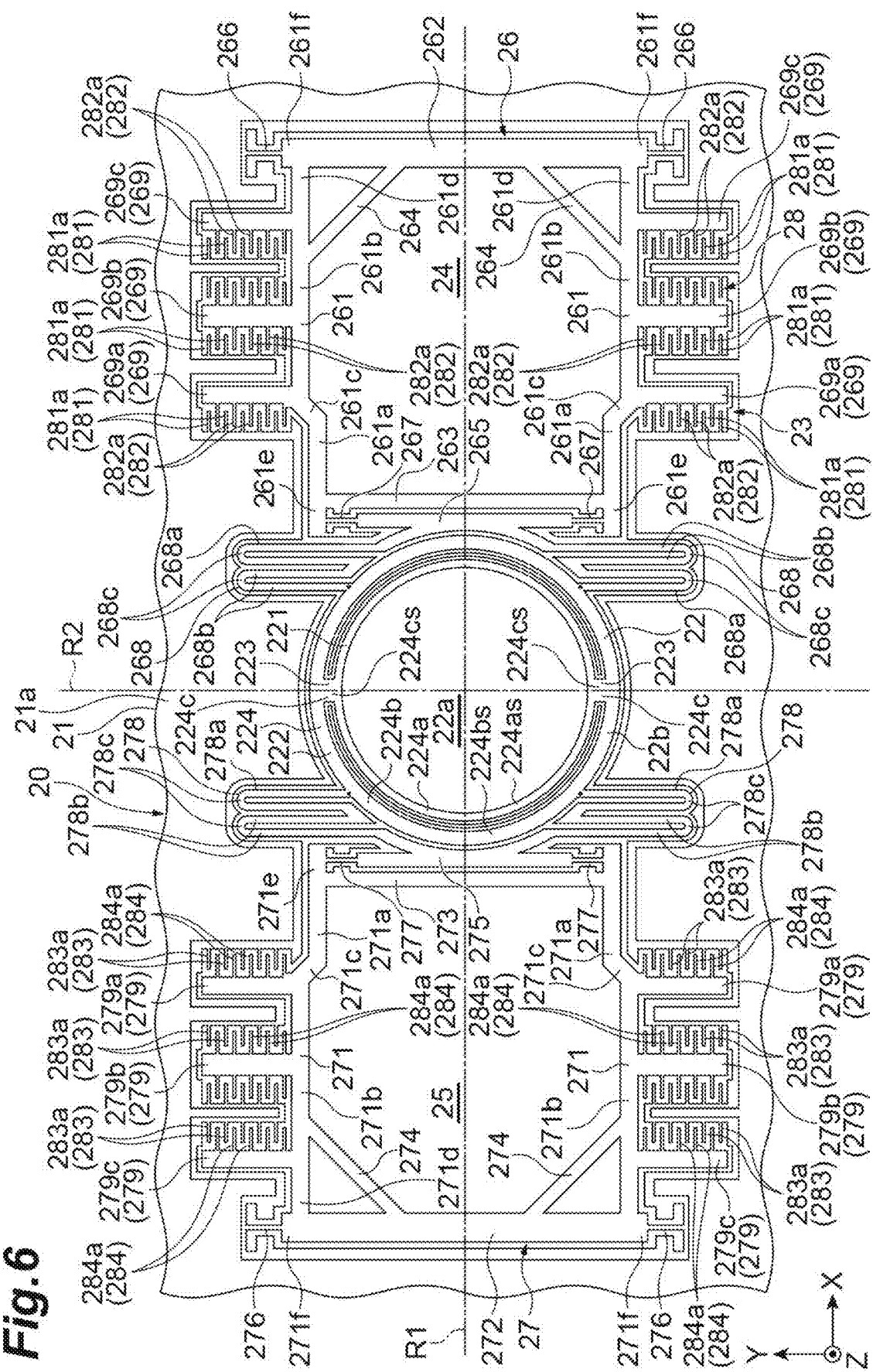
FIG. 6 is a partially enlarged view of the mirror device illustrated in FIG. 2.
Figure 7:
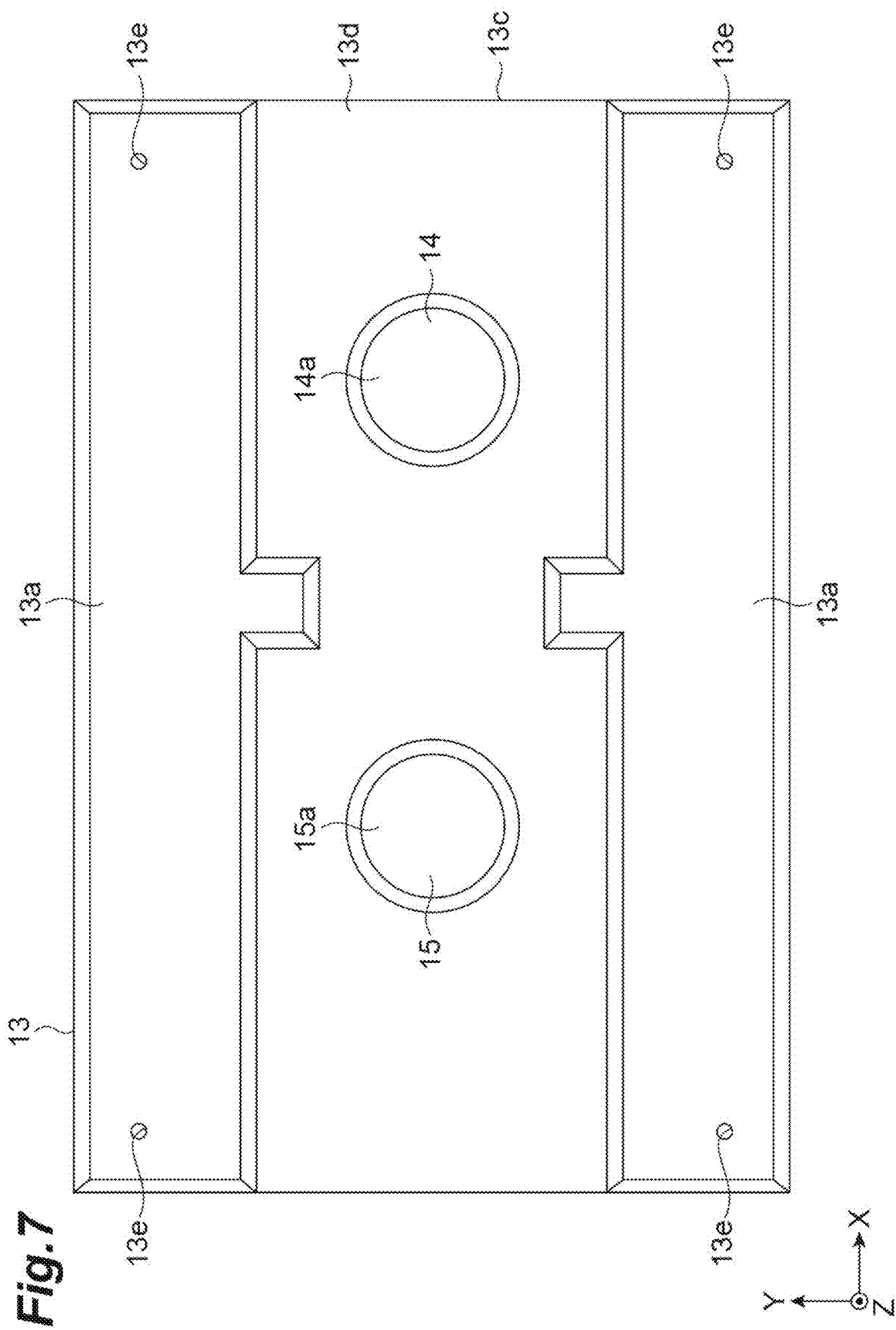
FIG. 7 is a plan view of an optical function member illustrated in FIG. 2.

Here, a configuration of the mirror device 20 will be described in detail with reference to FIG. 2, FIG. 5, and FIG.

6. Note that, FIG. 5 is a schematic cross-sectional view of the mirror device 20 illustrated in FIG. 3, and FIG. 5 schematically illustrates the mirror device 20, for example, in a state in which dimensions in the Z-axis direction are enlarged in comparison to actual dimensions.

The base 21, the movable unit 22b of the movable mirror 22, and the drive unit 23 are constituted by a silicon on insulator (SOI) substrate (semiconductor substrate) 100. That is, the mirror device 20 is a micro electro mechanical systems (MEMS) device constituted by the SOI substrate 100. For example, the mirror device 20 is formed in a rectangular plate shape. The SOI substrate 100 includes a support layer 101, a device layer 102, and an intermediate layer 103. The support layer 101 is a first silicon layer (a first semiconductor layer). The device layer 102 is a second silicon layer (a second semiconductor layer). The intermediate layer 103 is an insulating layer that is disposed between the support layer 101 and the device layer 102. The SOI substrate 100 includes the support layer 101, the intermediate layer 103, and the device layer 102 in this order from the one side in the Z-axis direction.

The base 21 is constituted by a part of the support layer 101, the device layer 102, and the intermediate layer 103. The first surface 21a of the base 21 is a surface of the support layer 101 which is opposite to the intermediate layer 103. The second surface 21b of the base 21 is a surface of the device layer 102 which is opposite to the intermediate layer 103. The support layer 101 that constitutes the base 21 is thicker than the device layer 102 that constitutes the base 21. For example, the thickness of the support layer 101 that constitutes the base 21 is approximately four times the thickness of the device layer 102 that constitutes the base 21. As will be described later, in the mirror unit 2, the second surface 21b of the base 21 and a third surface 13a of the optical function member 13 are joined to each other (refer to FIG. 3 and FIG. 4).

The movable mirror 22 is disposed in a state in which an intersection between an axial line R1 and an axial line R2 is set as the central position (gravity center position). The axial line R1 is a straight line that extends in the X-axis direction. The axial line R2 is a straight line that extends in a Y-axis direction. When viewed from the Z-axis direction, in the mirror device 20, a portion other than a portion that overlaps a sixth surface 21d of the base 21 to be described later has a shape that is linearly symmetric to each of the axial line R1 and the axial line R2.

The movable mirror 22 (movable unit 22b) includes an arrangement portion 221, a frame portion 222, a pair of connection portions 223, and a beam portion 224. The arrangement portion 221, the frame portion 222, and the pair of connection portions 223 are constituted by a part of the device layer 102. The arrangement portion 221 has a circular shape when viewed from the Z-axis direction. The arrangement portion 221 includes a central portion 221a and an edge portion 221b. For example, the mirror surface 22a is provided on a surface 221as of the central portion 221a on the one side in the Z-axis direction by forming a metal film (metal layer) thereon. The mirror surface 22a extends perpendicular to the Z-axis direction, and has a circular shape. The surface 221as of the central portion 221a is a surface on the intermediate layer 103 side in the device layer 102. The mirror surface 22a is located on the other side in the Z-axis direction in comparison to the first surface 21a of the base 21. In other words, the first surface 21a is located on the one side in the Z-axis direction in comparison to the mirror surface 22a. The edge portion 221b surrounds the central portion 221a when viewed from the Z-axis direction.

The frame portion 222 extends in an annular shape to surround the arrangement portion 221 with a predetermined gap from the arrangement portion 221 when viewed from the Z-axis direction. For example, the frame portion 222 has a circular ring shape when viewed from the Z-axis direction. Each of the pair of connection portions 223 connects the arrangement portion 221 and the frame portion 222 to each other. The pair of connection portions 223 are respectively disposed on both sides of the arrangement portion 221 in the Y-axis direction.

The beam portion 224 is constituted by the support layer 101 and the intermediate layer 103 which are disposed on the device layer 102. The beam portion 224 includes an inner beam portion 224a, an outer beam portion 224b, and a pair of connection beam portions 224c. The inner beam portion 224a is disposed on a surface of the edge portion 221b on the one side in the Z-axis direction. The inner beam portion 224a surrounds the mirror surface 22a when viewed from the Z-axis direction. For example, an outer edge of the inner beam portion 224a extends along an outer edge of the arrangement portion 221 with a predetermined gap from the outer edge of the arrangement portion 221 when viewed from the Z-axis direction. An inner edge of the inner beam portion 224a extends along an outer edge of the mirror surface 22a with a predetermined gap from the outer edge of the mirror surface 22a when viewed from the Z-axis direction. An end surface 224as of the inner beam portion 224a on the one side in the Z-axis direction is located on the one side in the Z-axis direction in comparison to the mirror surface 22a.

The outer beam portion 224b is disposed on a surface of the frame portion 222 on the one side in the Z-axis direction. The outer beam portion 224b surrounds the inner beam portion 224a and the mirror surface 22a when viewed from the Z-axis direction. For example, an outer edge of the outer beam portion 224b extends along an outer edge of the frame portion 222 with a predetermined gap from the outer edge of the frame portion 222 when viewed from the Z-axis direction. An inner edge of the outer beam portion 224b extends along an inner edge of the frame portion 222 with a predetermined gap from the inner edge of the frame portion 222 when viewed from the Z-axis direction. An end surface 224bs of the outer beam portion 224b on the one side in the Z-axis direction is located on the one side in the Z-axis direction in comparison to the mirror surface 22a.

The pair of connection beam portions 224c are respectively disposed on surfaces of the pair of connection portions 223 on the one side in the Z-axis direction. The connection beam portions 224c connect the inner beam portion 224a and the outer beam portion 224b to each other. End surfaces 224cs of the connection beam portions 224c on the one side in the Z-axis direction are located on the one side in the Z-axis direction in comparison to the mirror surface 22a.

The thickness of the inner beam portion 224a, the thickness of the outer beam portion 224b, and the thickness of the respective connection beam portions 224c in the Z-axis direction are the same as each other. That is, the thickness of the support layer 101 that constitutes the inner beam portion 224a, the outer beam portion 224b, and the respective connection beam portions 224c is the same in each case. The end surface 224as of the inner beam portion 224a, the end surface 224bs of the outer beam portion 224b, and the end surfaces 224cs of the respective connection beam portions 224c are located on the same plane perpendicular to the Z-axis direction. The support layer 101 that constitutes the inner beam portion 224a, the outer beam portion 224b, and the respective connection beam portions 224c is thinner than the support layer 101 that constitutes the base 21. Accordingly, the end surfaces 224as, 224bs, and 224cs are located on the one side in the Z-axis direction in comparison to the first surface 21a of the base 21. In other words, the first surface 21a is located on the other side in the Z-axis direction in comparison to the end surfaces 224as, 224bs, and 224cs.

When viewed from the Z-axis direction, a width of the outer beam portion 224b is wider than a width of the inner beam portion 224a. The width of the inner beam portion 224a when viewed from the Z-axis direction is a length of the inner beam portion 224a in a direction perpendicular to the extending direction of the inner beam portion 224a, and is a length of the inner beam portion 224a in a radial direction of the inner beam portion 224a in this embodiment. This is also true of a width of the outer beam portion 224b when viewed from the Z-axis direction. A width of each of the connection beam portions 224c is wider than the width of each of the inner beam portion 224a and the outer beam portion 224b. The width of each of the connection beam portion 224c is a length of each of the connection beam portion 224c along the extending direction of the inner beam portion 224a.

The drive unit 23 includes a first elastic support portion (elastic support portion) 26, a second elastic support portion (elastic support portion) 27, and an actuator unit 28. The first elastic support portion 26, the second elastic support portion 27, and the actuator unit 28 are constituted by a part of the device layer 102.

Each of the first elastic support portion 26 and the second elastic support portion 27 is connected between the base 21 and the movable mirror 22. The first elastic support portion 26 and the second elastic support portion 27 support the movable mirror 22 so that the movable mirror 22 (movable unit 22b) is movable in the Z-axis direction (direction intersecting the mirror surface 22a).

The first elastic support portion 26 includes a pair of levers 261, a first link member 262, a second link member 263, a pair of beam members 264, an intermediate member 265, a pair of first torsion bars (first torsion support portions) 266, a pair of second torsion bars (second torsion support portions) 267, a pair of non-linearity mitigation springs 268, and a plurality of electrode support portions 269.

The pair of levers 261 are respectively disposed on both sides of the light passage portion 24 in the Y-axis direction, and face each other in the Y-axis direction. Each of the levers 261 has a plate shape that extends along a plane perpendicular to the Z-axis direction. The lever 261 includes a first portion 261a, a second portion 261b that is disposed on a side opposite to the movable mirror 22 with respect to the first portion 261a, and a third portion 261c that is connected to the first portion 261a and the second portion 261b. The first portion 261a and the second portion 261b extend in the X-axis direction. A length of the first portion 261a in the X-axis direction is shorter than a length of the second portion 261b in the X-axis direction. The third portions 261c of the pair of levers 261 obliquely extend to be spaced away from each other as going away from the movable mirror 22.

The first link member 262 bridges first ends 261d of the pair of levers 261 on a side opposite to the movable mirror 22. The first link member 262 has a plate shape that extends along a plane perpendicular to the Z-axis direction, and extends in the Y-axis direction. The second link member 263 bridges second ends 261e of the pair of levers 261 on the movable mirror 22 side. The second link member 263 has a plate shape that extends along a plane perpendicular to the Z-axis direction, and extends in the Y-axis direction. A width of the second link member 263 in the X-axis direction is narrower than a width of the first link member 262 in the X-axis direction. A length of the second link member 263 in the Y-axis direction is shorter than a length of the first link member 262 in the Y-axis direction.

The pair of beam members 264 respectively bridge the second portions 261b of the pair of levers 261 and the first link member 262. The respective beam members 264 have a plate shape that extends along a plane perpendicular to the Z-axis direction. The pair of beam members 264 obliquely extend to approach each other as going away from the movable mirror 22. The pair of levers 261, the first link member 262, the second link member 263, and the pair of beam members 264 define the light passage portion 24. The light passage portion 24 has a polygonal shape when viewed from the Z-axis direction. For example, the light passage portion 24 is a cavity (hole). Alternatively, a material having optical transparency with respect to the measurement light L0 and the laser light L10 may be disposed in the light passage portion 24.

The intermediate member 265 has a plate shape that extends along a plane perpendicular to the Z-axis direction, and extends in the Y-axis direction. The intermediate member 265 is disposed between the movable mirror 22 and the second link member 263 (in other words, between the movable mirror 22 and the light passage portion 24). The intermediate member 265 is connected to the movable mirror 22 through the non-linearity mitigation springs 268 as to be described later.

The pair of first torsion bars 266 respectively bridge the first end 261d of one lever 261 and the base 21, and the first end 261d of the other lever 261 and the base 21. That is, the pair of first torsion bars 266 are respectively connected between the pair of levers 261 and the base 21. The first torsion bars 266 extend in the Y-axis direction. The pair of first torsion bars 266 are disposed on the same central line parallel to the Y-axis direction. In this embodiment, the central line of the first torsion bars 266 and the central line of the first link member 262 are located on the same straight line. A protrusion 261f that protrudes outward in the Y-axis direction is provided in each of the first ends 261d of the levers 261, and each of the first torsion bars 266 is connected to the protrusion 261f.

The pair of second torsion bars 267 respectively bridge the second end 261e of one lever 261 and one end of the intermediate member 265, and the second end 261e of the other lever 261 and the other end of the intermediate member 265. That is, the pair of second torsion bars 267 are respectively connected between the pair of levers 261 and the movable mirror 22. The respective second torsion bars 267 extend in the Y-axis direction. The pair of second torsion bars 267 are disposed on the same central line parallel to the Y-axis direction.

The pair of non-linearity mitigation springs 268 are connected between the movable mirror 22 and the intermediate member 265. That is, the pair of non-linearity mitigation springs 268 are connected between the movable mirror 22 and the second torsion bar 267. Each of the non-linearity mitigation springs 268 includes a meandering portion 268a that extends in a meandering manner when viewed from the Z-axis direction. The meandering portion 268a includes a plurality of straight portions 268b which extend in the Y-axis direction and are aligned in the X-axis direction, and a plurality of folded portions 268c which alternately connect both ends of the plurality of straight portions 268b. One end of the meandering portion 268a is connected to the intermediate member 265, and the other end of the meandering portion 268a is connected to the frame portion 222. In the meandering portion 268a, a portion on the frame portion 222 side has a shape along the outer edge of the frame portion 222.

The non-linearity mitigation spring 268 is constituted as follows. In a state in which the movable mirror 22 has moved in the Z-axis direction, the amount of deformation of the non-linearity mitigation spring 268 around the Y-axis direction becomes smaller than the amount of deformation of each of the first torsion bar 266 and the second torsion bar 267 around the Y-axis direction, and the amount of deformation of the non-linearity mitigation spring 268 in the X-axis direction becomes larger than the amount of deformation of each of the first torsion bar 266 and the second torsion bar 267 in the X-axis direction. Accordingly, it is possible to suppress occurrence of non-linearity in twist deformation of the first torsion bar 266 and the second torsion bar 267, and it is possible to suppress deterioration of control characteristics of the movable mirror 22 due to the non-linearity. Note that, the amount of deformation of the first torsion bar 266, the second torsion bar 267, and the non-linearity mitigation spring 268 around the Y-axis direction represents, for example, an absolute value of a twist amount (twist angle). The amount of deformation of the first torsion bar 266, the second torsion bar 267, and the non-linearity mitigation spring 268 in the X-axis direction represents, for example, an absolute value of a deflection amount. The amount of deformation of a member around the Y-axis direction represents the amount of deformation of the member in a peripheral direction of a circle of which the center is set to an axial line that passes through the center of the member and is parallel to the Y-axis. This is also true of first torsion bars 276, second torsion bars 277, and a non-linearity mitigation spring 278 to be described later.

The plurality of electrode support portions 269 include a pair of first electrode support portions 269a, a pair of second electrode support portions 269b, and a pair of third electrode support portions 269c. Each of the electrode support portions 269a, 269b, and 269c has a plate shape that extends along a plane perpendicular to the Z-axis direction, and extends in the Y-axis direction. Each of the electrode support portions 269a, 269b, and 269c extends from the second portion 261b of the lever 261 toward a side opposite to the light passage portion 24. The pair of first electrode support portions 269a are disposed on the same central line parallel to the Y-axis direction. The pair of second electrode support portions 269b are disposed on the same central line parallel to the Y-axis direction. The pair of third electrode support portions 269c are disposed on the same central line parallel to the Y-axis direction. In the X-axis direction, the first electrode support portions 269a, the second electrode support portions 269b, and the third electrode support portions 269c are aligned in this order from the movable mirror 22 side.

The second elastic support portion 27 includes a pair of levers 271, a first link member 272, a second link member 273, a pair of beam members 274, an intermediate member 275, a pair of first torsion bars (first torsion support portions) 276, a pair of second torsion bars (second torsion support portions) 277, a pair of non-linearity mitigation springs 278, and a plurality of electrode support portions 279.

The pair of levers 271 are respectively disposed on both sides of the light passage portion 25 in the Y-axis direction, and face each other in the Y-axis direction. Each of the levers 271 has a plate shape that extends along a plane perpendicular to the Z-axis direction. The lever 271 includes a first portion 271a, a second portion 271b that is disposed on a side opposite to the movable mirror 22 with respect to the first portion 271a, and a third portion 271c that is connected to the first portion 271a and the second portion 271b. The first portion 271a and the second portion 271b extend in the X-axis direction. A length of the first portion 271a in the X-axis direction is shorter than a length of the second portion 271b in the X-axis direction. The third portions 271c of the pair of levers 271 obliquely extend to be spaced away from each other as going away from the movable mirror 22.

The first link member 272 bridges first ends 271d of the pair of levers 271 on a side opposite to the movable mirror 22. The first link member 272 has a plate shape that extends along a plane perpendicular to the Z-axis direction, and extends in the Y-axis direction. The second link member 273 bridges second ends 271e of the pair of levers 271 on the movable mirror 22 side. The second link member 273 has a plate shape that extends along a plane perpendicular to the Z-axis direction, and extends in the Y-axis direction. A width of the second link member 273 in the X-axis direction is narrower than a width of the first link member 272 in the X-axis direction. A length of the second link member 273 in the Y-axis direction is shorter than a length of the first link member 272 in the Y-axis direction.

The pair of beam members 274 respectively bridge the second portions 271b of the pair of levers 271 and the first link member 272. The respective beam members 274 have a plate shape that extends along a plane perpendicular to the Z-axis direction. The pair of beam members 274 obliquely extend to approach each other as going away from the movable mirror 22. The pair of levers 271, the first link member 272, the second link member 273, and the pair of beam members 274 define the light passage portion 25. The light passage portion 25 has a polygonal shape when viewed from the Z-axis direction. For example, the light passage portion 25 is a cavity (hole). Alternatively, a material having optical transparency with respect to the measurement light L0 and the laser light L10 may be disposed in the light passage portion 25.

The intermediate member 275 has a plate shape that extends along a plane perpendicular to the Z-axis direction, and extends in the Y-axis direction. The intermediate member 275 is disposed between the movable mirror 22 and the second link member 273 (in other words, between the movable mirror 22 and the light passage portion 25). The intermediate member 275 is connected to the movable mirror 22 through the non-linearity mitigation springs 278 as to be described later.

The pair of first torsion bars 276 respectively bridge the first end 271d of one lever 271 and the base 21, and the first end 271d of the other lever 271 and the base 21. That is, the pair of first torsion bars 276 are respectively connected between the pair of levers 271 and the base 21. The first torsion bars 276 extend in the Y-axis direction. The pair of first torsion bars 276 are disposed on the same central line parallel to the Y-axis direction. In this embodiment, the central line of the first torsion bars 276 and the central line of the first link member 272 are located on the same straight line. A protrusion 271f that protrudes outward in the Y-axis direction is provided in each of the first ends 271d of the levers 271, and each of the first torsion bars 276 is connected to the protrusion 271f.

The pair of second torsion bars 277 respectively bridge the second end 271e of one lever 271 and one end of the intermediate member 275, and the second end 271e of the other lever 271 and the other end of the intermediate member 275. That is, the pair of second torsion bars 277 are respectively connected between the pair of levers 271 and the movable mirror 22. The respective second torsion bars 277 extend in the Y-axis direction. The pair of second torsion bars 277 are disposed on the same central line parallel to the Y-axis direction.

The pair of non-linearity mitigation springs 278 are connected between the movable mirror 22 and the intermediate member 275. That is, the pair of non-linearity mitigation springs 278 are connected between the movable mirror 22 and the second torsion bar 277. Each of the non-linearity mitigation springs 278 includes a meandering portion 278a that extends in a meandering manner when viewed from the Z-axis direction. The meandering portion 278a includes a plurality of straight portions 278b which extend in the Y-axis direction and are aligned in the X-axis direction, and a plurality of folded portions 278c which alternately connect both ends of the plurality of straight portions 278b. One end of the meandering portion 278a is connected to the intermediate member 275, and the other end of the meandering portion 278a is connected to the frame portion 222. In the meandering portion 278a, a portion on the frame portion 222 side has a shape along the outer edge of the frame portion 222.

The non-linearity mitigation spring 278 is constituted as follows. In a state in which the movable mirror 22 has moved in the Z-axis direction, the amount of deformation of the non-linearity mitigation spring 278 around the Y-axis direction becomes smaller than the amount of deformation of each of the first torsion bar 276 and the second torsion bar 277 around the Y-axis direction, and the amount of deformation of the non-linearity mitigation spring 278 in the X-axis direction becomes larger than the amount of deformation of each of the first torsion bar 276 and the second torsion bar 277 in the X-axis direction. Accordingly, it is possible to suppress occurrence of non-linearity in twist deformation of the first torsion bar 276 and the second torsion bar 277, and it is possible to suppress deterioration of control characteristics of the movable mirror 22 due to the non-linearity.

The plurality of electrode support portions 279 include a pair of first electrode support portions 279a, a pair of second electrode support portions 279b, and a pair of third electrode support portions 279c. Each of the electrode support portions 279a, 279b, and 279c has a plate shape that extends along a plane perpendicular to the Z-axis direction, and extends in the Y-axis direction. Each of the electrode support portions 279a, 279b, and 279c extends from the second portion 271b of the lever 271 toward a side opposite to the light passage portion 25. The pair of first electrode support portions 279a are disposed on the same central line parallel to the Y-axis direction. The pair of second electrode support portions 279b are disposed on the same central line parallel to the Y-axis direction. The pair of third electrode support portions 279c are disposed on the same central line parallel to the Y-axis direction. In the X-axis direction, the first electrode support portions 279a, the second electrode support portions 279b, and the third electrode support portions 279c are aligned in this order from the movable mirror 22 side.

The actuator unit 28 moves the movable mirror 22 in the Z-axis direction. The actuator unit 28 includes a fixed comb electrode (first comb electrode) 281, a movable comb electrode (second comb electrode) 282, a fixed comb electrode (first comb electrode) 283, and a movable comb electrode (second comb electrode) 284. Positions of the fixed comb electrodes 281 and 283 are fixed. The movable comb electrodes 282 and 284 move in accordance with movement of the movable mirror 22.

The fixed comb electrode 281 is provided on a part of a surface, which faces the electrode support portions 269, of the device layer 102 of the base 21. The fixed comb electrode 281 includes a plurality of fixed comb fingers (first comb fingers) 281a which extend along a plane perpendicular to the Y-axis direction. The fixed comb fingers 281a are aligned in the Y-axis direction with a predetermined gap therebetween.

The movable comb electrode 282 is provided on a surface of each of the first electrode support portions 269a on the movable mirror 22 side, on surfaces of each of the second electrode support portions 269b on both sides in the X-axis direction, and on a surface of each of the third electrode support portion 269c on the movable mirror 22 side. The movable comb electrode 282 includes a plurality of movable comb fingers (second comb fingers) 282a which extend along a plane perpendicular to the Y-axis direction. The movable comb fingers 282a are aligned in the Y-axis direction with a predetermined gap therebetween.

In the fixed comb electrode 281 and the movable comb electrode 282, the plurality of fixed comb fingers 281a and the plurality of movable comb fingers 282a are alternately arranged. That is, each of the fixed comb fingers 281a of the fixed comb electrode 281 is located between the movable comb fingers 282a of the movable comb electrode 282. The fixed comb fingers 281a and the movable comb fingers 282a, which are adjacent to each other, face each other in the Y-axis direction. A distance between the fixed comb finger 281a and the movable comb finger 282a, which are adjacent to each other, is approximately several μm.

The fixed comb electrode 283 is provided on a part of a surface, which faces the electrode support portions 279, of the device layer 102 of the base 21. The fixed comb electrode 283 includes a plurality of fixed comb fingers (first comb fingers) 283a which extend along a plane perpendicular to the Y-axis direction. The fixed comb fingers 283a are aligned in the Y-axis direction with a predetermined gap therebetween.

The movable comb electrode 284 is provided on a surface of each of the first electrode support portion 279a on the movable mirror 22 side, on surfaces of each of the second electrode support portions 279b on both sides in the X-axis direction, and on a surface of each of the third electrode support portion 279c on the movable mirror 22 side. The movable comb electrode 284 includes a plurality of movable comb fingers (second comb fingers) 284a which extend along a plane perpendicular to the Y-axis direction. The movable comb fingers 284a are aligned in the Y-axis direction with a predetermined gap therebetween.

In the fixed comb electrode 283 and the movable comb electrode 284, the plurality of fixed comb fingers 283a and the plurality of movable comb fingers 284a are alternately arranged. That is, each of the fixed comb fingers 283a of the fixed comb electrode 283 is located between the movable comb fingers 284a of the movable comb electrode 284. The fixed comb fingers 283a and the movable comb fingers 284a, which are adjacent to each other, face each other in the Y-axis direction. For example, a distance between the fixed comb finger 283a and the movable comb finger 284a, which are adjacent to each other, is approximately several μm.

The base 21 is provided with a plurality of electrode pads 211. Each of the electrode pads 211 is disposed on a surface of the device layer 102 in an opening 213 formed in the first surface 21a of the base 21 up to the device layer 102. Several electrode pads among the plurality of electrode pads 211 are electrically connected to the fixed comb electrode 281 or the fixed comb electrode 283 through the device layer 102.

Other several electrode pads of the plurality of electrode pads 211 are electrically connected to the movable comb electrode 282 or the movable comb electrode 284 through the first elastic support portion 26 or the second elastic support portion 27. In addition, the base 21 is provided with a pair of electrode pads 212 capable of being used as a ground electrode. The pair of electrode pads 212 are disposed on the first surface 21a to be located on both sides of the movable mirror 22 in the Y-axis direction.

In the mirror device 20 configured as described above, an electric signal for moving the movable mirror 22 along the Z-axis direction is input to the drive unit 23 through a lead pin 113 and a wire (not illustrated) to be described later. Accordingly, for example, an electrostatic force is generated between the fixed comb electrode 281 and the movable comb electrode 282 which face each other, and between the fixed comb electrode 283 and the movable comb electrode 284 which face each other so that the movable mirror 22 moves to one side in the Z-axis direction. At this time, first torsion bars 266 and 276 and second torsion bars 267 and 277 in the first elastic support portion 26 and the second elastic support portion 27 are twisted, and an elastic force is generated in the first elastic support portion 26 and the second elastic support portion 27. In the mirror device 20, when a periodic electric signal is applied to the drive unit 23, it is possible to reciprocate the movable mirror 22 in the Z-axis direction at a resonance frequency level. In this manner, the drive unit 23 functions as an electrostatic actuator.

As illustrated in FIG. 2, FIG. 3, FIG. 4, and FIG. 7, the optical function member 13 includes the third surface 13a (surface on one side in the Z-axis direction) facing the second surface 21b of the base 21, and a fourth surface 13b on a side opposite to the third surface 13a. When viewed from the Z-axis direction, an outer edge 13c of the optical function member 13 is located on an outer side of an outer edge 21c of the base 21. That is, when viewed from the Z-axis direction, the outer edge 13c of the optical function member 13 surrounds the outer edge 21c of the base 21. The optical function member 13 is integrally formed by a material having optical transparency with respect to the measurement light L0 and the laser light L10. For example, the optical function member 13 is formed of glass in a rectangular plate shape, and has a size of approximately 15 mm×20 mm×4 mm (thickness). Note that, the material of the optical function member 13 is selected in accordance with a sensitivity wavelength of the optical module 1A. For example, glass is selected in a case where the sensitivity wavelength of the optical module 1A is a near infrared region, and silicon is selected in a case where the sensitivity wavelength of the optical module 1A is a middle infrared region.

The optical function member 13 is provided with a pair of light transmitting portions 14 and 15. In the optical function member 13, the light transmitting portion 14 is a portion that faces the light passage portion 24 of the mirror device 20 in the Z-axis direction. In the optical function member 13, the light transmitting portion 15 is a portion that faces the light passage portion 25 of the mirror device 20 in the Z-axis direction. A surface 14a on the mirror device 20 side in the light transmitting portion 14, and a surface 15a on the mirror device 20 side in the light transmitting portion 15 are flush with the third surface 13a. The light transmitting portion 14 constitutes a second portion of an optical path between the beam splitter unit 3 and the fixed mirror 16. The light transmitting portion 14 is a portion that corrects an optical path difference that occurs between an optical path between the beam splitter unit 3 and the movable mirror 22, and an optical path between the beam splitter unit 3 and the fixed mirror 16. Note that, in this embodiment, the light transmitting portion 15 does not function as a light transmitting portion.

The optical function member 13 includes a fifth surface 13d that faces the movable mirror 22 and the drive unit 23 of the mirror device 20. The fifth surface 13d is located on the fourth surface 13b side in comparison to the third surface 13a. The fifth surface 13d extends up to the outer edge 13c of the optical function member 13 when viewed from the Z-axis direction. In this embodiment, the fifth surface 13d extends up to each of a pair of opposite sides extending in the Y-axis direction (direction intersecting the first direction and the second direction) in the outer edge 13c of the optical function member 13 while surrounding an end of each of the light transmitting portions 14 and 15 on the mirror device 20 side.

The third surface 13a of the optical function member 13 is joined to the second surface 21b of the base 21 by direct bonding (for example, plasma activation bonding, surface-activated room-temperature bonding (SAB), atomic diffusion bonding (ADB), anodic bonding, fusion bonding, hydrophilic bonding, and the like). In this embodiment, the third surface 13a extends to face the plurality of electrode pads 211 and 212 provided in the base 21 on both side of the fifth surface 13d in the Y-axis direction. Here, the fifth surface 13d is located on the fourth surface 13b side in comparison to the third surface 13a, and thus the fifth surface 13d is spaced apart from the mirror device 20 in a region facing the movable mirror 22 and the drive unit 23. In addition, the surface 14a of the light transmitting portion 14 and the surface 15a of the light transmitting portion 15 face the light passage portions 24 and 25 of the mirror device 20, respectively. According to this, in the mirror unit 2, when the movable mirror 22 reciprocates along the Z-axis direction, the movable mirror 22 and the drive unit 23 are prevented from coining into contact with the optical function member 13.

Note that, the base 21 of the mirror device 20 is provided with a sixth surface 21d that is spaced apart from the optical function member 13 in a state in which the third surface 13a of the optical function member 13 and the second surface 21b of the base 21 are joined to each other. The sixth surface 21d is spaced apart from the optical function member 13 in a region including at least a part of the outer edge of the base 21 when viewed from the Z-axis direction. In this embodiment, the sixth surface 21d is formed by etching and removing the device layer 102 and the intermediate layer 103 along one side extending in the Y-axis direction in the outer edge of the base 21. In addition, a plurality of reference holes 13e are formed in the third surface 13a of the optical function member 13. In this embodiment, the plurality of reference holes 13e are formed in the third surface 13a to correspond a plurality of corner portions of the base 21, respectively. When the third surface 13a of the optical function member 13 and the second surface 21b of the base 21 are joined to each other, a portion corresponding to the sixth surface 21d in the base 21 is gripped, and handling of the mirror device 20 is performed to adjust a position of the mirror device 20 in the X-axis direction and the Y-axis direction, and an angle of the mirror device 20 in a plane perpendicular to the Z-axis direction on the basis of the plurality of reference holes 13e formed in the third surface 13a.

As illustrated in FIG. 3 and FIG. 4, the fixed mirror 16 is disposed on a side opposite to the mirror device 20 with respect to the optical function member 13, and a position of the mirror device 20 with respect to the base 21 is fixed. The fixed mirror 16 is formed on the fourth surface 13b of the optical function member 13, for example, by evaporation. The fixed mirror 16 has a mirror surface 16a perpendicular to the Z-axis direction. In this embodiment, the mirror surface 22a of the movable mirror 22 and the mirror surface 16a of the fixed mirror 16 face one side (beam splitter unit 3 side) in the Z-axis direction. Note that, the fixed mirror 16 is formed continuously to the fourth surface 13b of the optical function member 13 to reflect light transmitted through each of the light transmitting portions 14 and 15 of the optical function member 13, but a fixed mirror that reflects light transmitted through the light transmitting portion 14 and a fixed mirror that reflects light transmitted through the light transmitting portion 15 may be provided, respectively.

The stress mitigation substrate 17 is attached to the fourth surface 13b of the optical function member 13 through the fixed mirror 16. The stress mitigation substrate 17 is attached to the fixed mirror 16, for example, by an adhesive. When viewed from the Z-axis direction, an outer edge of the stress mitigation substrate 17 is located on an outer side of the outer edge 13c of the optical function member 13. That is, when viewed from the Z-axis direction, the outer edge of the stress mitigation substrate 17 surrounds the outer edge 13c of the optical function member 13. A thermal expansion coefficient of the stress mitigation substrate 17 is closer to a thermal expansion coefficient of the base 21 of the mirror device 20 (more specifically, a thermal expansion coefficient of the support layer 101) in comparison to a thermal expansion coefficient of the optical function member 13. In addition, the thickness of the stress mitigation substrate 17 is closer to the thickness of the base 21 of the mirror device 20 in comparison to the thickness of the optical function member 13. For example, the stress mitigation substrate 17 is formed of silicon in a rectangular plate shape, and has a size of approximately 16 mm×21 mm×0.65 mm (thickness).

Figure 8:
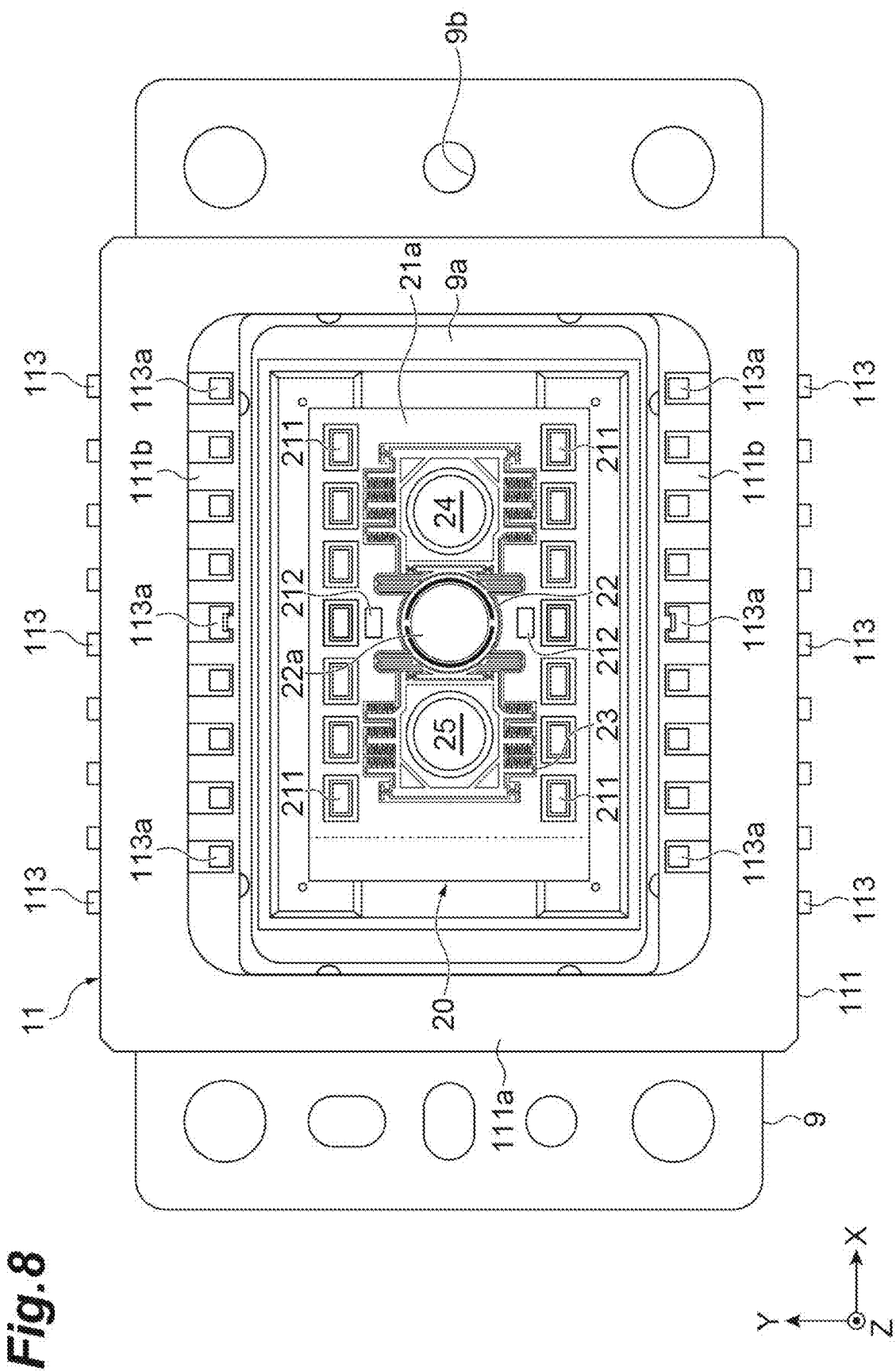
FIG. 8 is a cross-sectional view of the optical module along line VIII-VIII m FIG. 1.

As illustrated in FIG. 1, the mirror unit 2 configured as described above is attached to the support 9 by fixing a surface on a side opposite to the optical function member 13 in the stress mitigation substrate 17 to a surface 9a (surface on one side in the Z-axis direction) of the support 9, for example, by an adhesive. When mirror unit 2 is attached to the support 9, as illustrated in FIG. 8, the position of the mirror device 20 in the X-axis direction and the Y-axis direction, and the angle of the mirror device 20 in a plane perpendicular to the Z-axis direction are adjusted on the basis of a reference holes 9b formed in the support 9. Note that, in FIG. 8, the second support structure 12 is not illustrated.

[Configuration of First Support Structure and Beam Splitter Unit]

As illustrated in FIG. 1 and FIG. 8, the first support structure 11 includes a frame body 111, a light transmitting member 112, and a plurality of lead pins 113. The frame body 111 is formed to surround the mirror unit 2 when viewed from the Z-axis direction, and is attached to the surface 9a of the support 9, for example, by an adhesive such as silver solder. For example, the frame body 111 is formed of ceramic, and has a rectangular frame shape. An end surface 111a opposite to the support 9 in the frame body 111 is located on a side opposite to the support 9 in comparison to the first surface 21a of the base 21 of the mirror device 20.

The light transmitting member 112 is formed to close an opening of the frame body 111, and is attached to the end surface 111a of the frame body 111, for example, by an adhesive. The light transmitting member 112 is formed of a material having optical transparency with respect to the measurement light L0 and the laser light L10, and has, for example, a rectangular plate shape. Here, since the end surface 111a of the frame body 111 is located on a side opposite to the support 9 in comparison to the first surface 21a of the base 21 of the mirror device 20, the light transmitting member 112 is spaced apart from the mirror device 20. According to this, in the optical module 1A, when the movable mirror 22 reciprocates along the Z-axis direction, the movable mirror 22 and the drive unit 23 are prevented from coining into contact with the light transmitting member 112. Note that, in the optical module 1A, a package that accommodates the mirror unit 2 is constituted by the support 9, the frame body 111, and the light transmitting member 112.

Each of the lead pins 113 is provided in the frame body 111 so that one end 113a is located on an inner side of the frame body 111, and the other end (not illustrated) is located on an outer side of the frame body 111. The one end 113a of each of the lead pins 113 is electrically connected to the electrode pad 211 or 212 corresponding to the lead pin 113 in the mirror device 20 by wire (not illustrated). In the optical module 1A, an electric signal for moving the movable mirror 22 along the Z-axis direction is input to the drive unit 23 through the plurality of lead pins 113. In this embodiment, a step surface 111b extending in the X-axis direction on both sides of the optical function member 13 in the Y-axis direction is formed in the frame body 111, and the one end 113a of the lead pin 113 is disposed on the step surface 111b. The lead pin 113 extends in the Z-axis direction on both sides of the support 9 in the Y-axis direction, and the other end of the lead pin 113 is located on the other side in the Z-axis direction in comparison to the support 9.

Figure 10:
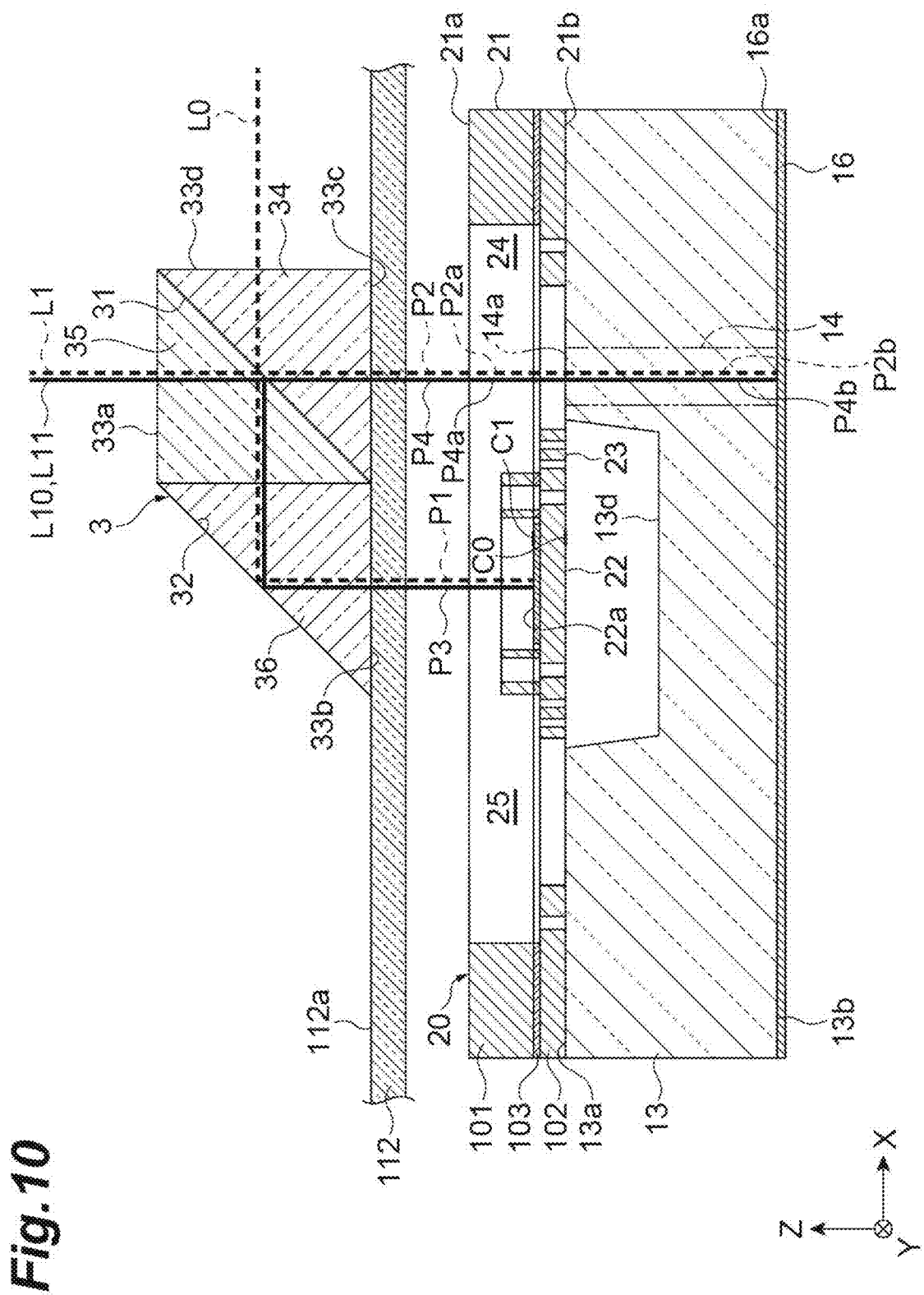
FIG. 10 is a schematic cross-sectional view of a mirror unit and a beam splitter unit illustrated in FIG. 1.

As illustrated in FIG. 10, the beam splitter unit 3 is attached to the surface 112a on a side opposite to the mirror device 20 in the light transmitting member 112, for example, by an optical adhesive that also functions as a refractive index matching agent. The beam splitter unit 3 includes a first mirror surface (beam splitter) 31, a second mirror surface 32, and a plurality of optical surfaces 33a, 33b, 33c, and 33d. The beam splitter unit 3 is constituted by joining a plurality of optical blocks 34, 35, and 36. The optical blocks 34, 35, and 36 are formed of a material having a refractive index that is the same as or similar to that of the optical function member 13. Note that, FIG. 10 is a schematic cross-sectional view of the mirror unit 2 and the beam splitter unit 3 illustrated in FIG. 1, and in FIG. 10, the mirror device 20 is schematically illustrated, for example, in a state in which dimensions in the Z-axis direction are enlarged in comparison to actual dimensions.

The first mirror surface 31 is a mirror surface (for example, a half mirror surface) that is inclined with respect to the Z-axis direction, and is formed between the optical block 34 and the optical block 35. In this embodiment, the first mirror surface 31 is a surface that is parallel to the Y-axis direction, has an angle of 45° with respect to the Z-axis direction, and is inclined to be spaced away from the light incident unit 4 as it approaches the mirror device 20. The first mirror surface 31 has a function of reflecting a part of the measurement light L0 and allowing the remainder of the measurement light L0 to be transmitted therethrough, and a function of reflecting a part of the laser light L10 and allowing the remainder of the laser light L10 to be transmitted therethrough. For example, the first mirror surface 31 is formed of a dielectric multi-layer film. The first mirror surface 31 overlaps the light passage portion 24 of the mirror device 20, the light transmitting portion 14 of the optical function member 13, and the mirror surface 16a of the fixed mirror 16 when viewed from the Z-axis direction, and overlaps the light incident unit 4 when viewed from the X-axis direction (refer to FIG. 1). That is, the first mirror surface 31 faces the fixed mirror 16 in the Z-axis direction, and faces the light incident unit 4 in the X-axis direction.

The second mirror surface 32 is a mirror surface (for example, a total reflection mirror surface) that is parallel to the first mirror surface 31, and is formed in the optical block 36 to be located on a side opposite to the light incident unit 4 with respect to the first mirror surface 31. The second mirror surface 32 has a function of reflecting the measurement light L0 and a function of reflecting the laser light L10. For example, the second mirror surface 32 is formed of a metal film. The second mirror surface 32 overlaps the mirror surface 22a of the movable mirror 22 of the mirror device 20 when viewed from the Z-axis direction, and overlaps the first mirror surface 31 when viewed from the X-axis direction. That is, the second mirror surface 32 faces the movable mirror 22 in the Z-axis direction, and faces the first mirror surface 31 in the X-axis direction.

The optical surface 33a is a surface perpendicular to the Z-axis direction, and is formed in the optical block 35 to be located on a side opposite to the mirror device 20 with respect to the first mirror surface 31. The optical surface 33b is a surface perpendicular to the Z-axis direction, and is formed in the optical block 36 to be located on the mirror device 20 side with respect to the second mirror surface 32. The optical surface 33c is a surface perpendicular to the Z-axis direction, and is formed in the optical block 34 to be located on the mirror device 20 side with respect to the first mirror surface 31. The optical surface 33b and the optical surface 33c are located on the same plane. The optical surface 33d is a surface perpendicular to the X-axis direction, and is formed in the optical block 34 to be located on the light incident unit 4 side with respect to the first mirror surface 31. The optical surfaces 33a, 33b, 33c, and 33d have a function of allowing the measurement light L0 to be transmitted therethrough and a function of allowing the laser light L10 to be transmitted therethrough.

Figure 9:
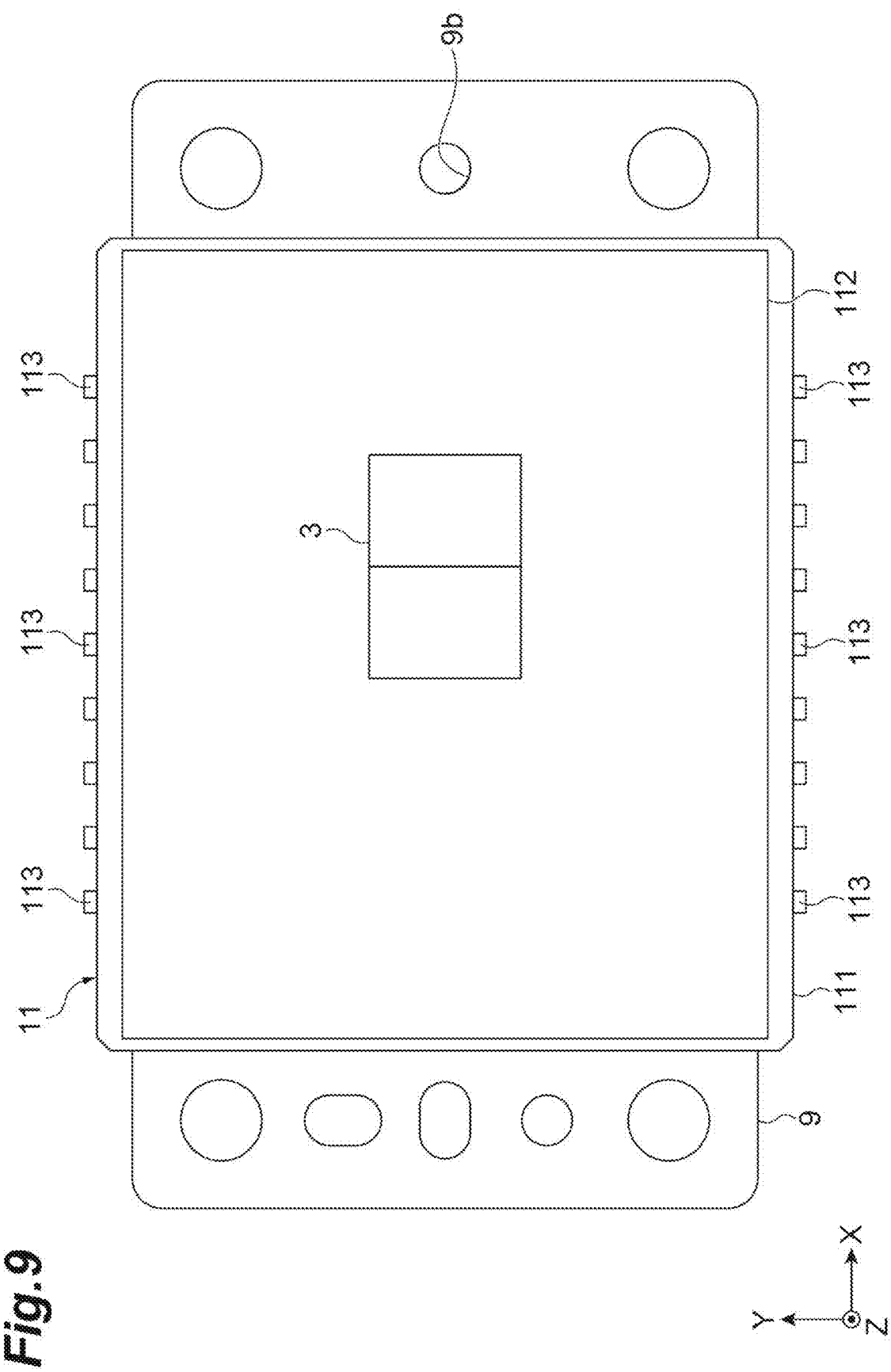
FIG. 9 is a cross-sectional view of the optical module along line IX-IX in FIG. 1.

The beam splitter unit 3 configured as described above is attached to the light transmitting member 112 by fixing the optical surface 33b and the optical surface 33c which are flush with each other to the surface 112a of the light transmitting member 112, for example, by an optical adhesive. When the beam splitter unit 3 is attached to the light transmitting member 112, as illustrated in FIG. 9, the position of the beam splitter unit 3 in the X-axis direction and the Y-axis direction, and the angle of the beam splitter unit 3 in a plane perpendicular to the Z-axis direction are adjusted on the basis of the reference holes 9b formed in the support 9. Note that, the second support structure 12 is not illustrated in FIG. 9.

Here, an optical path of the measurement light L0 and an optical path of the laser light L10 in the mirror unit 2 and the beam splitter unit 3 will be described in detail with reference to FIG. 10.

As illustrated in FIG. 10, when the measurement light L0 is incident to the beam splitter unit 3 along the X-axis direction through the optical surface 33d, a part of the measurement light L0 is transmitted through the first mirror surface 31, is reflected by the second mirror surface 32, and reaches the mirror surface 22a of the movable mirror 22 through the optical surface 33b and the light transmitting member 112. The part of the measurement light L0 is reflected by the mirror surface 22a of the movable mirror 22, proceeds along the same optical path P1 in an opposite direction, and is reflected by the first mirror surface 31. The remainder of the measurement light L0 is reflected by the first mirror surface 31, and reaches the mirror surface 16a of the fixed mirror 16 through the optical surface 33c, the light transmitting member 112, the light passage portion 24 of the mirror device 20, and the light transmitting portion 14 of the optical function member 13. The remainder of the measurement light L0 is reflected by the mirror surface 16a of the fixed mirror 16, proceeds along the same optical path P2 in an opposite direction, and is transmitted through the first mirror surface 31. The part of the measurement light L0 which is reflected by the first mirror surface 31, and the remainder of the measurement light L0 which is transmitted through the first mirror surface 31 become interference light L1, and the interference light L1 of the measurement light is emitted from the beam splitter unit 3 through the optical surface 33a along the Z-axis direction.

On the other hand, when the laser light L10 is incident to the beam splitter unit 3 through the optical surface 33a along the Z-axis direction, a part of the laser light L10 is reflected by the first mirror surface 31 and the second mirror surface 32, and reaches the mirror surface 22a of the movable mirror 22 through the optical surface 33b and the light transmitting member 112. The part of the laser light L10 is reflected by the mirror surface 22a of the movable mirror 22, proceeds along the same optical path P3 in an opposite direction, and is reflected by the first mirror surface 31. The remainder of the laser light L10 is transmitted through the first mirror surface 31, and reaches the mirror surface 16a of the fixed mirror 16 through the optical surface 33c, the light transmitting member 112, the light passage portion 24 of the mirror device 20, and the light transmitting portion 14 of the optical function member 13. The remainder of the laser light L10 is reflected by the mirror surface 16a of the fixed mirror 16, proceeds along the same optical path P4 in an opposite direction, and is transmitted through the first mirror surface 31. The part of the laser light L10 reflected by the first mirror surface 31 and the remainder of the laser light L10 transmitted through the first mirror surface 31 become interference light L11, and the interference light L11 of the laser light is emitted from the beam splitter unit 3 through the optical surface 33a along the Z-axis direction.

As described above, the light passage portion 24 of the mirror device 20 constitutes a first portion P2a of the optical path P2 of the measurement light L0 and a first portion P4a of the optical path P4 of the laser light L10 in an optical path between the beam splitter unit 3 and the fixed mirror 16. In addition, the light transmitting portion 14 of the optical function member 13 constitutes a second portion P2b of the optical path P2 of the measurement light L0 and a second portion P4b of the optical path P4 of the laser light L10 in an optical path between the beam splitter unit 3 and the fixed mirror 16.

The second portion P2b of the optical path P2 of the measurement light L0 is constituted by the light transmitting portion 14, and thus an optical path difference between the optical paths P1 and P2 is corrected so that a difference between an optical path length (an optical path length in consideration of a refractive index of respective media through which the optical path passes) of the optical path P1 of the measurement light L0 and an optical path length of the optical path P2 of the measurement light L0 decreases. Similarly, the second portion P4b of the optical path P4 of the laser light L10 is constituted by the light transmitting portion 14, and thus an optical path difference between the optical paths P3 and P4 is corrected so that a difference between an optical path length of the optical path P3 of the laser light L10 and an optical path length of the optical path P4 of the laser light L10 decreases. In this embodiment, a refractive index of the light transmitting portion 14 is equal to a refractive index of the optical blocks 34, 35, and 36 which constitute the beam splitter unit 3, and a distance between the first mirror surface 31 and the second mirror surface 32 along the X-axis direction is equal to the thickness of the light transmitting portion 14 along the Z-axis direction (that is, a distance between the surface 14a of the light transmitting portion 14 and the fourth surface 13b of the optical function member 13 along the Z-axis direction).

In the optical module 1A, a zero optical path difference position C0 deviates from a central position C1 of a resonance operation (reciprocating operation in a resonance frequency) of the movable mirror 22 in the mirror device 20. The zero optical path difference position C0 represents a position of the movable mirror 22 at which an optical path length on the movable mirror 22 side with which the interference light L1 of the measurement light is caused to occur becomes the same as an optical path length on the fixed mirror 16 side with which the interference light L1 of the measurement light is caused to occur. In this embodiment, the zero optical path difference position C0 is a position of the movable mirror 22 at which an optical path length between the first mirror surface 31 of the beam splitter unit 3 and the mirror surface 22a of the movable mirror 22 (that is, an optical path length of the optical paths P1 and P3) becomes the same as an optical path length between the first mirror surface 31 of the beam splitter unit 3 and the mirror surface 16a of the fixed mirror 16 (that is, an optical path length of the optical paths P2 and P4). The amount of deviation of the zero optical path difference position C0 to the central position C1 is smaller than an amplitude of the resonance operation of the movable mirror 22. In this embodiment, the zero optical path difference position C0 is the same as a position of the surface 14a of the light transmitting portion 14 in the Z-axis direction. The central position C1 is a position that deviates from the position of the surface 14a of the light transmitting portion 14 in the Z-axis direction to the first mirror surface 31 side of the beam splitter unit 3 along the Z-axis direction by the sum of the thickness of the device layer 102 and the thickness of a metal film that constitutes the mirror surface 22a.

[Configurations of Second Support Structure, Light Incident Unit, and the Like]

As illustrated in FIG. 1, the second support structure 12 includes a connection unit 120. The connection unit 120 includes a main body portion 121, a frame body 122, and a fixed plate 123. The main body portion 121 includes a pair of side wall portions 124 and 125, and a ceiling wall portion 126. The pair of side wall portions 124 and 125 face each other in the X-axis direction. An opening 124a is formed in the side wall portion 124 on one side in the X-axis direction. The ceiling wall portion 126 faces the support 9 in the Z-axis direction. An opening 126a is formed in the ceiling wall portion 126. For example, the main body portion 121 is integrally formed of a metal. The main body portion 121 is provided with a plurality of positioning pins 121a. The main body portion 121 is positioned with respect to the support 9 by inserting the positioning pins 121a into reference holes 9b and 9c formed in the support 9, and in this state, the main body portion 121 is attached to the support 9, for example, by a bolt.

The frame body 122 is disposed on a surface on a side opposite to the beam splitter unit 3 in the side wall portion 124. An opening of the frame body 122 faces the beam splitter unit 3 through the opening 124a of the side wall portion 124. The light incident unit 4 is disposed in the frame body 122. The fixed plate 123 is a member that fixes the light incident unit 4 disposed in the frame body 122 to the main body portion 121.

The light incident unit 4 includes a holder 41 and a collimator lens 42. The holder 41 holds the collimator lens 42, and is configured so that an optical fiber (not illustrated) that guides the measurement light L0 can be connected to the holder 41. The collimator lens 42 collimates the measurement light L0 emitted from the optical fiber. When the optical fiber is connected to the holder 41, an optical axis of the optical fiber matches an optical axis of the collimator lens 42.

The holder 41 is provided with a flange portion 41a. The flange portion 41a is disposed between the frame body 122 and the fixed plate 123. In this state, for example, when the fixed plate 123 is attached to the side wall portion 124, for example, by a bolt, the light incident unit 4 disposed in the frame body 122 is fixed to the main body portion 121. In this manner, the light incident unit 4 is disposed on one side of the beam splitter unit 3 in the X-axis direction, and is supported by the second support structure 12. The light incident unit 4 allows the measurement light L0 that is incident from the first light source through a measurement target or the measurement light L0 that is generated from the measurement target (in this embodiment, the measurement light L0 guided by the optical fiber) to be incident to the beam splitter unit 3.

A filter 54 is attached to the frame body 122. The filter 54 has a function of allowing the measurement light L0 to be transmitted therethrough and absorbing the laser light L10. For example, the filter 54 is formed of silicon in a plate shape. The filter 54 is disposed in the opening 124a of the side wall portion 124 in a state of being inclined with respect to an optical axis of the light incident unit 4. The filter 54 closes the opening of the frame body 122 when viewed from the X-axis direction. In this manner, the filter 54 is disposed between the light incident unit 4 and the beam splitter unit 3, and is supported by the second support structure 12 in a state of being inclined with respect to the optical axis of the light incident unit 4. In this embodiment, an optical surface of the filter 54 is a surface that is parallel to the Z-axis direction and has an angle of 10° to 20° with respect to the Y-axis direction. Note that, the optical axis of the light incident unit 4 is parallel to the X-axis direction.

The second support structure 12 further includes a holding unit 130. The holding unit 130 includes a main body portion 131. The main body portion 131 is attached to a surface of the ceiling wall portion 126 on a side opposite to the support 9. The main body portion 131 is positioned with respect to the main body portion 121 of the connection unit 120 by a plurality of positioning pins 131a, and in this state, the main body portion 131 is attached to the ceiling wall portion 126, for example, by a bolt. A first through-hole 135, a second through-hole 136, and a third through-hole 137 are formed in the main body portion 131. Each of the first through-hole 135, the second through-hole 136, and the third through-hole 137 passes through the main body portion 131 along the Z-axis direction. The first through-hole 135 is formed at a position that faces the first mirror surface 31 of the beam splitter unit 3 in the Z-axis direction. The second through-hole 136 is formed on the other side of the first through-hole 135 in the X-axis direction (that is, on a site opposite to the light incident unit 4). The third through-hole 137 is formed on the other side of the second through-hole 136 in the X-axis direction.

The first light detector 6 is disposed in the first through-hole 135. The first light detector 6 includes a light detection element 62, a package 64 including a light transmission window 64*a*, a holder 61, and a condensing lens 63. The package 64 accommodates the light detection element 62. The light detection element 62 detects the interference light L1 of the measurement light. For example, the light detection element 62 is an InGaAs photodiode. The holder 61 holds the package 64 and the condensing lens 63. The condensing lens 63 condenses the interference light L1 of the measurement light which is incident to the light detection element 62 through the light transmission window 64*a* to the light detection element 62. An optical axis of the light detection element 62 and an optical axis of the condensing lens 63 match each other.

The holder 61 is provided with a flange portion 61*a*. The flange portion 61*a* is positioned with respect to the main body portion 121 of the connection unit 120 by a positioning pin 61*b*, and in this state, the flange portion 61*a* is attached to the ceiling wall portion 126 of the main body portion 121, for example, by a bolt. In this manner, the first light detector 6 is disposed on one side of the beam splitter unit 3 in the Z-axis direction, and is supported by the second support structure 12. The first light detector 6 faces the first mirror surface 31 of the beam splitter unit 3 in the Z-axis direction. The first light detector 6 detects the interference light L1 of the measurement light which is emitted from the beam splitter unit 3.

The second light detector 8 is disposed in the second through-hole 136. The second light detector 8 includes a light detection element 82, and a package 84 including a condensing lens 84*a*. The light detection element 82 detects interference light L11 of the laser light. For example, the light detection element 82 is a Si photodiode. The condensing lens 84*a* condenses the interference light L11 of the laser light which is incident to the light detection element 82 to the light detection element 82. An optical axis of the light detection element 82 and an optical axis of the condensing lens 84*a* match each other.

The package 84 is fixed to the main body portion 131 in the second through-hole 136. In this manner, the second light detector 8 is disposed on the other side (one side of the first optical device in a direction intersecting an optical axis of the first optical device) of the first light detector 6 in the X-axis direction to face the same side as in the first light detector 6, and is supported by the second support structure 12. The second light detector 8 detects the interference light L11 of the laser light which is emitted from the beam splitter unit 3.

The second light source 7 is disposed in the third through-hole 137. The second light source 7 includes a light-emitting element 72, and a package 74 including a collimator lens 74*a*. The light-emitting element 72 emits the laser light L10. For example, the light-emitting element 72 is a semiconductor laser such as VCSEL. The collimator lens 74*a* collimates the laser light L10 emitted from the light-emitting element 72. An optical axis of the light-emitting element 72 and an optical axis of the collimator lens 74*a* match each other.

The package 74 is fixed to the main body portion 131 in the third through-hole 137. In this manner, the second light source 7 is disposed on the other side (one side of the second optical device in a direction intersecting the optical axis of the first optical device) of the second light detector 8 in the X-axis direction to face the same side as in the first light detector 6, and is supported by the second support structure 12. The second light source 7 emits the laser light L10 to be incident to the beam splitter unit 3.

As described above, the holding unit 130 holds the first light detector (first optical device) 6, the second light detector (second optical device) 8, and the second light source (third optical device) 7 so that the first light detector 6, the second light detector 8, and the second light source 7 face the same side, and are aligned in the order of the first light detector 6, the second light detector 8, and the second light source 7. In this embodiment, the holding unit 130 holds the first light detector 6, the second light detector 8, and the second light source 7 so that the first light detector 6, the second light detector 8, and the second light source 7 face the other side (that is, the beam splitter unit 3 side) in the Z-axis direction on one side of the beam splitter unit 3 in the Z-axis direction. In addition, the holding unit 130 holds the first light detector 6, the second light detector 8, and the second light source 7 to be aligned in the order of the first light detector 6, the second light detector 8, and the second light source 7 from one side (that is, the light incident unit 4 side) in the X-axis direction.

Note that, a configuration in which the first light detector 6 faces an arbitrary side represents that a light-receiving surface of the light detection element 62 faces the arbitrary side (that is, the first light detector 6 is disposed to detect light incident from the arbitrary side). In this case, for example, a lead pin of the light detection element 62 extends to a side opposite to the arbitrary side. Similarly, a configuration in which the second light detector 8 faces an arbitrary side represents that a light-receiving surface of the light detection element 82 faces the arbitrary side (that is, the second light detector 8 is disposed to detect light incident from the arbitrary side). In this case, for example, a lead pin of the light detection element 82 extends to a side opposite to the arbitrary side. In addition, a configuration in which the second light source 7 faces an arbitrary side represents that a light emission surface of the light-emitting element 72 faces the arbitrary side (that is, the second light source 7 is disposed to emit light to the arbitrary side). In this case, for example, a lead pin of the light-emitting element 72 extends to a side opposite to the arbitrary side. In addition, the holding unit 130 is a part of the second support structure 12, and thus a configuration in which the holding unit 130 holds an arbitrary configuration represents that the arbitrary configuration is supported by the second support structure 12.

A first mirror 51, a second mirror 52, and a third mirror 53 are attached to the main body portion 121 of the connection unit 120. The first mirror 51 is attached to the ceiling wall portion 126 of the main body portion 121 in the opening 126*a* to be located on a side opposite to the first light detector 6 with respect to the first through-hole 135. The second mirror 52 is attached to the ceiling wall portion 126 of the main body portion 121 in the opening 126*a* to be located on a side opposite to the second light detector 8 with respect to the second through-hole 136. The third mirror 53 is attached to the ceiling wall portion 126 of the main body portion 121 in the opening 126*a* to be located on a side opposite to the second light source 7 with respect to the third through-hole 137.

The first mirror 51 is a dichroic mirror that has a function of allowing the measurement light L0 to be transmitted therethrough and reflecting the laser light L10, and is inclined with respect to an optical axis of the first light detector 6. The first mirror 51 is disposed between the beam splitter unit 3 and the first light detector 6. That is, the first mirror 51 is disposed to face the beam splitter unit 3 and the first light detector 6. In this embodiment, an optical surface of the first mirror 51 is a surface that is parallel to the Y-axis direction and has an angle of 45° with respect to the Z-axis direction. Note that, an optical axis of the first light detector 6 is parallel to the Z-axis direction.

The second mirror 52 is a mirror (for example, a half mirror) that has a function of reflecting a part of the laser light L10 and allowing the remainder of the laser light L10 to be transmitted therethrough and is parallel to the first mirror 51. The second mirror 52 is disposed to overlap the first mirror 51 when viewed from the X-axis direction and to overlap the second light detector 8 when viewed from the Z-axis direction. That is, the second mirror 52 is disposed to face the first mirror 51 and the second light detector 8. In this embodiment, an optical surface of the second mirror 52 is a surface that is parallel to the Y-axis direction, and has an angle of 45° with respect to the Z-axis direction.

The third mirror 53 is a mirror (for example, a total reflection mirror) that has a function of reflecting the laser light L10 and is parallel to the second mirror 52. The third mirror 53 is disposed to overlap the second mirror 52 when viewed from the X-axis direction, and to overlap the second light source 7 when viewed from the Z-axis direction. That is, the third mirror 53 is disposed to face the second mirror 52 and the second light source 7. In this embodiment, an optical surface of the third mirror 53 is a surface that is parallel to the Y-axis direction and has an angle of 45° with respect to the Z-axis direction.

A filter 56 is disposed between the first mirror 51 and the first light detector 6. An aperture 55 is disposed between the first mirror 51 and the filter 56. In this embodiment, the aperture 55 and the filter 56 are held by the holder 61 of the first light detector 6. The aperture 55 is a member in which an opening having a circular shape is formed when viewed from the Z-axis direction. The filter 56 has a function of allowing the measurement light L0 to be transmitted therethrough and absorbing the laser light L10. In this embodiment, the filter 56 is a member different from a member in which the first mirror 51 is formed on a surface (surface facing the beam splitter unit 3) on the beam splitter unit 3 side. More specifically, the filter 56 is a silicon plate in which an anti-reflection film is formed, for example, on a light incident surface. In this embodiment, since the filter 56 is a member different from the member in which the first mirror 51 is formed, the degree of freedom of design of each of the first mirror 51 and the filter 56 is improved.

A laser light absorption unit 57 is disposed on a side opposite to the second light detector 8 with respect to the second mirror 52. The laser light absorption unit 57 has a function of absorbing the laser light L10. In this embodiment, the laser light absorption unit 57 is a part of the second support structure (support) 12 that supports the second mirror 52. More specifically, the laser light absorption unit 57 is a portion that protrudes from the side wall portion 125 of the main body portion 121 of the connection unit 120 to the beam splitter unit 3 side. The laser light absorption unit 57 is constituted by forming a black resist layer on the portion, or by performing a black alumite treatment to the portion. In this embodiment, the laser light absorption unit 57 is a part of the second support structure 12, and thus an increase in the number of parts is suppressed.

Here, description will be given of an optical path between the beam splitter unit 3 and the first light detector 6, and the like. The interference light L1 of the measurement light which is emitted from the beam splitter unit 3 along the Z-axis direction is transmitted through the first mirror 51, is incident to the first light detector 6 through the aperture 55 and the filter 56, and is detected by the first light detector 6. On the other hand, the laser light L10 emitted from the second light source 7 is reflected by the third mirror 53 and is transmitted through the second mirror 52, and is reflected by the first mirror 51 and is incident to the beam splitter unit 3 along the Z-axis direction. Interference light L11 of the laser light which is emitted from the beam splitter unit 3 along the Z-axis direction is reflected by the first mirror 51 and the second mirror 52, and is incident to the second light detector 8 and is detected by the second light detector 8. Note that, a part of the laser light L10 reflected by the second mirror 52 is absorbed by the laser light absorption unit 57.

In the optical module 1A, a length of the optical path between the beam splitter unit 3 and the first light detector 6 is shorter than a length of an optical path between the beam splitter unit 3 and the second light detector 8, and is shorter than a length of an optical path between the beam splitter unit 3 and the second light source 7. Note that, the lengths of the optical paths represent physical distances along the optical paths.

Specifically, a distance from an intersection between the optical path and the first mirror surface 31 of the beam splitter unit 3 to a light incident surface of the first light detector 6 is shorter than a distance from an intersection between an optical path and the first mirror surface 31 of the beam splitter unit 3 to a light incident surface of the second light detector 8, and is shorter than a distance from an intersection between an optical path and the first mirror surface 31 of the beam splitter unit 3 to a light emission surface of the second light source 7. A distance from an intersection between an optical path and the first mirror surface 31 of the beam splitter unit 3 to a light incident surface of the condensing lens 63 of the first light detector 6 is shorter than a distance from an intersection between an optical path and the first mirror surface 31 of the beam splitter unit 3 to a light incident surface of the condensing lens 84a of the second light detector 8, and is shorter than a distance from an intersection between an optical path and the first mirror surface 31 of the beam splitter unit 3 to a light emission surface of the collimator lens 74a of the second light source 7. A distance from the optical surface 33a of the beam splitter unit 3 to the light incident surface of the first light detector 6 is shorter than a distance from the optical surface 33a of the beam splitter unit 3 to the light incident surface of the second light detector 8, and is shorter than a distance from the optical surface 33a of the beam splitter unit 3 to the light emission surface of the second light source 7. A distance from the optical surface 33a of the beam splitter unit 3 to the light incident surface of the condensing lens 63 of the first light detector 6 is shorter than a distance from optical surface 33a of the beam splitter unit 3 to the light incident surface of the condensing lens 84a of the second light detector 8, and is shorter than a distance from the optical surface 33a of the beam splitter unit 3 to the light emission surface of the collimator lens 74a of the second light source 7.

In this embodiment, the light incident unit 4 has a configuration in which angle adjustment of the holder 41 with respect to the frame body 122 is possible. In contrast, the first light detector 6 is fixed to the ceiling wall portion 126 of the main body portion 121, for example, by a bolt in a state of being positioned with respect to the main body portion 121 of the connection unit 120. Accordingly, in a state in which the first light detector 6 is positioned, the angle adjustment of the holder 41 can be carried out so that detection intensity in the first light detector 6 becomes the maximum while the measurement light L0 is incident to the beam splitter unit 3. In addition, in a state in which the angle adjustment is carried out, the light incident unit 4 can be fixed to the frame body 122.

Note that, not only the light incident unit 4 but also the first light detector 6 may have a configuration in which angle adjustment of the holder 61 is possible. In addition, the second light source 7 may have a configuration in which angle adjustment is possible in a state in which the second light detector 8 is positioned. In addition, not only the second light source 7 but also the second light detector 8 may have a configuration in which the angle adjustment is possible.

[Configurations of Signal Processing Unit, and the Like]

Figure 11:
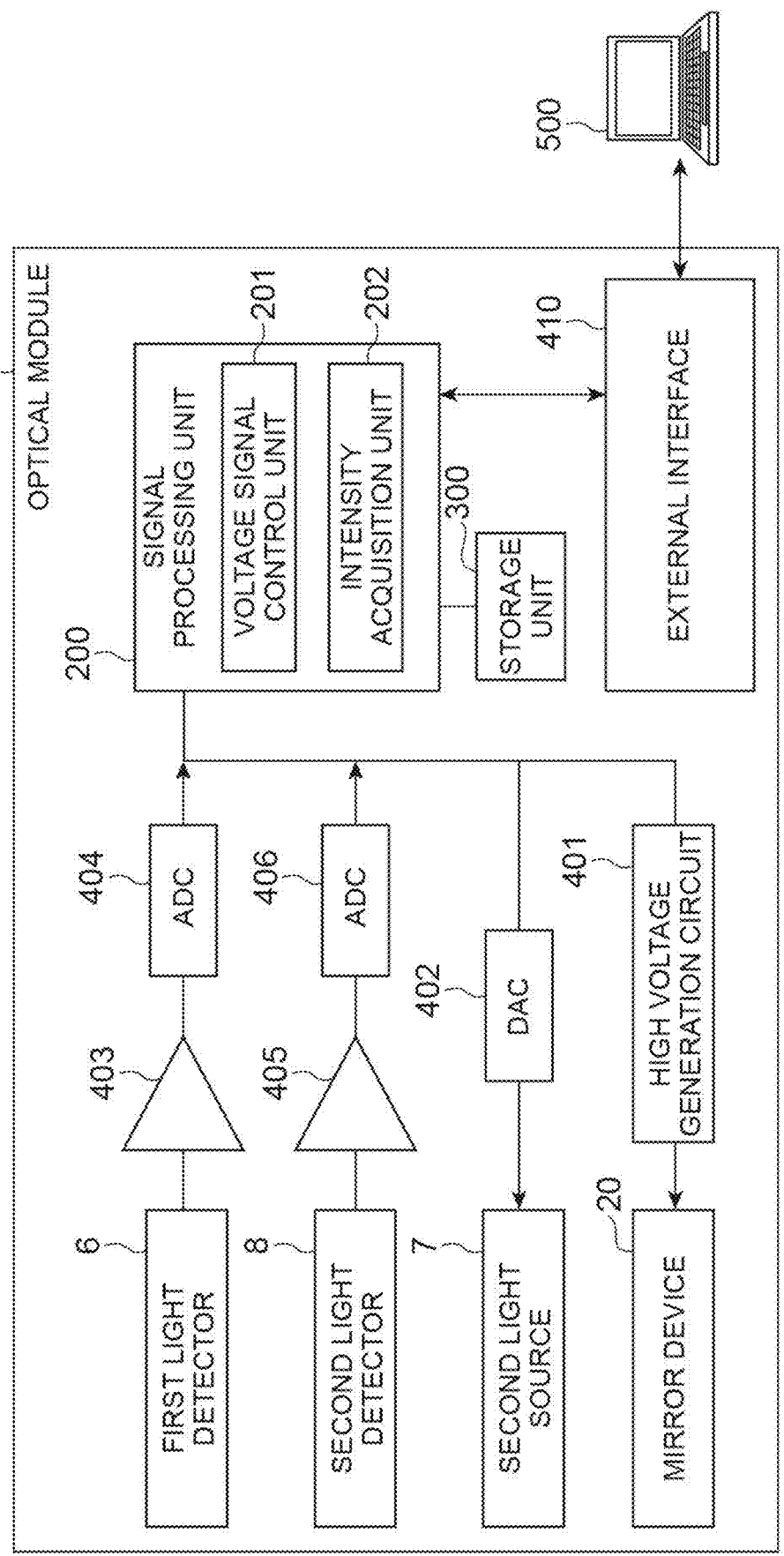
FIG. 11 is a block diagram illustrating a configuration of the optical module illustrated in FIG. 1.

As illustrated in FIG. 11, the optical module 1A further includes a signal processing unit 200 and a storage unit 300. The signal processing unit 200 is electrically connected to each of the mirror device 20, the second light source 7, the first light detector 6, and the second light detector 8. For example, the signal processing unit 200 is an integrated circuit such as a field-programmable gate array (FPGA), and uses a clock divided from a quartz oscillator as a reference clock. The storage unit 300 is electrically connected to the signal processing unit 200. For example, the storage unit 300 is a non-volatile memory such as an electrically erasable programmable read-only memory (EEPROM). A personal computer (PC) 500 is electrically connected to the signal processing unit 200 through an external interface 410.

The signal processing unit 200 controls a voltage signal that is applied to the mirror device 20 (specifically, between the fixed comb electrode 281 and the movable comb electrode 282, and between the fixed comb electrode 283 and the movable comb electrode 284) by a high voltage generation circuit 401 (details thereof will be described later). For example, the high voltage generation circuit 401 is a high voltage IC (HVIC). In addition, the signal processing unit 200 outputs a digital signal for driving the second light source 7. The digital signal is converted into an analog signal by a digital-to-analog converter (DAC) 402, and is input to the second light source 7.

An analog signal output from the first light detector 6 is amplified by an amplifier 403, is converted into a digital signal by an analog-to-digital converter (ADC) 404, and is input to the signal processing unit 200. According to this, the signal processing unit 200 acquires the digital signal indicating an intensity of the interference light L1 of the measurement light. In addition, an analog signal output from the second light detector 8 is amplified by an amplifier 405, is converted into a digital signal by an ADC 406, and is input to the signal processing unit 200. According to this, the signal processing unit 200 acquires the digital signal indicating an intensity of the interference light L11 of the laser light.

The signal processing unit 200 includes a voltage signal control unit 201 and an intensity acquisition unit 202.

The voltage signal control unit 201 controls a voltage signal so that a voltage signal having a frequency for causing the movable mirror 22 to resonate in the mirror device 20 is applied to the mirror device 20. The voltage signal is output from the high voltage generation circuit 401 and is applied to the mirror device 20.

Figure 12:
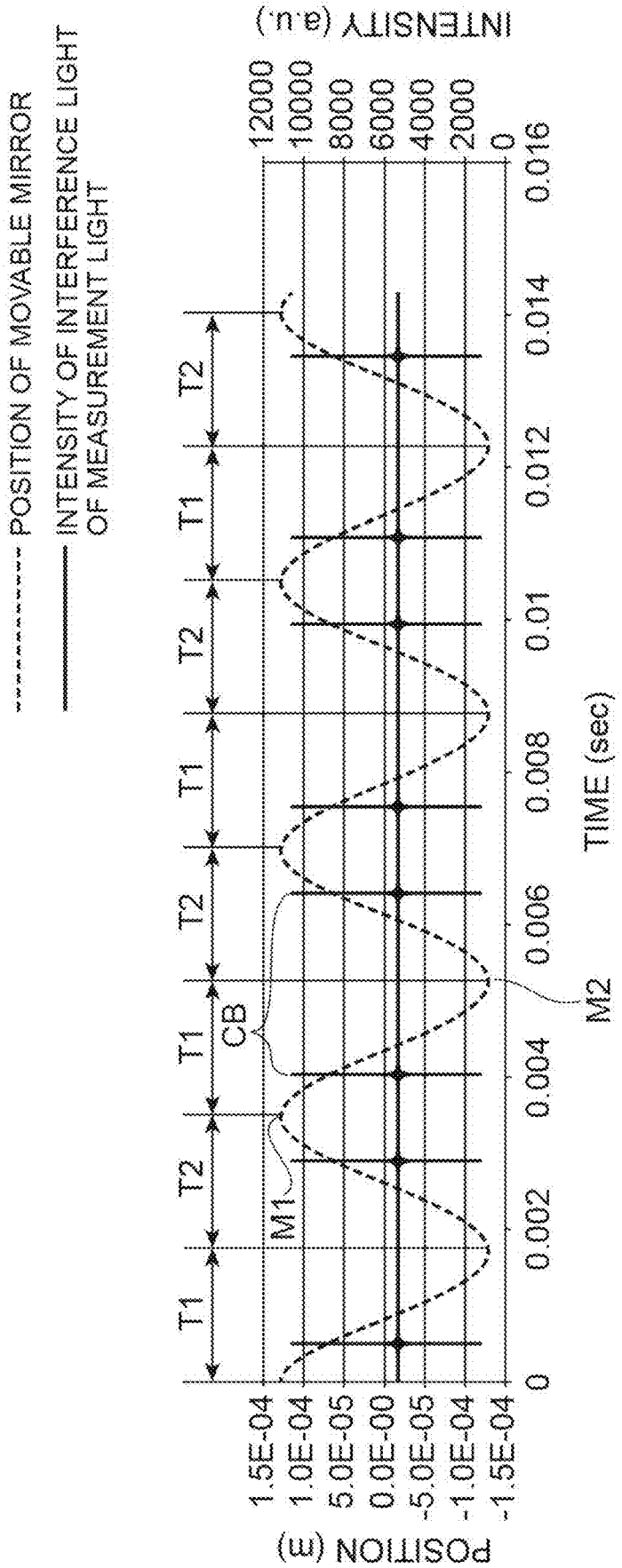
FIG. 12 is a graph illustrating a temporal variation of a position of a movable mirror that resonates, and a temporal variation of the intensity of interference light of measurement light.

Here, the voltage signal control will be described in detail. As a premise, in the optical module 1A, as illustrated in FIG. 12, a temporal variation of a position of the movable mirror 22 (position of the movable mirror 22 in the Z-axis direction) that resonates becomes a sinusoidal shape. However, actually, the temporal variation of the position of the movable mirror 22 is not an ideal sinusoidal wave, and a waveform thereof tends to be different between a period T1 in which the movable mirror 22 moves in one direction (for example, a direction approaching the beam splitter unit 3) of reciprocation directions, and a period T2 in which the movable mirror 22 moves in the other direction (for example, a direction being spaced apart from the beam splitter unit 3) of the reciprocation directions. Here, it is desired to perform Fourier transformation type spectral analysis with respect to the intensity (interferogram) of the interference light L1 of the measurement light separately for the period T1 and the period T2.

Figure 13:
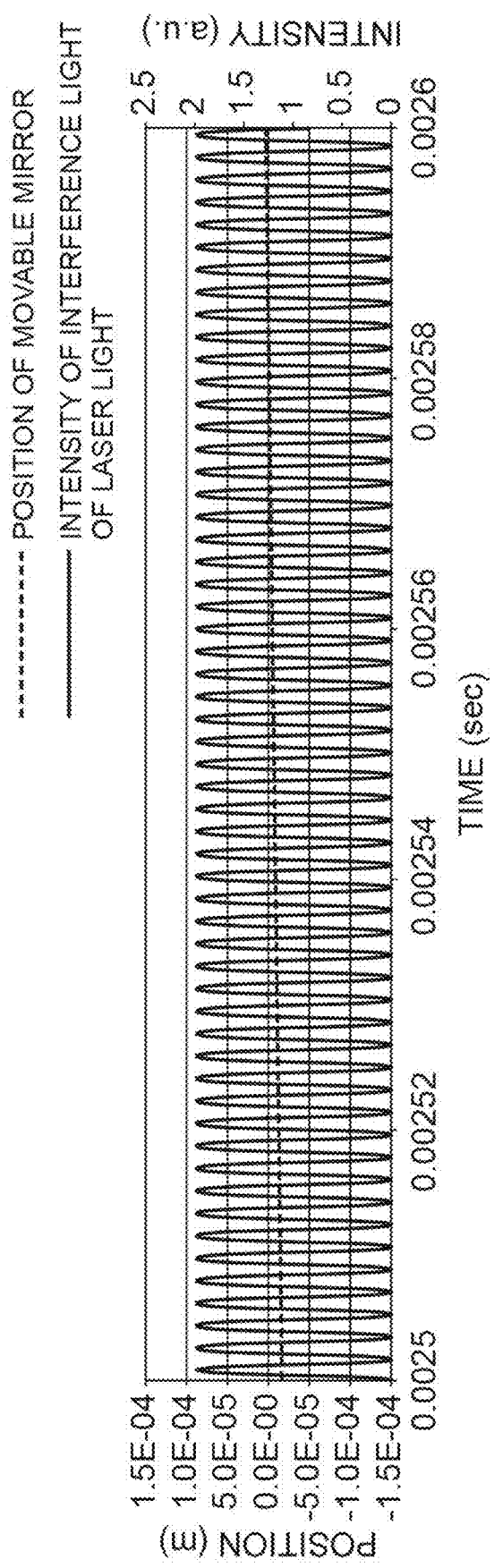
FIG. 13 is a graph illustrating a temporal variation of the position of the movable mirror that resonates, and a temporal variation of the intensity of interference light of laser light.

For the spectral analysis, it is desired to detect a timing of switching from the period T1 to the period T2, and a timing of switching from the period T2 to period T1. The timings correspond to a timing at which a maximum value M1 (for example, a position farthest from the beam splitter unit 3) appears and a timing at which a minimum value M2 (for example, a position closest to the beam splitter unit 3) appears in the temporal variation of the position of the movable mirror 22, and thus the timings at which the maximum value M1 and the minimum value M2 appear may be detected. However, as illustrated in FIG. 13, it is difficult to detect the timings at which the maximum value M1 and the minimum value M2 appear from the temporal variation of the intensity of the interference light L11 of the laser light due to a load on arithmetic operation or the like.

Note that, as illustrated in FIG. 12, a center burst (CB) in the temporal variation of the intensity of the interference light L1 of the measurement light appears in the first half of the period T1 and the second half of the period T2. The reason for this is that a zero optical path difference position C0 of the movable mirror 22 deviates from the central position C1 of the resonance operation of the movable mirror 22 to a side opposite to the beam splitter unit 3 as illustrated in FIG. 10.

Figure 14:
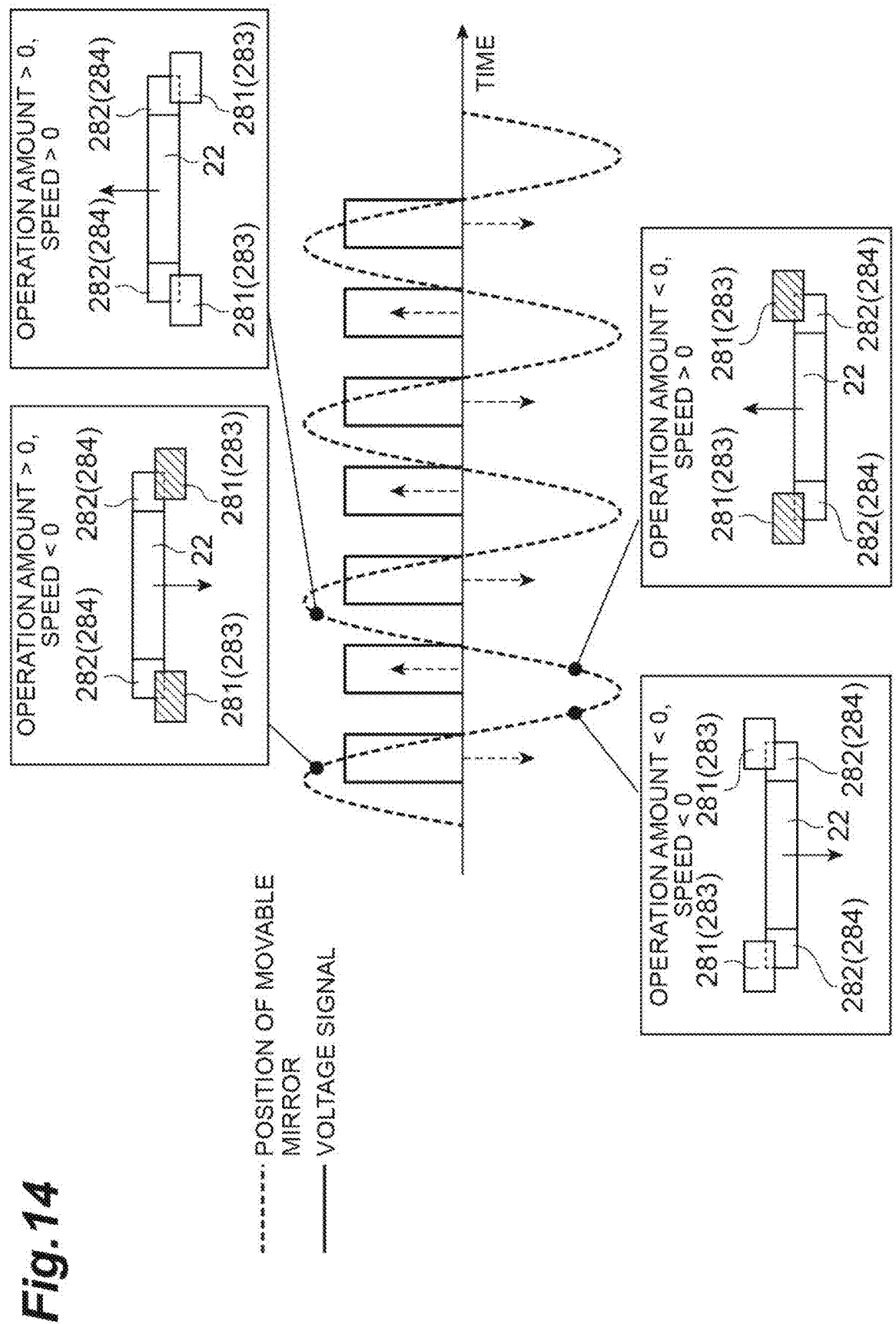
FIG. 14 is a graph illustrating the temporal variation of the position of the movable mirror that resonates, and a voltage signal.

On the basis of the premise, the voltage signal control unit 201 controls a voltage signal that is applied to the mirror device 20 so that the Fourier transformation type spectral analysis can be performed with respect to the intensity of the interference light L1 of the measurement light separately in the period T1 and the period T2. Specifically, the voltage signal control unit 201 controls the voltage signal so that the voltage signal has a frequency two times a resonance frequency of the movable mirror 22 as illustrated in FIG. 14. The voltage signal is a continuous pulse signal and is a rectangular wave having a duty ratio of 0.5 in this embodiment.

When the voltage signal having a frequency two times the resonance frequency of the movable mirror 22 is applied to the mirror device 20, a rising timing of the voltage signal matches the timings at which the maximum value M1 and the minimum value M2 appear as return positions of the movable mirror 22. Note that, in FIG. 14, a solid-line arrow represents a movement direction of the movable mirror 22, and a broken-line arrow represents a direction of a force that occurs in the movable mirror 22. In addition, a hatched fixed comb electrode 281 (283) represents a state in which a voltage is applied, and a non-hatched fixed comb electrode 281 (283) represents a state in which a voltage is not applied.

Figure 15:
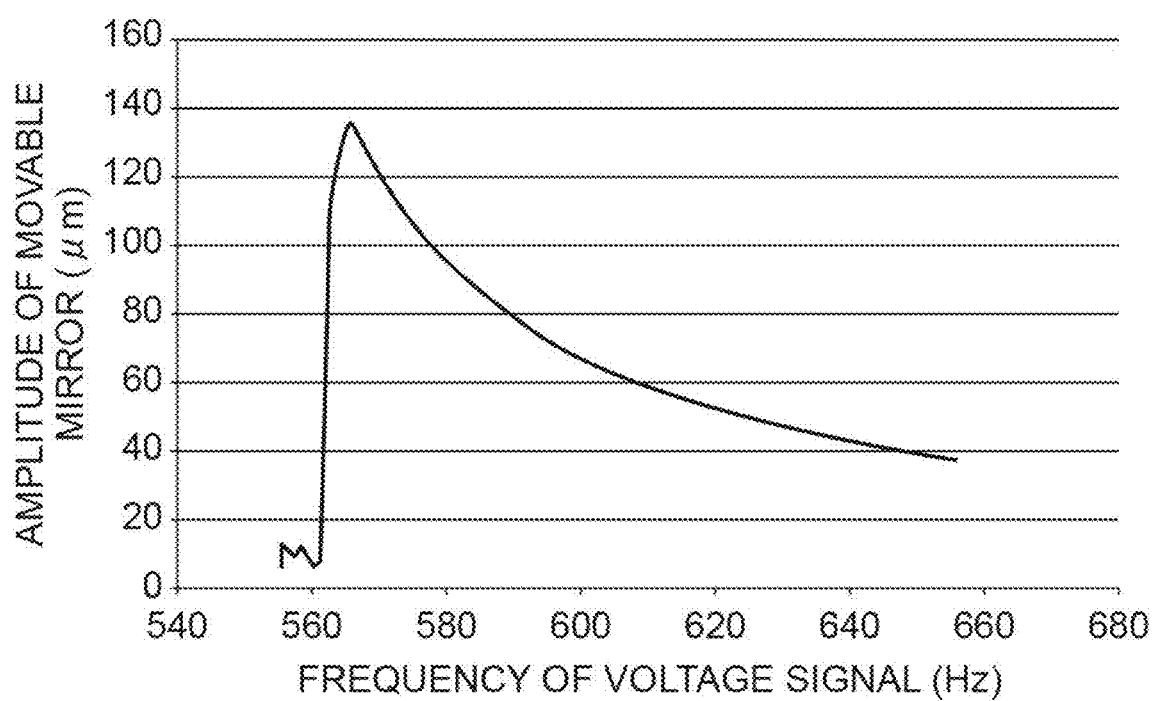
FIG. 15 is a graph illustrating a relationship between a frequency of the voltage signal and an amplitude of the movable mirror.

A relationship between the frequency of the voltage signal and an amplitude of the movable mirror 22 can be acquired by actually causing the mirror device 20 to operate. Note that, the relationship between the frequency of the voltage signal and the amplitude of the movable mirror 22 can be predicted, for example, by numerical analysis such as a Runge-Kutta method. In an example of the numerical analysis illustrated in FIG. 15, when the frequency of the voltage signal is set to 566 Hz, the amplitude of the movable mirror 22 becomes the maximum, and the movable mirror 22 resonates. In this manner, the frequency of the voltage signal for causing the movable mirror 22 to resonate in the mirror device 20 is acquired in advance by actual measurement, the numerical analysis, or the like.

Figure 16:
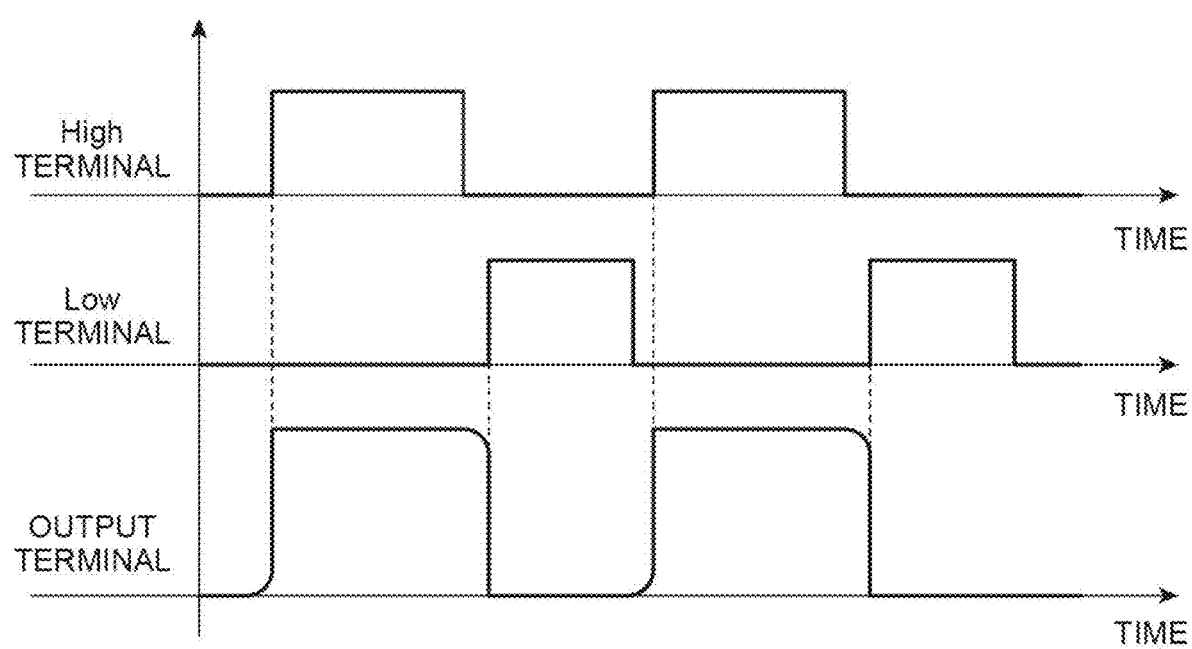
FIG. 16 is a graph illustrating a relationship between a rectangular wave that is input to each of a High terminal and a Low terminal of an HVIC, and a voltage signal output from an output terminal of the HVIC.

As an example, in a case where the high voltage generation circuit 401 is the HVIC, the voltage signal control unit 201 adjusts a timing of inputting a rectangular wave to each of a High terminal and a Low terminal of the HVIC with a clock divided from a quartz oscillator set as a reference clock to cause a voltage signal having a desired frequency to be output from an output terminal of the HVIC. As illustrated in FIG. 16, in the HVIC, a rising timing of a rectangular wave input to the High terminal becomes a rising timing of the voltage signal output from the output terminal, and a rising timing of a rectangular wave input to the Low terminal becomes a falling timing of the voltage signal output from the output terminal.

At the time of initiating an operation of the movable mirror 22, the voltage signal control unit 201 operates so that a voltage signal having a frequency two times the resonance frequency of the movable mirror 22 is applied to the mirror device 20 from the beginning Even in this case, since there is an influence such as a manufacturing error of the mirror device 20, when waiting reciprocation of the movable mirror 22 for a predetermined number of times (for example, 50 times), it is possible to cause the movable mirror 22 to resonate. Note that, at the time of initiating the operation of the movable mirror 22, the voltage signal control unit 201 may operate so that the voltage signal that finally has the frequency two times the resonance frequency of the movable mirror 22 is applied to the mirror device 20 by reducing the frequency of the voltage signal whenever the movable mirror 22 reciprocates for a predetermined number of times (for example, four times).

Figure 17:
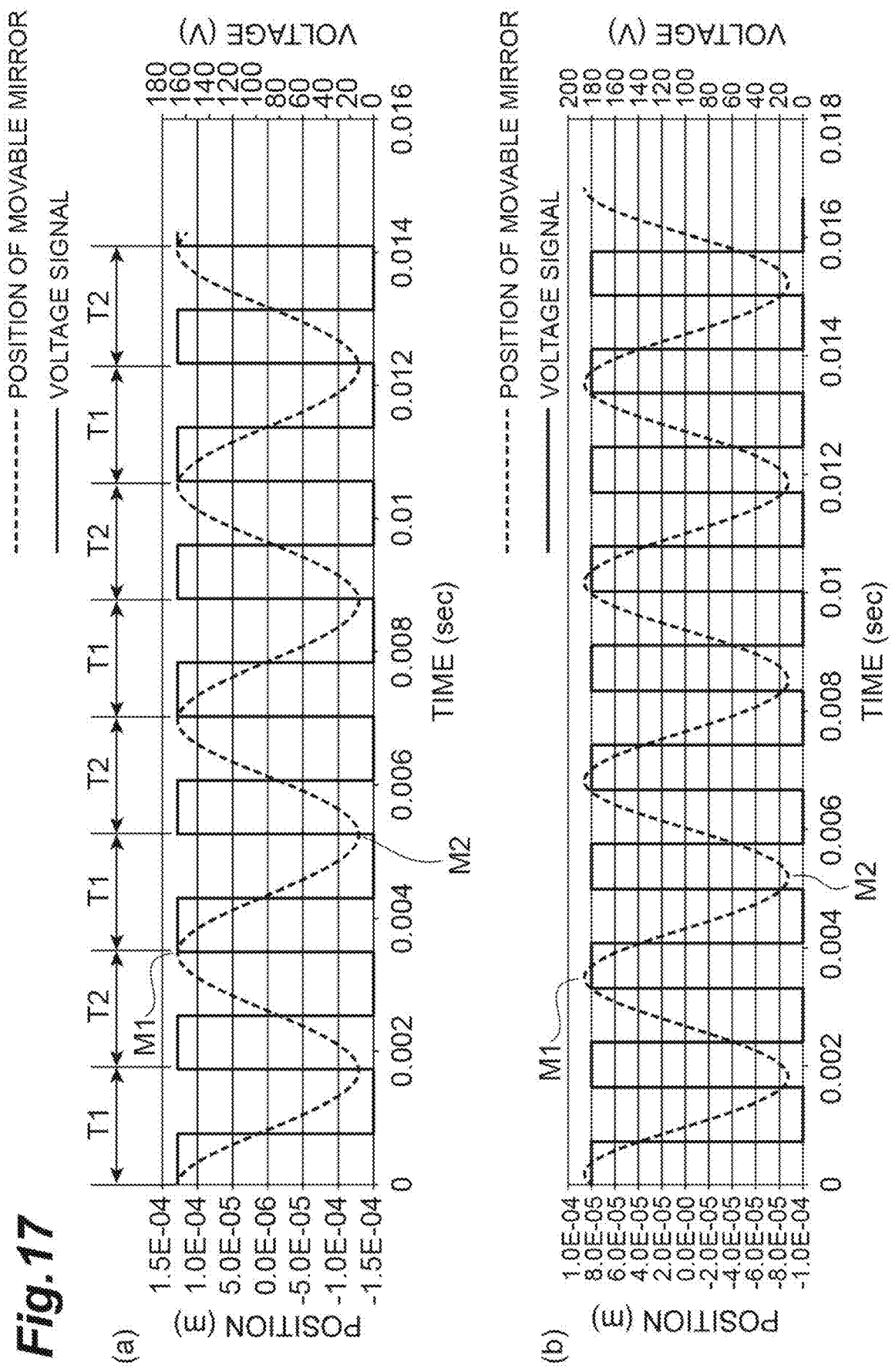
FIG. 17 is a graph illustrating the temporal variation of the position of the movable mirror that resonates, and a voltage signal.
  (a) of FIG. 18 is a graph illustrating the temporal variation of the intensity of interference light of measurement light and (b) of FIG. 18 is a graph illustrating the temporal variation of the intensity of the interference light of laser light.
  (a) of FIG. 19 is graph illustrating the temporal variation of the intensity of the interference light of the measurement light and voltage logic, and (b) of FIG. 19 is a graph illustrating the temporal variation of the intensity of the interference light of the laser light, and voltage logic.
  (a) of FIG. 20 is a graph illustrating the temporal variation of the intensity of the interference light of the measurement light, and LSB logic, and (b) of FIG. 20 is a graph illustrating the temporal variation of the intensity of the interference light of the laser light, and the LSB logic.

When the resonance operation of the movable mirror 22 is initiated, as illustrated in (a) of FIG. 17, the rising timing of the voltage signal matches timings at which the maximum value M1 and the minimum value M2 appear in a temporal variation of the position of the movable mirror 22 as long as the voltage signal having the frequency two times the resonance frequency of the movable mirror 22 is applied to the mirror device 20. Accordingly, when the rising timing of the voltage signal is set as a reference, the period T1 in which the movable mirror 22 moves in one direction of the reciprocation directions and the period T2 in which the movable mirror 22 moves in the other direction of the reciprocation directions can be distinguished, and as a result, the Fourier transformation type spectral analysis can be performed with respect to the intensity of the interference light L1 of the measurement light separately for the period T1 and the period T2. Note that, when the frequency of the voltage signal deviates from a value two times the resonance frequency of the movable mirror 22, as illustrated in (b) of FIG. 17, the rising timing of the voltage signal does not match the timings at which the maximum value M1 and the minimum value M2 appear in the temporal variation of the position of the movable mirror 22.

The intensity acquisition unit 202 (refer to FIG. 11) performs a first intensity acquisition process and a second intensity acquisition process. Hereinafter, the first intensity acquisition process and the second intensity acquisition process will be described in detail.

Figure 18:
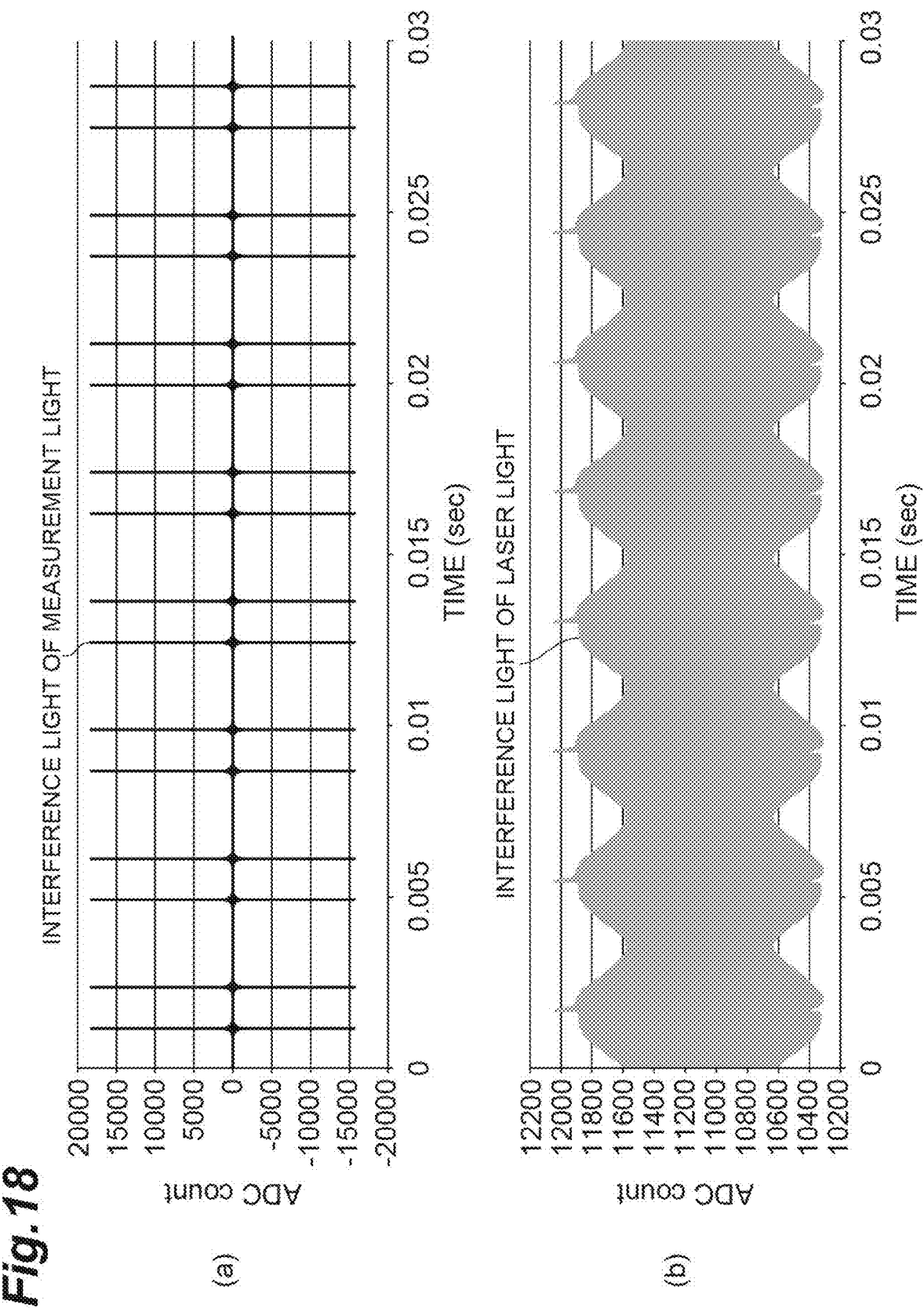
Figure 19:
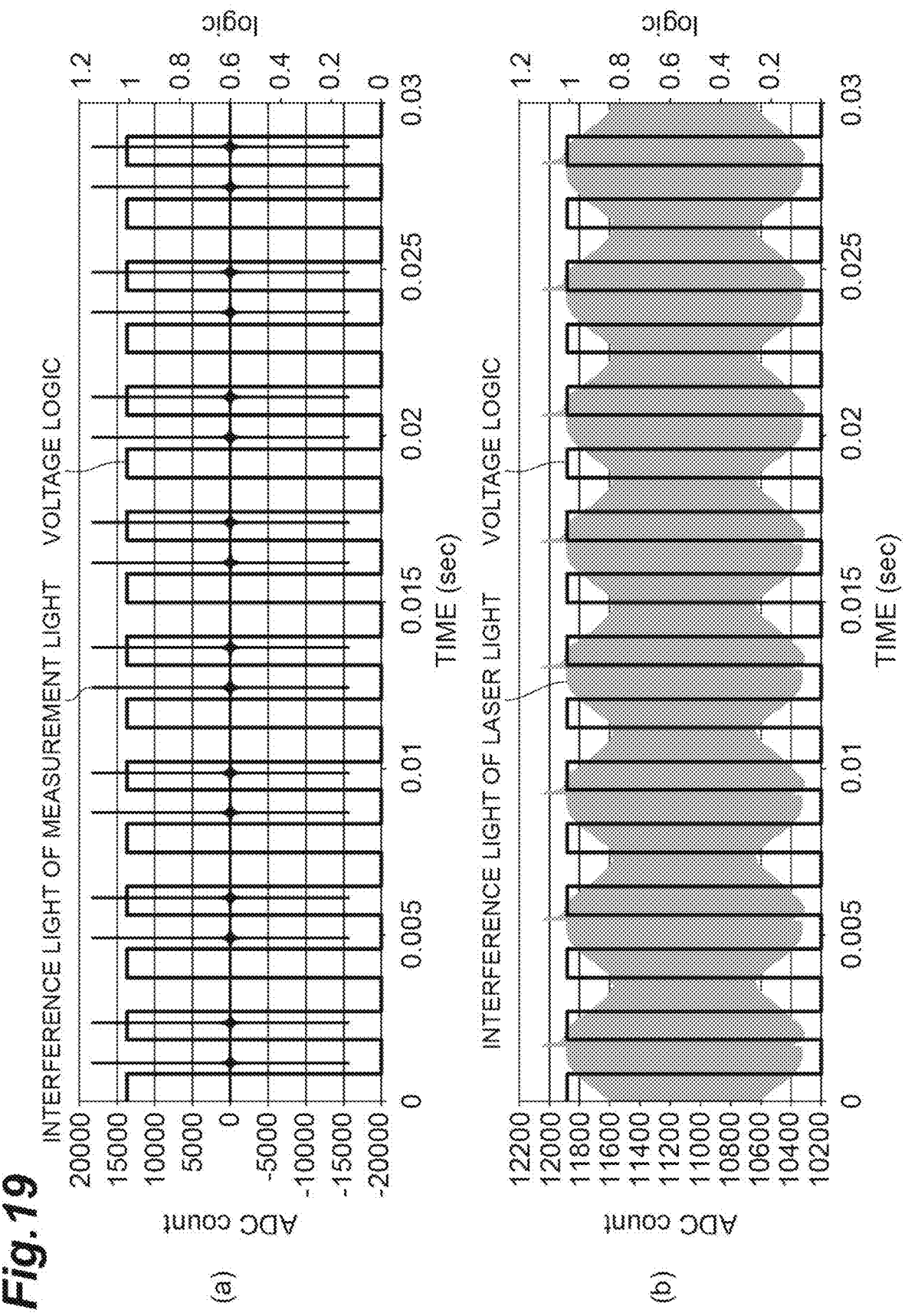
Figure 20:
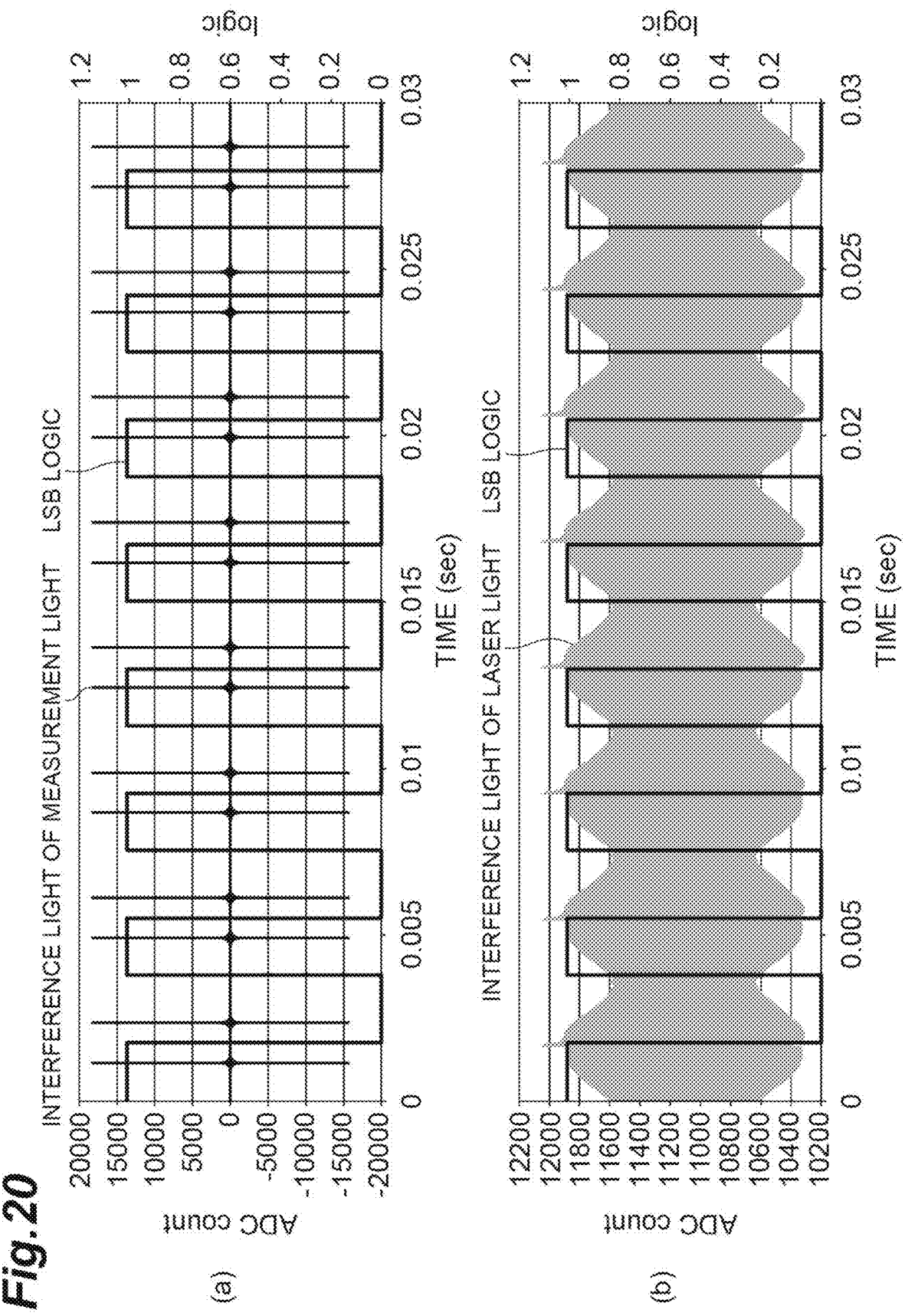

First, in a period corresponding to P cycles (P is an integer of four or greater) continuous in the voltage signal, the intensity acquisition unit 202 acquires the intensity of the interference light L1 of the measurement light as illustrated in (a) of FIG. 18, (a) of FIG. 19, and (a) of FIG. 20, and acquires the intensity of the interference light L11 of the laser light as illustrated in (b) of FIG. 18, (b) of FIG. 19, and (b) of FIG. 20. In the examples illustrated in (a) of FIG. 18, (a) of FIG. 19, and (a) of FIG. 20, the intensity of the interference light L1 of the measurement light is shown as "ADC count" output from the ADC 404 (refer to FIG. 11), and in the examples illustrated in (b) of FIG. 18, (b) of FIG. 19, and (b) of FIG. 20, the intensity of the interference light L11 of the laser light is shown as "ADC count" output from the ADC 406 (refer to FIG. 11). The intensity acquisition unit 202 acquires intensity data in a period corresponding to P cycles (16 cycles in the examples illustrated in (a) and (b) of FIG. 18, (a) and (b) of FIG. 19, and (a) and (b) of FIG. 20) with a signal input from the PC 500 set as a trigger.

(a) of FIG. 19 is a graph illustrating a temporal variation of the intensity of the interference light L1 of the measurement light, and a voltage logic, and (b) of FIG. 19 is a graph illustrating a temporal variation of the intensity of the interference light L11 of the laser light, and a voltage logic. The voltage logic is a logic signal that can be used by the voltage signal control unit 201 to generate a voltage signal. "0" of the voltage logic corresponds to a Low level of the voltage signal, and "1" of the voltage logic corresponds to a High level of the voltage signal.

(a) of FIG. 20 is a graph illustrating a temporal variation of the intensity of the interference light L1 of the measurement light, and a least significant bit (LSB) logic, and (b) of FIG. 20 is a graph illustrating a temporal variation of the intensity of the interference light L11 of the laser light and a LSB logic. The LSB logic is a logic signal that can be used by the intensity acquisition unit 202 to distinguish the period T1 in which the movable mirror 22 moves in one direction of the reciprocation directions, and the period T2 in which the movable mirror 22 moves in the other direction of the reciprocation directions. As described above, since the rising timing of the voltage signal matches the timings at which the maximum value M1 and the minimum value M2 appear as return positions of the movable mirror 22, the intensity data in a case where the LSB logic is "0" corresponds to the intensity data in the period T1, and the intensity data in a case where the LSB logic is "1" corresponds to the intensity data in the period T2. The signal processing unit 200 counts the number of cycles of the voltage logic and generates the LSB logic by using one bit.

Figure 21:
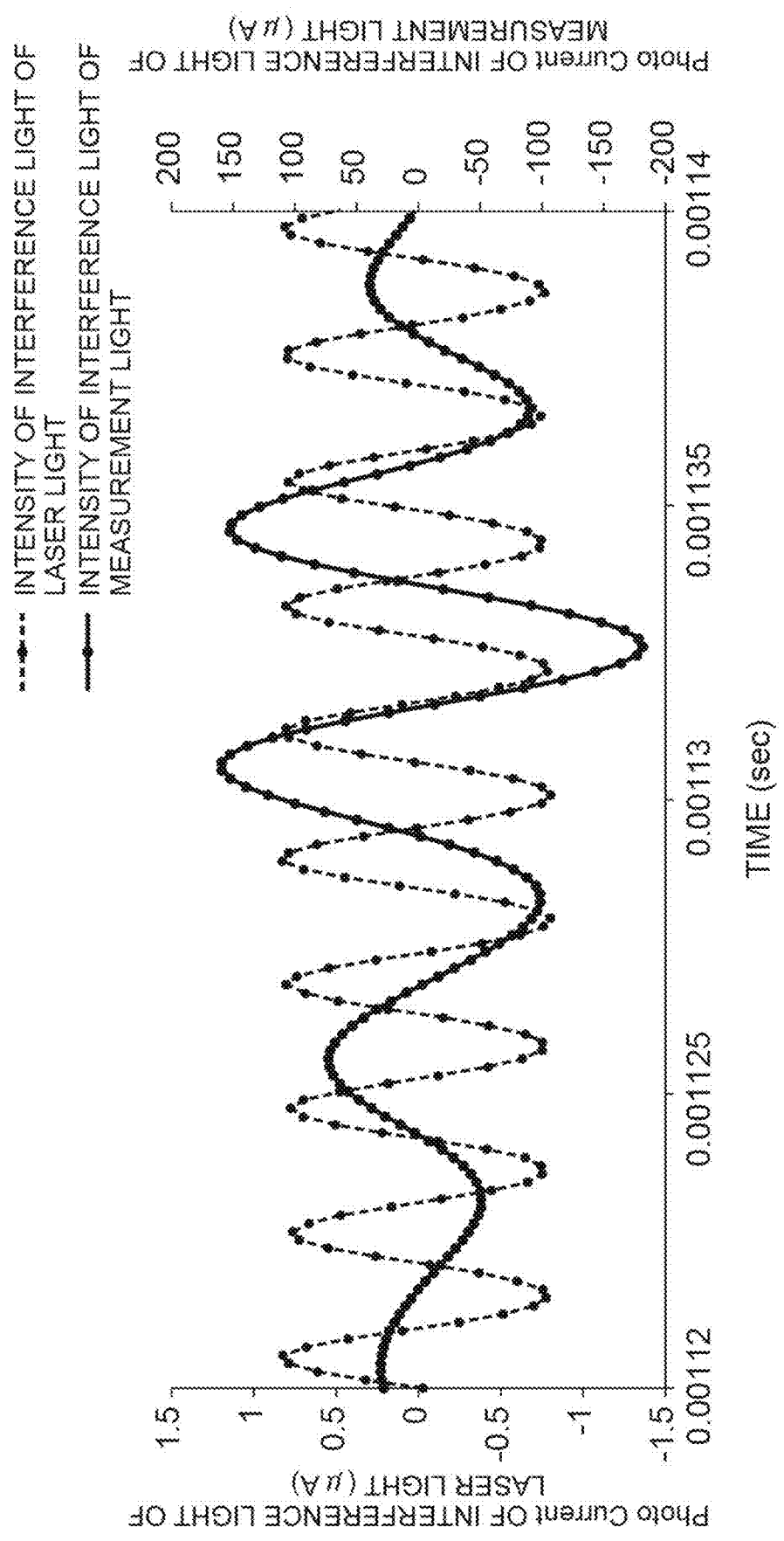
FIG. 21 is a graph illustrating the temporal variation of the intensity of the interference light of the measurement light, and the temporal variation of the intensity of the interference light of the laser light.

The intensity acquisition unit 202 acquires the intensity of the interference light L1 of the measurement light at a first time interval in a period corresponding to the P cycles continuous in the voltage signal, and acquires the intensity of the interference light L11 of the laser light at a second time interval. At this time, for example, the intensity acquisition unit 202 sets rising of the voltage signal as a reference in each cycle of the voltage signal. In a case where the intensity acquisition unit 202 acquires the intensity of the interference light L1 of the measurement light from the ADC 404 M times (M is an integer of two or greater) in each of the periods T1 and T2, the first time interval becomes a value obtained by dividing one cycle of the voltage signal by M. In a case where the intensity acquisition unit 202 acquires the intensity of the interference light L11 of the laser light from the ADC 406 N times (N is an integer of two or greater) in each of the periods T1 and T2, the second time interval becomes a value obtained by dividing one cycle of the voltage signal by N. However, in a case where the intensity of the interference light L1 of the measurement light is not acquired from the ADC 404 at the rising timing of the voltage signal, the first time interval becomes a value obtained by dividing one cycle of the voltage signal by M+1. Similarly, in a case where the intensity of the interference light L11 of the laser light is not acquired from the ADC 406 at the rising timing of the voltage signal, the second time interval becomes a value obtained by dividing one cycle of the voltage signal by N+1. That is, the first time interval is set on the basis of the length of one cycle of the voltage signal and the number of times of intensity acquisition of the interference light L1 of the measurement light, and the second time interval is set on the basis of the length of one cycle of the voltage signal and the number of times of intensity acquisition of the interference light L11 of the laser light. In this manner, the first time interval and the second time interval are set on the basis of the frequency of the voltage signal. In this embodiment, as illustrated in FIG. 21, the first time interval and the second time interval are the same time interval (that is, "M=N"). Note that, in FIG. 21, points on a solid line represent the intensity of the interference light L1 of the measurement light which is acquired at the first time interval (that is, intensity data output from the ADC 404 at the first time interval), and points on a broken line represent the intensity of the interference light L11 of the laser light which is acquired at the second time interval that is the same as the first time interval (that is, intensity data output from the ADC 406 at the second time interval that is the same as the first time interval).

As described above, the intensity acquisition unit 202 acquires the intensity of the interference light L1 of the measurement light M times at the first time interval as a first measurement light intensity in each of odd-numbered cycles among the P cycles continuous in the voltage signal, and acquires the intensity of the interference light L11 of the laser light N times at the second time interval as a first laser light intensity in each of the odd-numbered cycles. In addition, the intensity acquisition unit 202 acquires the intensity of the interference light L1 of the measurement light M times at the first time interval as a second measurement light intensity in each of even-numbered cycles among the P cycles continuous in the voltage signal, and acquires the intensity of the interference light L11 of the laser light N times at the second time interval in each of the even-numbered cycles as a second laser light intensity. In the examples illustrated in (a) and (b) of FIG. 19, and (a) and (b) of FIG. 20, the odd-numbered cycles are cycles in which the LSB logic is shown as "1", and which correspond to the period T2, and the even-numbered cycles are cycles in which the LSB logic is shown as "0", and which correspond to the period T1.

When acquiring the first measurement light intensity and the first laser light intensity in each of the odd-numbered cycles, the intensity acquisition unit 202 acquires an average value of a plurality of the first measurement light intensities mutually corresponding for the same number of times and acquires an average value of a plurality of the first laser light intensities mutually corresponding for the same number of times (a first intensity acquisition process). In addition, when acquiring the second measurement light intensity and the second laser light intensity in each of the even-numbered cycles, the intensity acquisition unit 202 acquires an average value of a plurality of the second measurement light intensities mutually corresponding for the same number of times and acquires an average value of a plurality of the second laser light intensities mutually corresponding for the same number of times (a second intensity acquisition process). Note that, the plurality of first measurement light intensities mutually corresponding for the same number of times represent a plurality of the first measurement light intensities acquired for the same number of times through counting from the rising of the voltage signal in each of the odd-numbered cycles, and the plurality of first laser light intensities mutually corresponding for the same number of times represent a plurality of the first laser light intensities acquired for the same number of times through counting from the rising of the voltage signal in each of the odd-numbered cycles. Similarly, the plurality of second measurement light intensities mutually corresponding for the same number of times represent a plurality of the second measurement light intensities acquired for the same number of times through counting from the rising of the voltage signal in each of the even-numbered cycles, and the plurality of second laser light intensities mutually corresponding for the same number of times represent a plurality of the second laser light intensities acquired for the same number of times through counting from the rising of the voltage signal in each of the even-numbered cycles.

Figure 22:
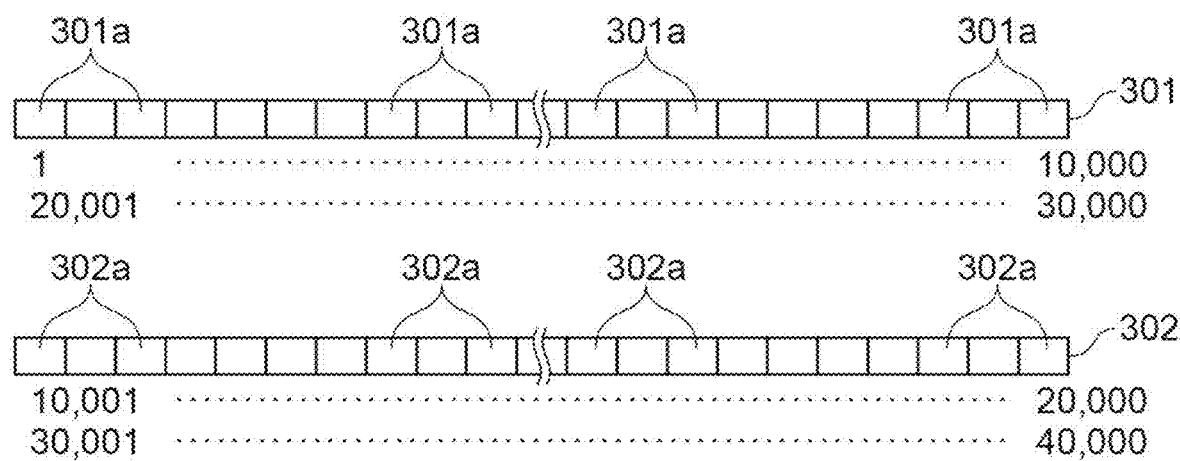
FIG. 22 is a block diagram illustrating a configuration of a storage unit illustrated in FIG. 11.

As illustrated in FIG. 22, in the case of performing the first intensity acquisition process, the intensity acquisition unit 202 stores each of the first measurement light intensity and the first laser light intensity acquired in each of the odd-numbered cycles among the P cycles in a first storage region 301 provided in the storage unit 300. The first storage region 301 is a region that stores values obtained by integrating each of the first measurement light intensity and the first laser light intensity acquired in each of the odd-numbered cycles among the P cycles for every one cycle in a case where the first intensity acquisition process is performed. That is, the first storage region 301 is a region that stores the first measurement light intensity acquired in each of the odd-numbered cycles among the P cycles after integration for every first measurement light intensities mutually corresponding for the same number of times, and stores the first laser light intensity acquired in each of the odd-numbered cycles after integration for every first laser light intensities mutually corresponding for the same number of times. Note that, the first storage region 301 may be a region that stores the first measurement light intensity acquired in each of the odd-numbered cycles among the P cycles after averaging for every first measurement light intensities mutually corresponding for the same number of times, and stores the first laser light intensity acquired in each of the odd-numbered cycles after averaging for every first laser light intensities mutually corresponding for the same number of times.

In the case of performing the second intensity acquisition process, the intensity acquisition unit 202 stores each of the second measurement light intensity and the second laser light intensity acquired in each of the even-numbered cycles among the P cycles in a second storage region 302 provided in the storage unit 300. The second storage region 302 is a region that stores values obtained by integrating each of the second measurement light intensity and the second laser light intensity acquired in each of the even-numbered cycles among the P cycles for every one cycle in a case where the second intensity acquisition process is performed. That is, the second storage region 302 is a region that stores the second measurement light intensity acquired in each of the even-numbered cycles among the P cycles after integration for every first measurement light intensities mutually corresponding for the same number of times, and stores the second laser light intensity acquired in each of the even-numbered cycles after integration for every second laser light intensities mutually corresponding for the same number of times. Note that, the second storage region 302 may be a region that stores the second measurement light intensity acquired in each of the even-numbered cycles among the P cycles after averaging for every second measurement light intensities mutually corresponding for the same number of times, and stores the second laser light intensity acquired in each of the even-numbered cycles after averaging for every second laser light intensities mutually corresponding for the same number of times.

As an example, in a case where a sampling frequency of the ADC 404 is 5 MHz, a resonance frequency of the movable mirror is 250 Hz, and a frequency of the voltage signal is 500 Hz, the number of times of acquiring the intensity data (data indicating the intensity of the interference light L1 of the measurement light) from the ADC 404 in each of the periods T1 and T2 is 10,000 times ($=(5\times10^6)/500$). Accordingly, as illustrated in FIG. 22, pieces of intensity data from first time to $10000^{th}$ time are stored in respective addresses 301a of the first storage region 301, and pieces of intensity data from $10001^{st}$ time to $20000^{th}$ time are stored in respective addresses 302a of the second storage region 302. Then, storing in respective addresses 301a of the first storage region 301 and storing in respective addresses 301a of the first storage region 301 are repeated alternately until the P cycles are terminated. In a case where the number of bits of the ADC 404 is 16 bits, and when storing the intensity data after integration as described above, the size of each of the addresses 301a becomes "16 bits×the number of times of integration". On the other hand, in a case where the number of bits of the ADC 404 is 16 bits, and when storing the intensity data after averaging as described above, the size of the address 301a becomes 16 bits. The above description is also true of the intensity data (data indicating the intensity of the interference light L11 of the laser light) acquired from the ADC 406.

Figure 23:
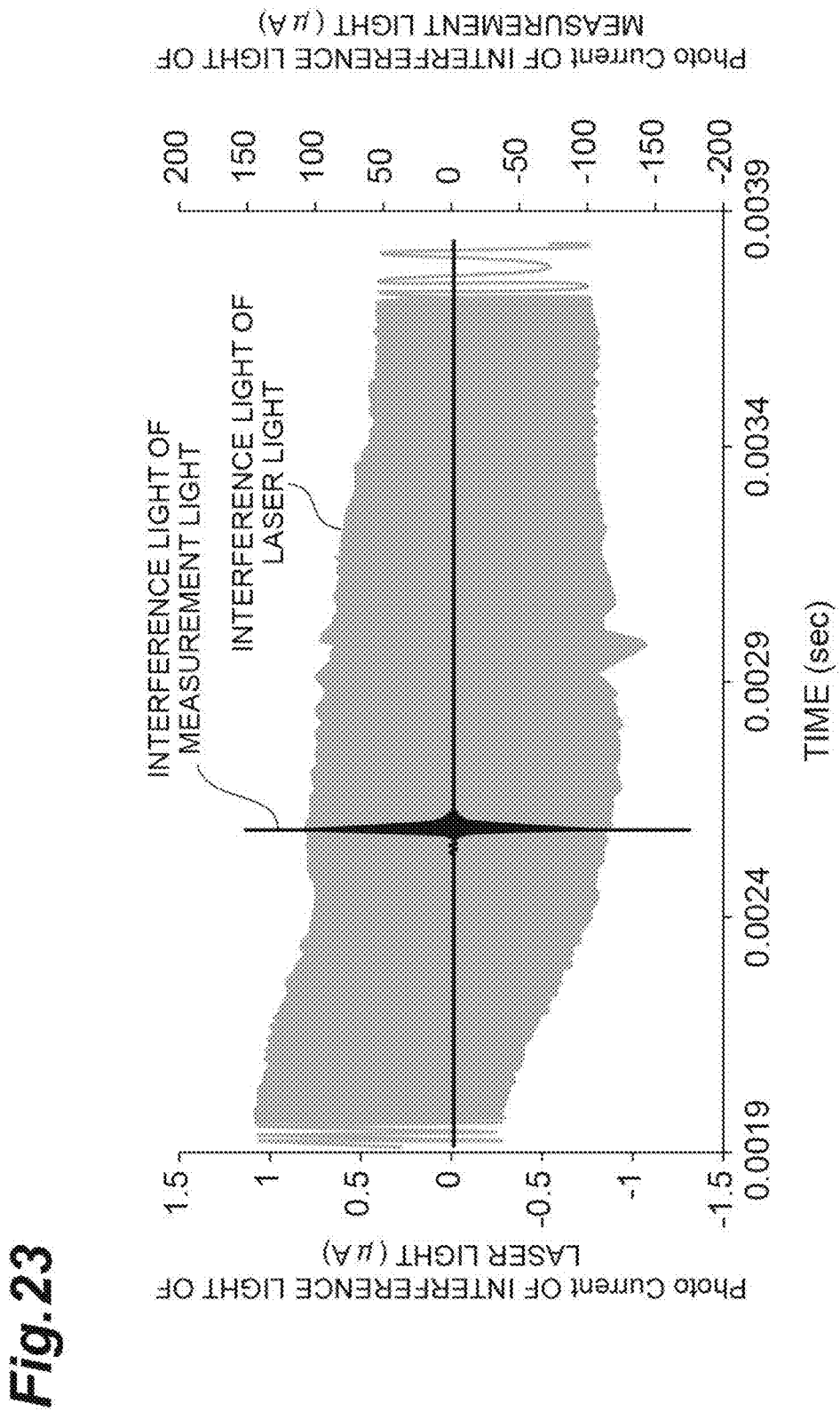
FIG. 23 is a graph illustrating a temporal variation of an average value of first measurement light intensity, and a temporal variation of an average value of first laser light intensity.
Figure 24:
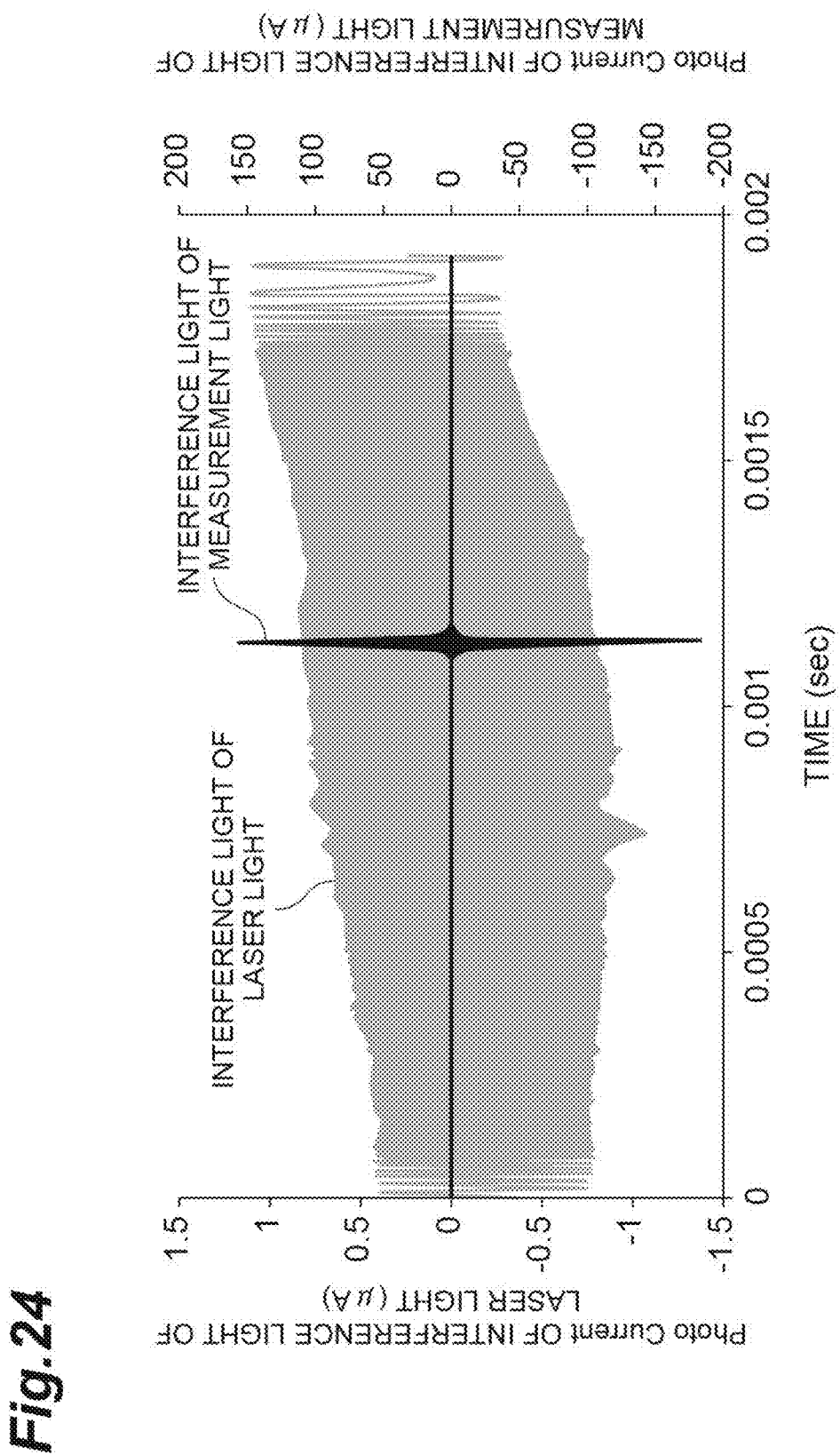
FIG. 24 is a graph illustrating a temporal variation of an average value of second measurement light intensity, and a temporal variation of an average value of second laser light intensity with respect to odd-numbered cycles.

As described above, since the intensity acquisition unit 202 performs the second intensity acquisition process, as illustrated in FIG. 23, with respect to even-numbered cycles (cycles in which the LSB logic is shown as "0", and which correspond to the period T1), a temporal variation of an average value of the first measurement light intensity and a temporal variation of an average value of the first laser light intensity are acquired. In addition, since the intensity acquisition unit 202 performs the first intensity acquisition process, as illustrated in FIG. 24, with respect to odd-numbered cycles (cycles in which the LSB logic is shown as "1", and which correspond to the period T2), a temporal variation of an average value of the second measurement light intensity and a temporal variation of an average value of the second laser light intensity are acquired.

When the first intensity acquisition process and the second intensity acquisition process are terminated, the intensity acquisition unit 202 outputs pieces of data indicating the temporal variation of the average value of the first measurement light intensity, the temporal variation of the average value of the first laser light intensity, the temporal variation of the average value of the second measurement light intensity, and the temporal variation of the average value of the second laser light intensity to the PC 500 (refer to FIG. 11).

When acquiring the pieces of data, the PC 500 performs a first spectrum acquisition process and a second spectrum acquisition process. Hereinafter, the first spectrum acquisition process and the second spectrum acquisition process will be described in detail.

Figure 25:
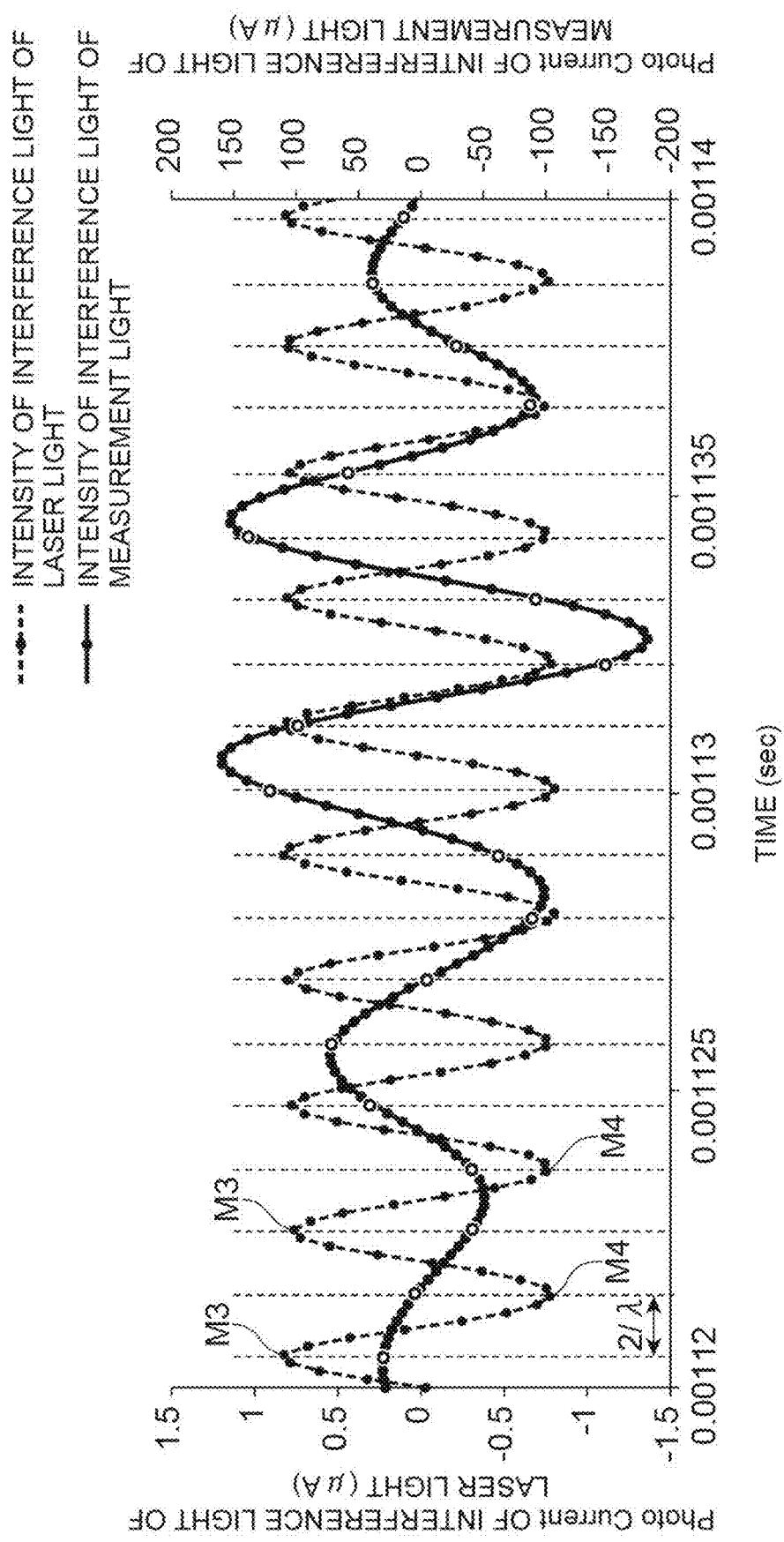
FIG. 25 is a graph illustrating a part of the temporal variation illustrated in FIG. 23.
Figure 26:
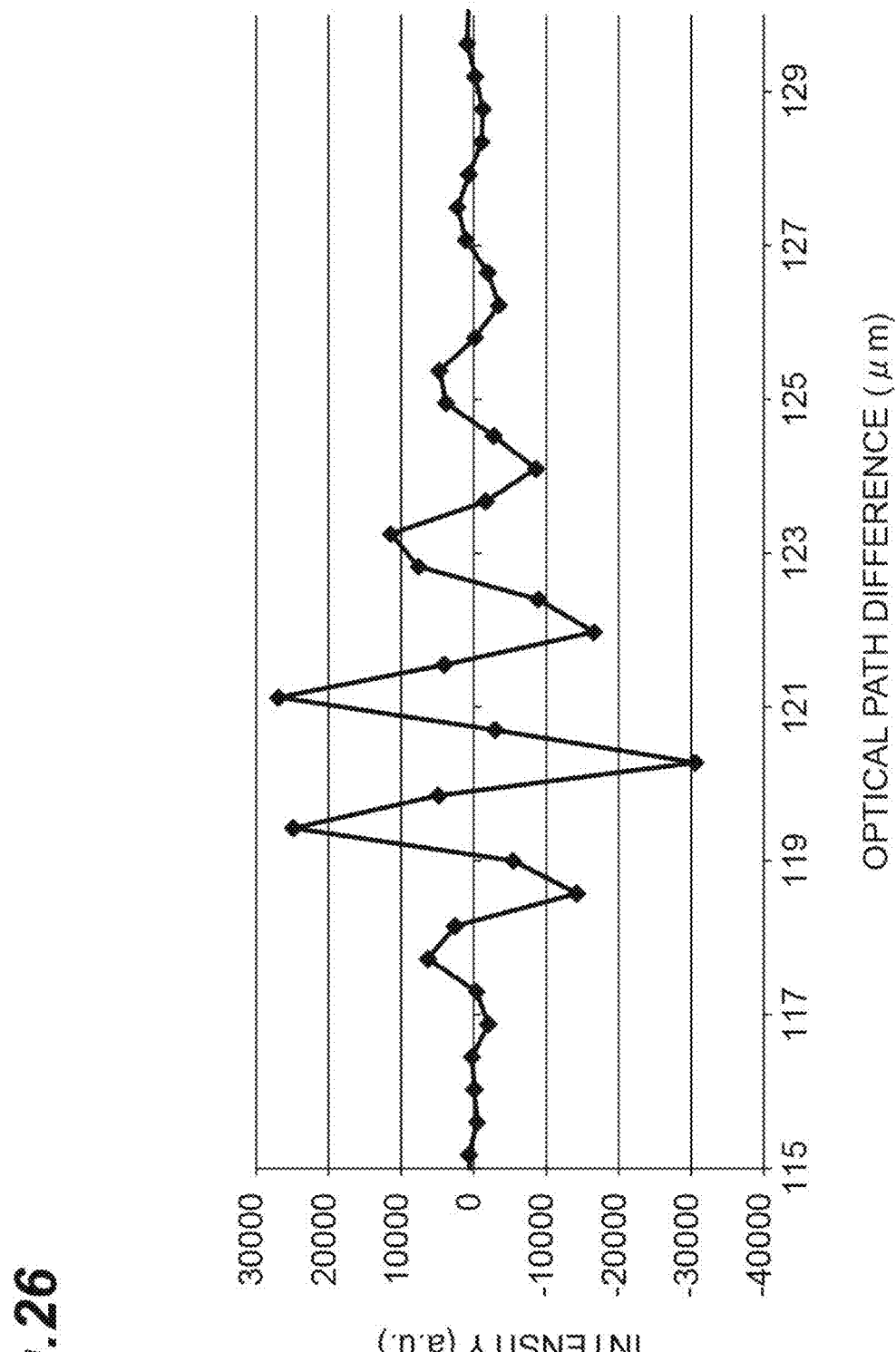
FIG. 26 is a graph illustrating a relationship between an optical path difference and a first intensity value.

As illustrated in FIG. 25, the PC 500 acquires a first intensity value (in FIG. 25, white dots) at a timing at which a maximum value M3 and a minimum value M4 appear in the temporal variation of the average value (in FIG. 25, the intensity of the interference light L of the laser light) of the first laser light intensity from the temporal variation of the average value (in FIG. 25, the intensity of the interference light of the measurement light) of the first measurement light intensity. The PC 500 acquires the maximum value M3, the minimum value M4, and the first intensity value by arithmetic operation. Next, the PC 500 acquires a relationship between an optical path difference (a difference between the optical path length between the first mirror surface 31 of the beam splitter unit 3 and the mirror surface 22a of the movable mirror 22, and the optical path length between the first mirror surface 31 of the beam splitter unit 3 and the mirror surface 16a of the fixed mirror 16), and the first intensity value on the basis of the wavelength of the laser light L10 as illustrated in FIG. 26, and acquires a spectrum of the measurement light L0 by Fourier transformation as illustrated in (a) of FIG. 27 (a first spectrum acquisition process). In the first spectrum acquisition process, a spectrum of the measurement light L0 in a case where the movable mirror 22 moves in one direction of the reciprocation directions is acquired.

Similarly, the PC 500 acquires a second intensity value at a timing at which a maximum value and a minimum value appear in the temporal variation of the average value of the second laser light intensity from the temporal variation of the average value of the second measurement light intensity. Next, the PC 500 acquires a relationship between the optical path difference and the second intensity value on the basis of the wavelength of the laser light L10 and acquires a spectrum of the measurement light by Fourier transformation as illustrated in (b) of FIG. 27 (a second spectrum acquisition process). In the second spectrum acquisition process, a spectrum of the measurement light L0 in a case where the movable mirror 22 moves in the other direction of the reciprocation directions is acquired.

Note that, in the first spectrum acquisition process, the first intensity value at a timing at which the maximum value or the minimum value appears in the temporal variation of the average value of the first laser light intensity may be acquired from the temporal variation of the average value of the first measurement light intensity, the relationship between the optical path difference and the first intensity value may be acquired on the basis of the wavelength of the laser light L10, and the spectrum of the measurement light L0 may be acquired by the Fourier transformation. Similarly, in the second spectrum acquisition process, the second intensity value at a timing at which the maximum value or the minimum value appears in the temporal variation of the average value of the second laser light intensity may be acquired from the temporal variation of the average value of the second measurement light intensity, the relationship between the optical path difference and the second intensity value may be acquired on the basis of the wavelength of the laser light L10, and the spectrum of the measurement light L0 may be acquired by the Fourier transformation. In addition, in the first spectrum acquisition process, the first intensity value at a timing at which an intermediate value (an intermediate value between the maximum value and the minimum value which are continuous) appears in the temporal variation of the average value of the first laser light intensity may be acquired, and the first intensity value may be used in acquisition of the spectrum of the measurement light L0. Similarly, in the second spectrum acquisition process, the second intensity value at a timing at which an intermediate value (an intermediate value between the maximum value and the minimum value which are continuous) appears in the temporal variation of the average value of the second laser light intensity may be acquired, and the second intensity value may be used in acquisition of the spectrum of the measurement light L0.

As described above, in the optical module 1A, the following signal processing method is carried out. The signal processing method includes a step of controlling a voltage signal so that a voltage signal having a frequency for causing the movable mirror 22 to resonate is applied to the mirror device 20, and a step of performing the first intensity acquisition process and the second intensity acquisition process. In addition, in the optical module 1A and the PC 500, the following signal processing method is carried out. The signal processing method includes a step of controlling a voltage signal so that a voltage signal having a frequency for causing the movable mirror 22 to resonate is applied to the mirror device 20, a step of performing the first intensity acquisition process and the second intensity acquisition process, and a step of performing the first spectrum acquisition process and the second spectrum acquisition process.

[Operation and Effect]

In the optical module 1A, a voltage signal is controlled so that a voltage signal having a frequency for causing the movable mirror 22 to resonate is applied to the mirror device 20. The frequency of the voltage signal ideally becomes a value two times the resonance frequency of the movable mirror 22. Accordingly, when acquiring the intensity of the interference light L1 of the measurement light M times at the first time interval based on the frequency of the voltage signal as the first measurement light intensity in each of the plurality of odd-numbered cycles among the P cycles continuous in the voltage signal, and acquiring an average value of a plurality of the first measurement light intensities mutually corresponding for the same number of times, the average value of the first measurement light intensities can be easily and accurately acquired for every same position in a case where the movable mirror 22 moves in one direction of the reciprocation directions. Similarly, when acquiring the intensity of the interference light L11 of the laser light N times at the second time interval based on the frequency of the voltage signal as the first laser light intensity in each of the odd-numbered cycles, and acquiring an average value of a plurality of the first laser light intensities mutually corresponding for the same number of times, the average value of the first laser light intensities can be easily and accurately acquired for every same position in a case where the movable mirror 22 moves in one direction of the reciprocation directions. In addition, when acquiring the intensity of the interference light L1 of the measurement light M times at the first time interval as the second measurement light intensity in each of the even-numbered cycles among the P cycles continuous in the voltage signal, and acquiring the average value of a plurality of the second measurement light intensities mutually corresponding for the same number of times, the average value of the second measurement light intensity can be easily and accurately acquired for every same position in a case where the movable mirror 22 moves in the other direction of the reciprocation directions. Similarly, when acquiring the intensity of the interference light L11 of the laser light N times at the second time interval as the second laser light intensity in each of the even-numbered cycles, and acquiring the average value of a plurality of the second laser light intensities mutually corresponding for the same number of times, the average value of the second laser light intensities can be easily and accurately acquired for every same position in a case where the movable mirror 22 moves in the other direction of the reciprocation directions. Accordingly, the optical module 1A can perform the Fourier transformation type spectral analysis in a short time.

As described above, there is a tendency that the temporal variation of the position of the movable mirror 22 that resonates is different between the period T1 in which the movable mirror 22 moves in one direction of the reciprocation directions and the period T2 in which the movable mirror 22 moves in the other direction of the reciprocation directions, but according to the optical module 1A, the intensity of the interference light L1 of the measurement light and the intensity of the interference light L11 of the laser light can be acquired as an average value of P cycles separately for the period T1 and the period T2. When acquiring the intensity of the interference light L1 of the measurement light and the intensity of the interference light L11 of the laser light as the average value of the P cycles, a noise level becomes $1/(P^{1/2})$ times, and SNR can be improved.

In addition, in the case of causing the movable mirror 22 to resonate, power consumption in the mirror device 20 is suppressed to be low. Accordingly, the intensity of the interference light L1 of the measurement light and the intensity of the interference light L11 of the laser light can be acquired at a desired timing while causing the movable mirror 22 to resonate continuously. A period (that is, a numerical value of P in the P cycles) of acquiring the intensity of the interference light L1 of the measurement light and the intensity of the interference light L11 of the laser light can be set, for example, in the PC 500.

In addition, in the optical module 1A, in a case where the first intensity acquisition process is performed, the first storage region 301 of the storage unit 300 stores values obtained by integrating or averaging each of the first measurement light intensity and the first laser light intensity acquired in each of the odd-numbered cycles among the P cycles for every one cycle, and in a case where the second intensity acquisition process is performed, the second storage region 302 of the storage unit 300 stores values obtained by integrating or averaging each of the second measurement light intensity and the second laser light intensity acquired in each of the even-numbered cycles among the P cycles for every one cycle. According to this, the first intensity acquisition process and the second intensity acquisition process can be reliably performed while suppressing a storage capacity of the storage unit 300.

In addition, in the optical module 1A, the first time interval and the second time interval are the same time interval. According to this, the first intensity acquisition process and the second intensity acquisition process can be more easily performed.

In addition, in the PC 500, the first spectrum acquisition process and the second spectrum acquisition process are performed. According to this, the spectrum of the measurement light L0 can be easily and accurately acquired. That is, the Fourier transformation type spectral analysis relating to the measurement light L0 can be easily and accurately performed.

Modification Example

Figure 28:
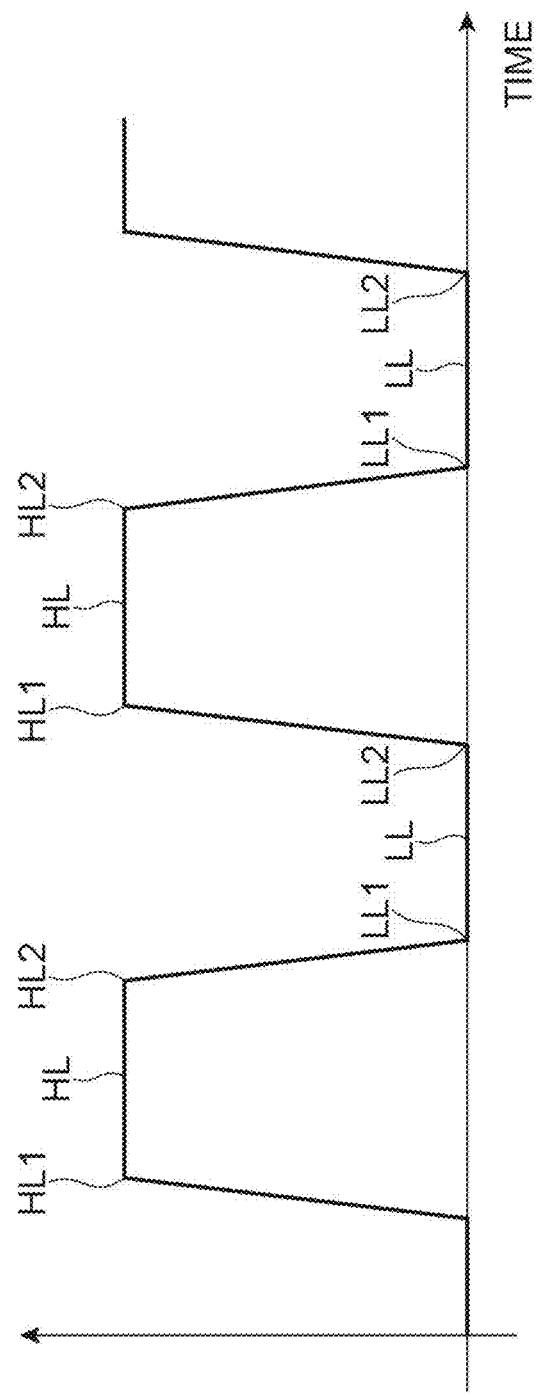
FIG. 28 is a graph illustrating a voltage signal of a modification example.

The present disclosure is not limited to the above-described embodiment. For example, a voltage signal that is applied to the mirror device 20 is not limited to the rectangular wave having a duty ratio of 0.5, and may be a signal in which a Low level and a High level are repeated alternately. As an example, as illustrated in FIG. 28, the voltage signal may be a signal in which rising and falling are inclined. In this case, a termination point LL2 of a Low level LL or an initiation point HL1 of a High level HL can be set as a rising timing. In addition, an initiation point LL1 of the Low level LL or a termination point HL2 of the High level HL can be set as a falling timing.

Figure 29:
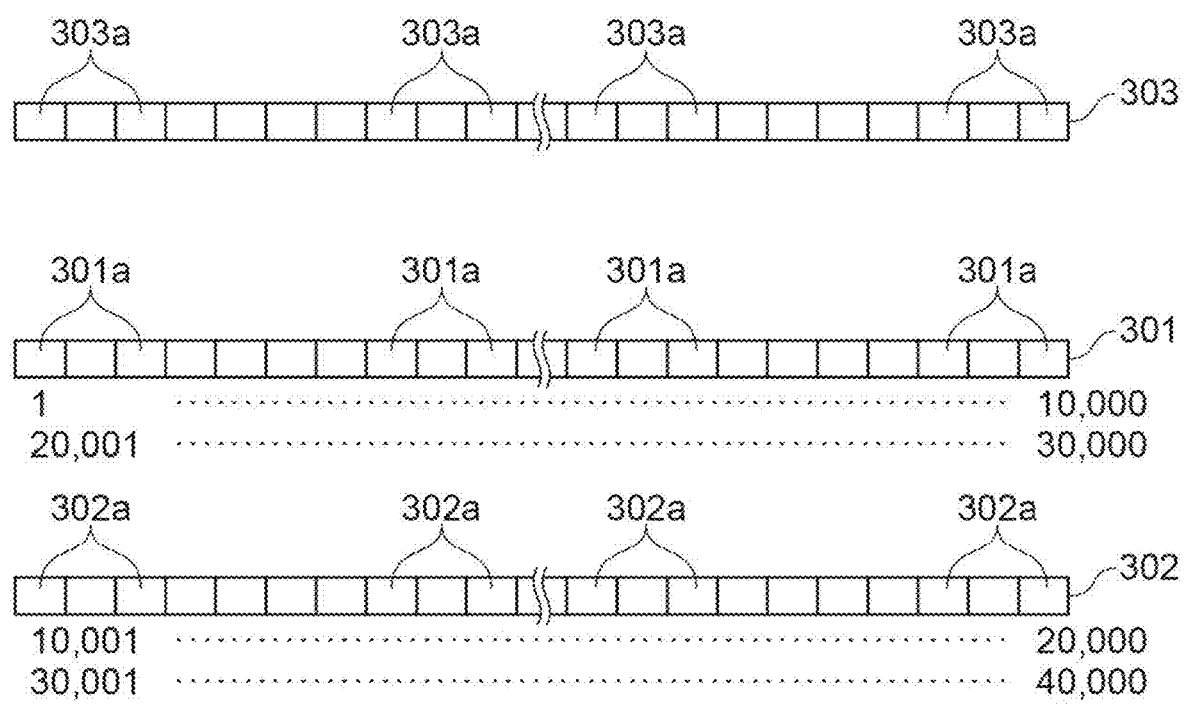
FIG. 29 is a block diagram illustrating a configuration of a storage unit of the modification example.

In addition, the storage unit 300 may further include a third storage region 303 as illustrated in FIG. 29. The third storage region 303 is a region that stores each of the first measurement light intensity and the first laser light intensity acquired in the latest one cycle among the P cycles until transmitting the first measurement light intensity and the first laser light intensity to the first storage region 301 in a case where the first intensity acquisition process is performed, and stores each of the second measurement light intensity and the second laser light intensity acquired in the latest one cycle among the P cycles until transmitting the second measurement light intensity and the second laser light intensity to the second storage region 302 in a case where the second intensity acquisition process is performed. According to this, it is possible to confirm whether or not each piece of intensity data is correct during temporarily storing each piece of intensity data in the third storage region 303.

Figure 30:
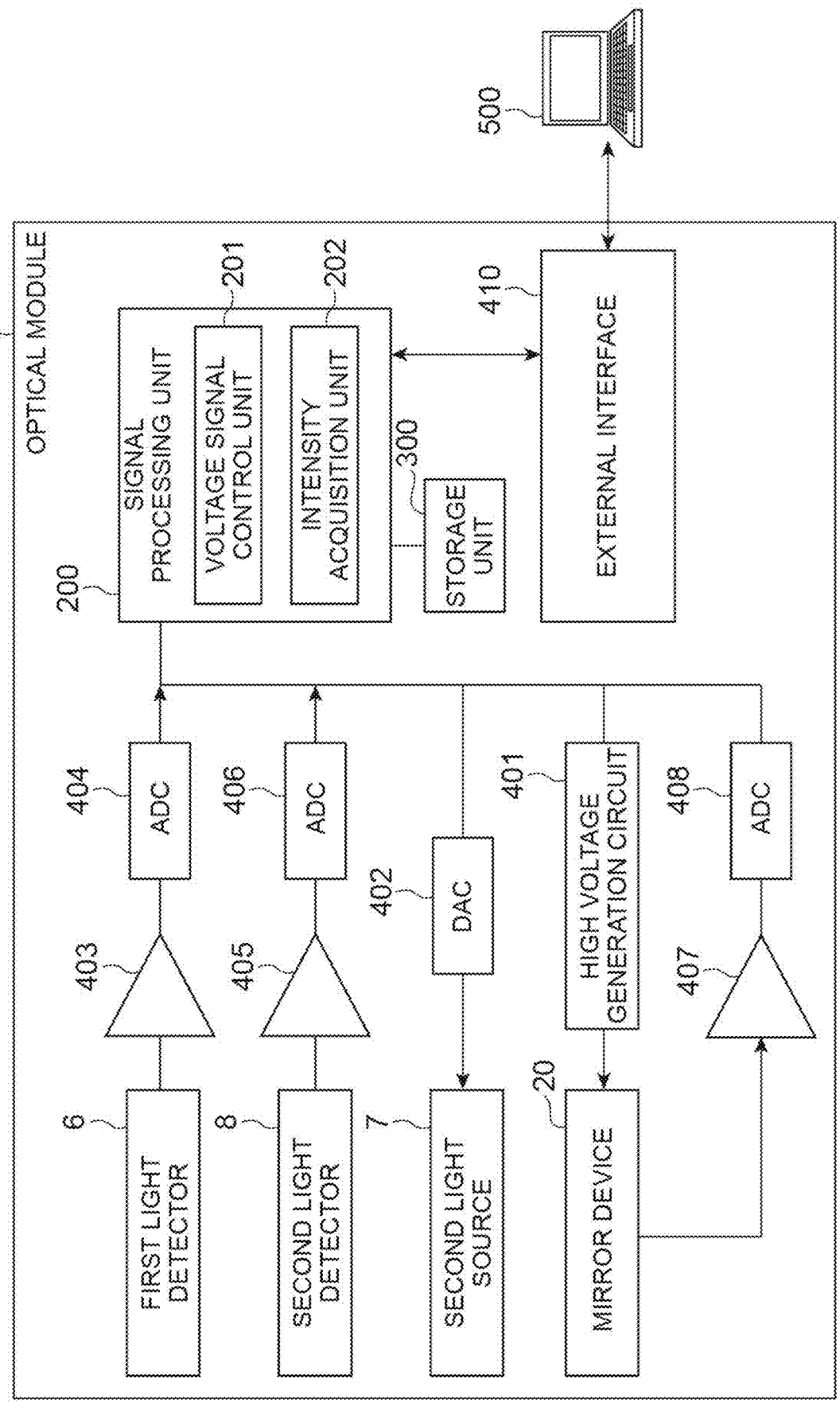
FIG. 30 is a block diagram illustrating a configuration of an optical module of the modification example.

In addition, the voltage signal control unit 201 may adjust the frequency of the voltage signal on the basis of a temporal variation of capacitance that occurs between the fixed comb electrode 281 and the movable comb electrode 282, and between the fixed comb electrode 283 and the movable comb electrode 284. As an example, as illustrated in FIG. 30, an analog signal representing capacitance is amplified by the amplifier 407, is converted into a digital signal by the ADC 408, and is input to the signal processing unit 200. According to this, for example, even though a resonance frequency of the movable mirror 22 varies due to a variation in a use environment, it is possible to adjust the frequency of the voltage signal to a value two times the resonance frequency of the movable mirror 22, and as a result, the first intensity acquisition process and the second intensity acquisition process can be more accurately performed.

Figure 31:
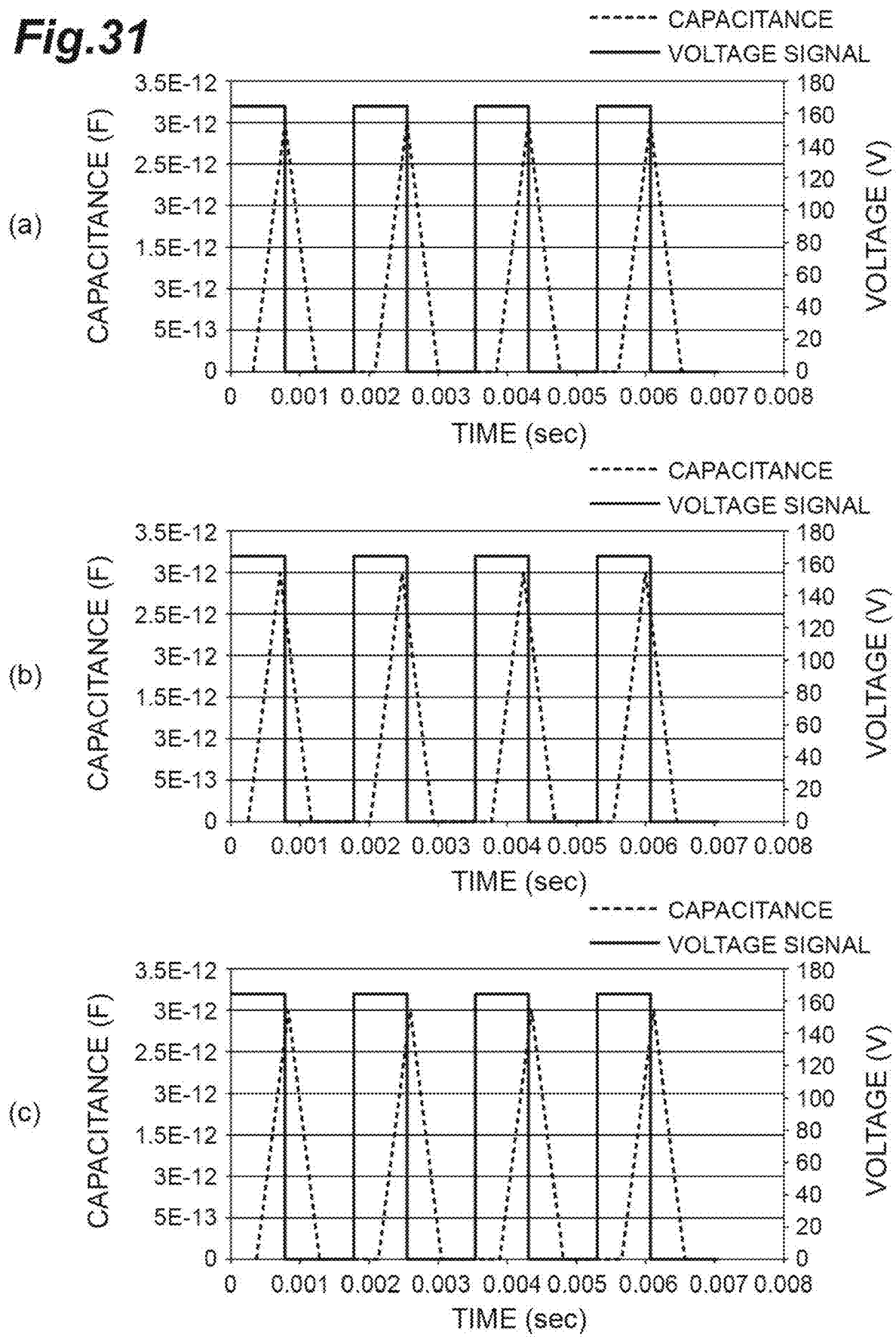
FIG. 31 is a graph illustrating a capacitance signal and a voltage signal.

As illustrated in (a) of FIG. 31, in a case where the voltage signal is a rectangular wave having a duty ratio of 0.5, a falling timing of the voltage signal matches a timing at which a peak value appears in a capacitance signal. The reason for this is that in a case where the voltage signal is the rectangular wave having a duty ratio of 0.5, the falling timing of the voltage signal matches a timing at which the movable mirror 22 is located at the central position C1 of the resonance operation (refer to FIG. 10) as illustrated in FIG. 14. As illustrated in (b) of FIG. 31, in a case where the falling timing of the voltage signal is later than a timing at which the peak value appears in the capacitance signal, the frequency of the voltage signal is raised so that the timings match each other. As illustrated in (c) of FIG. 31, the falling timing of the voltage signal is earlier than the timing at which the peak value appears in the capacitance signal, the frequency of the voltage signal is lowered so that the timings match each other.

As described above, when the frequency of the voltage signal is adjusted to be a value two times the resonance frequency of the movable mirror 22, effectiveness of the intensity data acquired in each of the period T1 in which the movable mirror 22 moves in one direction of the reciprocation directions and the period T2 in which the movable mirror 22 moves in the other direction of the reciprocation directions is improved, and as a result, resolution of the Fourier transformation type spectral analysis is improved. Note that, in a case where adjustment of the frequency of the voltage signal as described above is not performed, for example, in the first intensity acquisition process and the second intensity acquisition process, the intensity data acquired in both ends of each of the periods T1 and T2 may be ignored and only intensity data acquired in an intermediate portion of each of the periods T1 and T2 may be used on the assumption that the resonance frequency of the movable mirror 22 varies due to a variation in a use environment.

Figure 32:
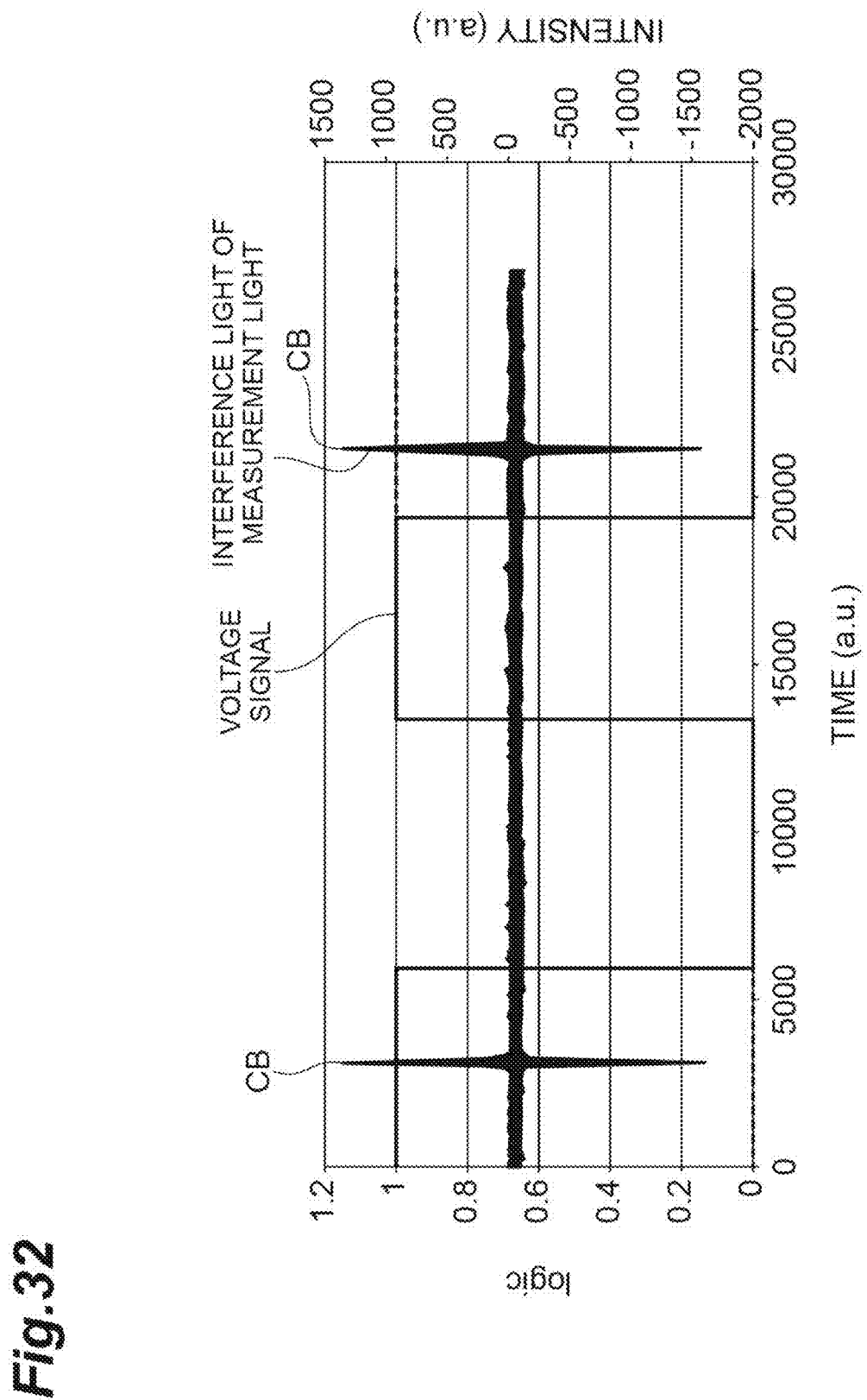
FIG. 32 is a graph illustrating the temporal variation of the intensity of the interference light of the measurement light and the voltage signal.

In addition, the intensity acquisition unit 202 may perform a process of acquiring an average value of a plurality of first measurement light intensities mutually corresponding for the same number of times in a first half (for example, ½ cycle in the first half) or a second half (for example, ½ cycle in the second half) in each of the odd-numbered cycles among the P cycles, and acquiring an average value of a plurality of first laser light intensities mutually corresponding for the same number of times as the first intensity acquisition process. Similarly, the intensity acquisition unit 202 may perform a process of acquiring an average value of a plurality of second measurement light intensities mutually corresponding for the same number of times in a first half (for example, ½ cycle in the first half) or a second half (for example, ½ cycle in the second half) in each of the even-numbered cycles among the P cycles, and acquiring an average value of a plurality of second laser light intensities mutually corresponding for the same number of times as the second intensity acquisition process. In the optical module 1A, since the zero optical path difference position C0 of the movable mirror 22 deviates from the central position C1 of the resonance operation of the movable mirror 22, as illustrated in FIG. 12, the center burst CB in the temporal variation of the intensity of the interference light L1 of the measurement light appears in the first half of the period T1 and the second half of the period T2. Here, as illustrated in FIG. 32, for example, when each cycle is divided into ½ cycle in the first half and ½ cycle in the second half with the falling timing of the voltage signal set as a reference, and the first intensity acquisition process and the second intensity acquisition process are performed by using the ½ cycle in which the center burst CB appears, resolution of each intensity data is lowered, and thus SNR can be improved.

Note that, it is possible to determine whether the center burst CB appears in either the first half or the second half in each of the odd-numbered cycles (that is, whether the first intensity acquisition process is to be performed by using the first measurement intensity of either the first half or the second half in each of the odd-numbered cycles), for example, on the basis of the magnitude of the first measurement intensity in the first half and the magnitude of the first measurement intensity in the second half. Similarly, it is possible to determine whether the center burst CB appears in either the first half or the second half in each of the even-numbered cycles (that is, whether the second intensity acquisition process is to be performed by using the second measurement intensity of either the first half or the second half in each of the even-numbered cycles), for example, on the basis of the magnitude of the second measurement intensity in the first half and the magnitude of the second measurement intensity in the second half.

Figure 33:
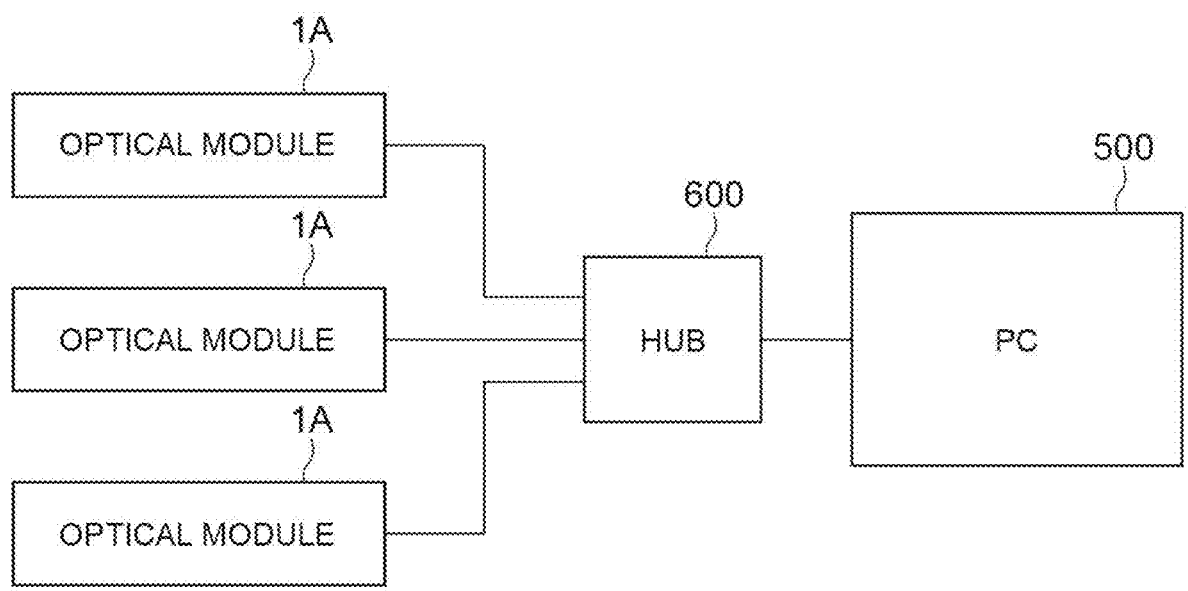
FIG. 33 is a block diagram illustrating a configuration of a system provided with the optical module illustrated in FIG. 1.

In addition, as illustrated in FIG. 33, a plurality of the optical modules 1A may be electrically connected to the PC 500 through a hub 600. As described above, the optical module 1A can perform the Fourier transformation type spectral analysis in a short time. Accordingly, for example, the optical module 1A can be prepared for every line through which a measurement target is conveyed, and the Fourier transformation type spectral analysis can be performed at a desired timing while switching the optical modules 1A with a signal output from the PC 500 set as a trigger.

Figure 34:
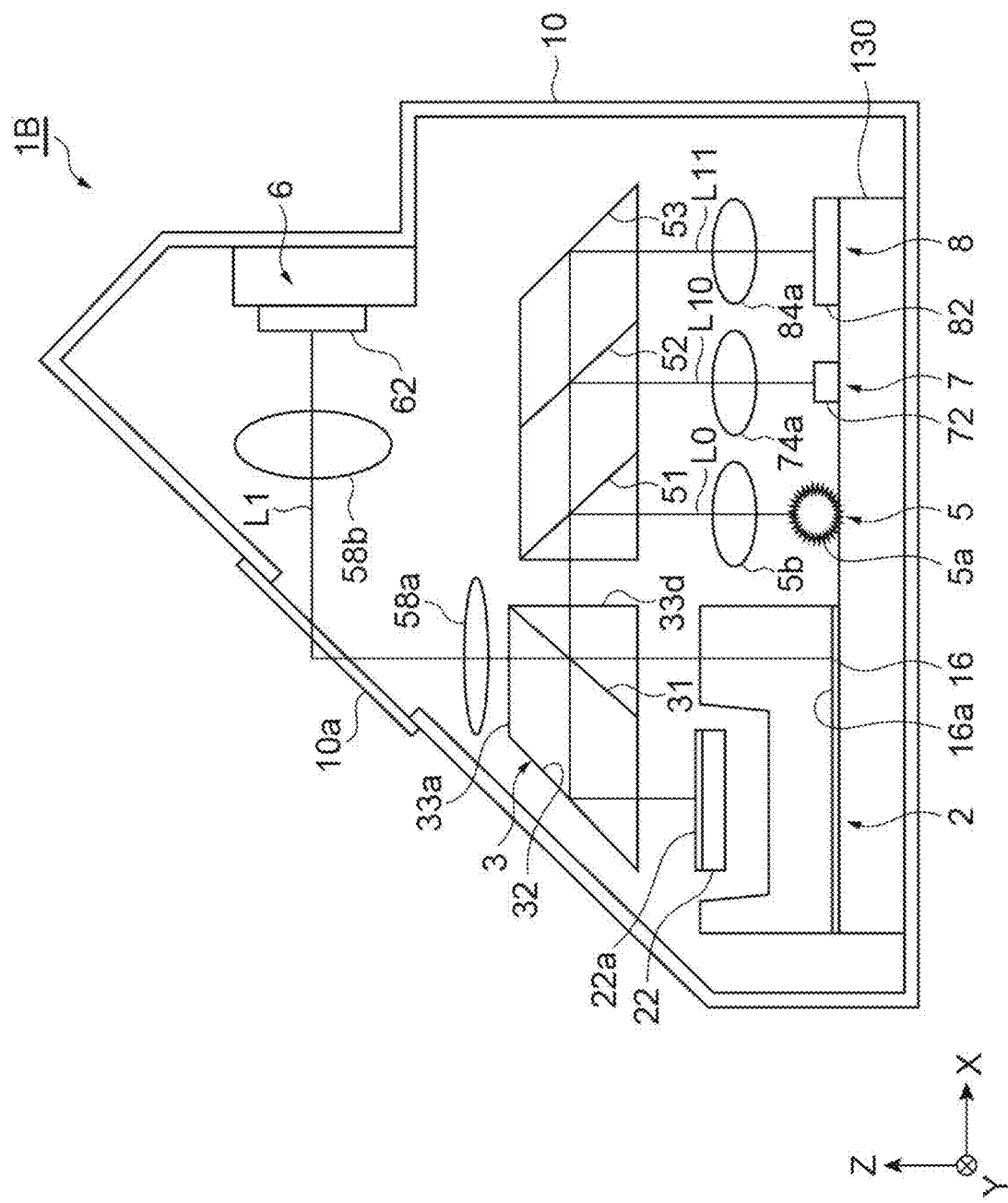
FIG. 34 is a cross-sectional view of the optical module of the modification example.

In addition, as illustrated in FIG. 34, the signal processing unit 200 may be applied to an optical module 1B that includes a first light source 5 that emits the measurement light L0 incident to the beam splitter unit 3, and a first light detector 6 that detects interference light L1 of the measurement light which is emitted from the beam splitter unit 3 and is incident through the measurement target.

In the optical module 1B, the holding unit 130 holds the first light source 5, the second light source 7, and the second light detector 8 so that the first light source 5, the second light source 7, and the second light detector 8 face one side in the Z-axis direction on one side of the mirror unit 2 in the X-axis direction, and are aligned in the order of the first light source 5, the second light source 7, and the second light detector 8 from the other side (that is, the mirror unit 2 side) in the X-axis direction. The first light source 5 includes a light-emitting element 5a and a condensing lens 5b. For example, the light-emitting element 5a is a thermal type light source such as a filament. The condensing lens 5b condenses the measurement light L0.

The holding unit 130 holds the first mirror 51, the second mirror 52, and the third mirror 53 in addition to the first light source 5, the second light source 7, and the second light detector 8. The first mirror 51, the second mirror 52, and the third mirror 53 are constituted by a plurality of optical blocks joined to each other.

The first mirror 51 is a dichroic mirror that has a function of reflecting the measurement light L0 and allowing the laser light L10 to be transmitted therethrough and is inclined with respect to an optical axis of the first light source 5. The first mirror 51 is disposed to overlap the beam splitter unit 3 when viewed from the X-axis direction, and to overlap the first light source 5 when viewed from the Z-axis direction. That is, the first mirror 51 is disposed to face the beam splitter unit 3 and the first light source 5. In this example, an optical surface of the first mirror 51 is a surface that is parallel to the Y-axis direction and has an angle of 45° with respect to the Z-axis direction. Note that, the optical axis of the first light source 5 is parallel to the Z-axis direction.

The second mirror 52 is a mirror that has a function of reflecting a part of the laser light L10 and allowing the remainder of the laser light L10 to be transmitted therethrough and is parallel to the first mirror 51. The second mirror 52 is disposed to overlap the first mirror 51 when viewed from the X-axis direction and to overlap the second light source 7 when viewed from the Z-axis direction. That is, the second mirror 52 is disposed to face the first mirror 51 and the second light source 7. In this example, an optical surface of the second mirror 52 is a surface that is parallel to the Y-axis direction and has an angle of 45° with respect to the Z-axis direction.

The third mirror 53 is a mirror that has a function of reflecting the laser light L10 and is parallel to the second mirror 52. The third mirror 53 is disposed to overlap the second mirror 52 when viewed from the X-axis direction and to overlap the second light detector 8 when viewed from the Z-axis direction. That is, the third mirror 53 is disposed to face the second mirror 52 and the second light detector 8. In this example, an optical surface of the third mirror 53 is a surface that is parallel to the Y-axis direction and has an angle of 45° with respect to the Z-axis direction.

In the optical module 1B, the measurement light L0 which is emitted from the first light source 5 along the Z-axis direction is reflected by the first mirror 51, and is incident to an optical surface 33d of the beam splitter unit 3 along the X-axis direction. Interference light L1 of the measurement light which is emitted from an optical surface 33a of the beam splitter unit 3 along the Z-axis direction is emitted to the outside of a housing 10 through a window 10a provided in the housing 10 while being condensed by a condensing lens 58a, and is emitted to a measurement target (not illustrated). The interference light L1 of the measurement light which is reflected by the measurement target is incident into the housing 10 through the window 10a and is condensed by a condensing lens 58b. The condensed interference light L1 of the measurement light is incident to the first light detector 6 along the X-axis direction, and is detected by the first light detector 6.

On the other hand, the laser light L10 emitted from the second light source 7 is reflected by the second mirror 52, is transmitted through the first mirror 51, and is incident to the optical surface 33d of the beam splitter unit 3 along the X-axis direction. Interference light L11 of the laser light which is emitted from the optical surface 33d of the beam splitter unit 3 along the X-axis direction is transmitted through the first mirror 51 and the second mirror 52, is reflected by the third mirror 53, is incident to the second light detector 8, and is detected by the second light detector 8.

In the optical module 1B configured as described above, the same signal processing as in the optical module 1A is performed. Accordingly, the optical module 1B can perform the Fourier transformation type spectral analysis in a short time.

Figure 35:
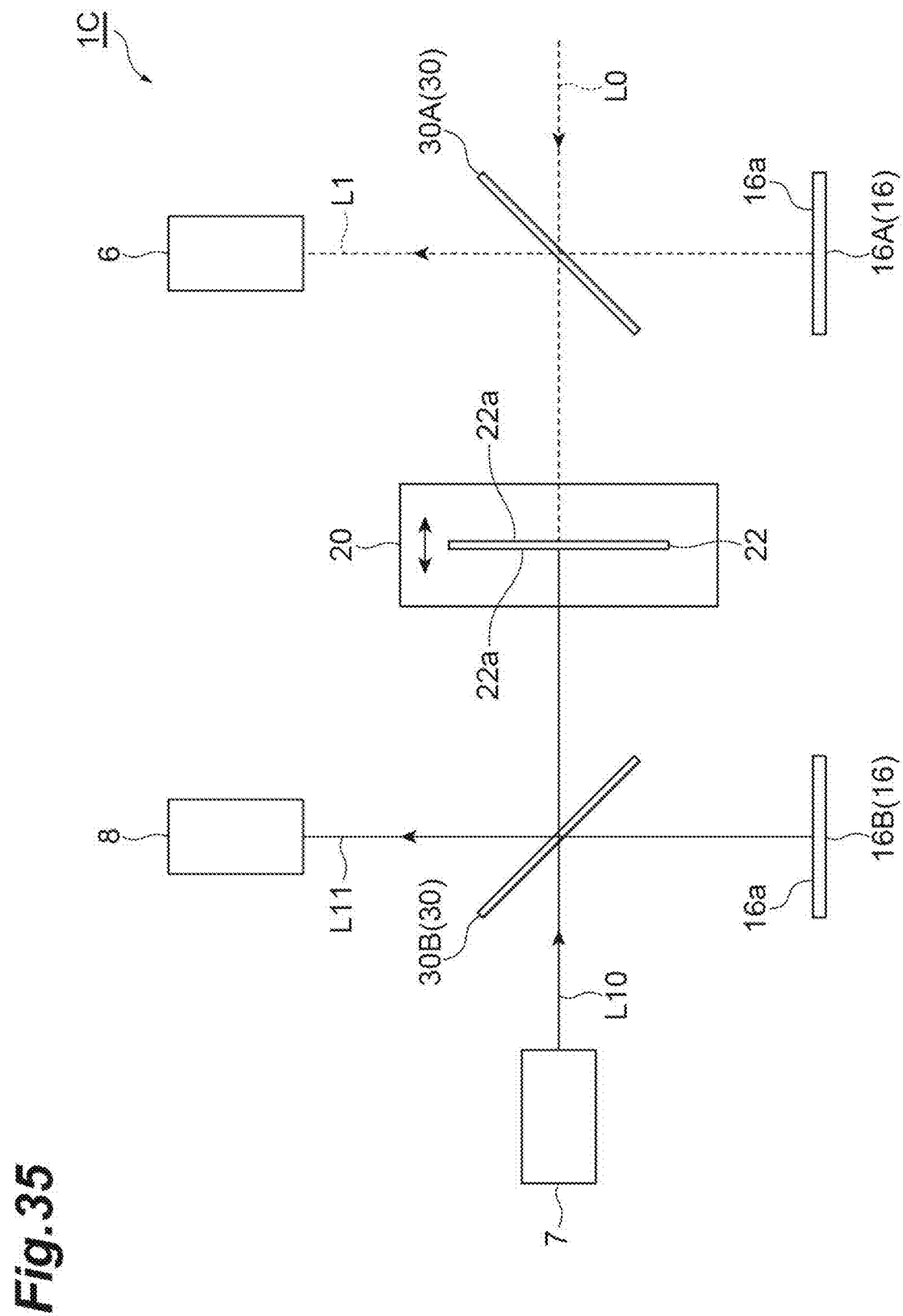
FIG. 35 is a configuration diagram of an interference optical system of the modification example.

In addition, as illustrated in FIG. 35, an interference optical system for measurement light L0 and an interference optical system for laser light L10 may be configured separately. An optical module 1C illustrated in FIG. 35 includes one movable mirror 22, a pair of fixed mirrors 16, and a pair of beam splitters 30. In the mirror device 20, a mirror surface 22a is provided in the movable mirror 22 on both sides. A beam splitter 30A for the measurement light L0 is disposed to face the mirror surface 22a on one side and a mirror surface 16a of a fixed mirror 16A for the measurement light L0. A beam splitter 30B for the laser light L10 is disposed to face the mirror surface 22a on the other side and the mirror surface 16a of a fixed mirror 16B for the laser light L10.

In the optical module 1C, interference light L1 of the measurement light is detected as follows. That is, when the measurement light L0 is incident to the beam splitter 30A, the measurement light L0 is divided into a part and the remainder in the beam splitter 30A. Then, the part of the measurement light L0 is reflected by the mirror surface 22a on the one side in the movable mirror 22 that reciprocates and returns to the beam splitter 30A. On the other hand, the remainder of the measurement light L0 is reflected by the mirror surface 16a of the fixed mirror 16A and returns to the beam splitter 30A. The part and the remainder of the measurement light L0 which return to the beam splitter 30A are emitted from the beam splitter 30A as interference light L1, and the interference light L1 of the measurement light is detected by the first light detector 6.

Note that, the interference optical system for the measurement light L0 may be configured so that the measurement light L0 emitted from a first light source (not illustrated) is incident to the beam splitter 30A through a measurement target (not illustrated), or may be configured so that the measurement light L0 emitted from the measurement target is incident to the beam splitter 30A. Alternatively, the interference optical system for the measurement light L0 may be configured so that the measurement light L0 emitted from the first light source is incident to the beam splitter 30A without through the measurement target, and the interference light L1 of the measurement light which is emitted from the beam splitter 30A is incident to the first light detector 6 through the measurement target.

In addition, in the optical module 1C, interference light L11 of the laser light is detected as follows. That is, when the laser light L10 emitted from the second light source 7 is incident to the beam splitter 30B, the laser light L10 is divided into a part and the remainder in the beam splitter 30B. Then, the part of the laser light L10 is reflected by the mirror surface 22a on the other side in the movable mirror 22 that reciprocates and returns to the beam splitter 30B. On the other hand, the remainder of the laser light L10 is reflected by the mirror surface 16a of the fixed mirror 16B and returns to the beam splitter 30B. The part and the remainder of the laser light L10 which return to the beam splitter 30B are emitted from the beam splitter 30B as interference light L11, and the interference light L11 of the laser light is detected by the second light detector 8.

As described above, the interference optical system configured in the optical module of the present disclosure may include the movable mirror 22, at least one piece of the fixed mirror 16, and at least one piece of the beam splitter 30.

Figure 36:
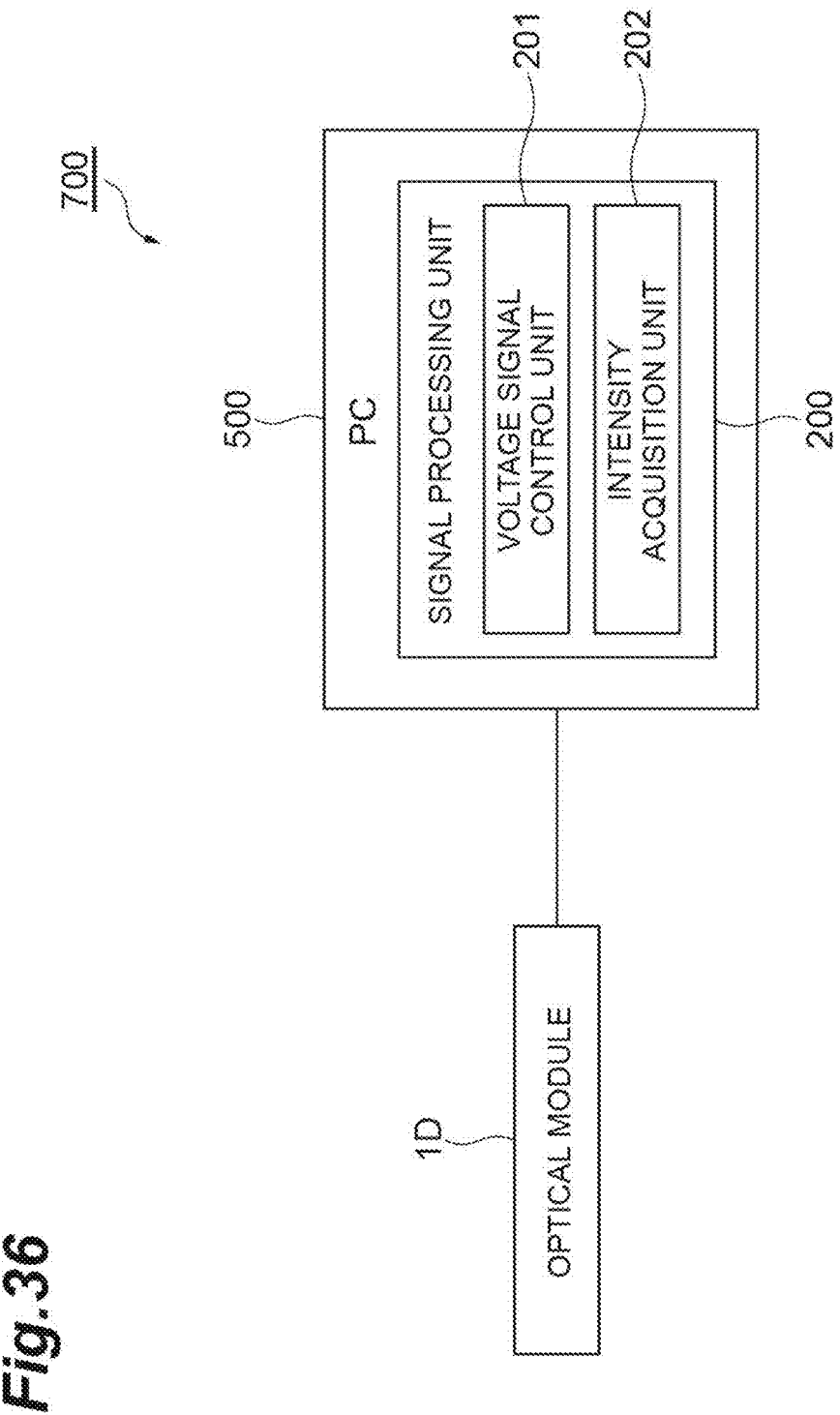
FIG. 36 is a configuration diagram of a signal processing system of the embodiment.

In addition, as illustrated in FIG. 36, the PC (signal processing device) 500 may include the signal processing unit 200. In an example illustrated in FIG. 36, a signal processing system 700 is constituted by an optical module 1D, and the PC 500 that is electrically connected to the optical module 1D. The optical module 1D is different from the optical module 1A in that the signal processing unit 200 is not provided. However, as the interference optical system configured in the optical module 1D, an interference optical system (for example, the interference optical system configured in the optical modules 1A, 1B, and 1C, or the like) including the movable mirror 22, at least one piece of the fixed mirror 16, and at least one piece of the beam splitter 30 is applicable. The signal processing unit 200 of the PC 500 is configured as a computer device including a processor, a memory, a storage, a communication device, and the like. In the signal processing unit 200 of the PC 500, the functions of the voltage signal control unit 201 and the intensity acquisition unit 202 are realized when the processor executes predetermined software (program) read into the memory or the like, and controls reading-out and writing of data in the memory and the storage, and communication between control devices by the communication device. According to this, even in the signal processing system 700, similar signal processing as in the optical module 1A is carried out. Therefore, according to the signal processing system 700, the Fourier transformation type spectral analysis can be performed in a short time. Note that, also the signal processing unit 200 provided in the optical modules 1A, 1B, and 1C may be configured by software without limitation to the hardware configuration.

In addition, in the mirror device 20, the movable comb electrode 282 may be provided in at least one of the movable mirror 22 and the first elastic support portion 26, and the movable comb electrode 284 may be provided in at least one of the movable mirror 22 and the second elastic support portion 27.

In addition, the intensity acquisition unit 202 may perform at least one of the first intensity acquisition process and the second intensity acquisition process. In a case where the intensity acquisition unit 202 performs the first intensity acquisition process, the storage unit 300 may include the first storage region 301, and in a case where the intensity acquisition unit 202 performs the second intensity acquisition process, the storage unit 300 may include the second storage region 302. In addition, in a case where the intensity acquisition unit 202 performs the first intensity acquisition process, the PC 500 may perform the first spectrum acquisition process, and in a case where the intensity acquisition unit 202 performs the second intensity acquisition process, the PC 500 may perform the second spectrum acquisition process. In addition, the first time interval and the second time interval may not be the same time interval.

In addition, the intensity acquisition unit 202 of the signal processing unit 200 may perform an intensity acquisition process of acquiring a measurement light intensity of the interference light L1 of the measurement light M times (M is an integer of two or greater) at the first time interval based on a frequency in each of a plurality of cycles among P cycles (P is an integer of two or greater) continuous in the voltage signal, acquiring an average value of a plurality of the measurement light intensities mutually corresponding for the same number of times, acquiring a laser light intensity of the interference light L11 of the laser light N times (N is an integer of two or greater) at the second time interval based on the frequency in each of the plurality of cycles, and acquiring an average value of a plurality of the laser light intensities mutually corresponding for the same number of times. Even in this case, when acquiring the measurement light intensity of the interference light L1 of the measurement light M times at the first time interval based on the frequency of the voltage signal in each of a plurality of cycles among P cycles continuous in the voltage signal, and acquiring the average value of the plurality of measurement light intensities mutually corresponding for the same number of times, the average value of the measurement light intensities can be easily and accurately acquired for every same position in a case where the movable mirror 22 moves. Similarly, when acquiring the laser light intensity of the interference light L11 of the laser light N times at the second time interval based on the frequency of the voltage signal in each of the plurality of cycles, and acquiring the average value of the plurality of laser light intensities mutually corresponding for the same number of times, the average value of the laser light intensities can be easily and accurately acquired for every same position in a case where the movable mirror 22 moves.

In a case where the intensity acquisition unit 202 of the signal processing unit 200 performs the intensity acquisition process of acquiring the average value of the plurality of measurement light intensities mutually corresponding for the same number of times in each of the plurality of cycles, and acquiring the average value of the plurality of laser light intensities mutually corresponding for the same number of times in each of the plurality of cycles, for example, the PC 500 may perform the spectrum acquisition process. The spectrum acquisition process is a process of acquiring an intensity value at a timing at which at least one of a maximum value and a minimum value appears in a temporal variation of the average value of the laser light intensity from a temporal variation of the average value of the measurement light intensity, acquiring a relationship between the optical path difference and the intensity value on the basis of the wavelength of the laser light L10, and acquiring a spectrum of the measurement light L0 by the Fourier transformation. According to this, the Fourier transformation type spectral analysis can be performed in a short time.

In addition, even in any of the above-described embodiments, the intensity acquisition unit 202 of the signal processing unit 200 acquires the average value of the measurement light intensities (including the first measurement light intensity and the second measurement light intensity) mutually corresponding for the same number of times in each of the plurality of cycles, and acquires the average value of the laser light intensities (including the first laser light intensity and the second laser light intensity) mutually corresponding for the same number of times in each of the plurality of cycles, but an integration value may be acquired in substitution for the average value. That is, the intensity acquisition unit 202 of the signal processing unit 200 may acquire an integration value of the measurement light intensities (including the first measurement light intensity and the second measurement light intensity) mutually corresponding for the same number of times in each of the plurality of cycles, and may acquire an integration value of the laser light intensities (including the first laser light intensity and the second laser light intensity) mutually corresponding for the same number of times in each of the plurality of cycles. In this manner, the intensity acquisition unit 202 of the signal processing unit 200 may acquire an addition value of the measurement light intensities (including the first measurement light intensity and the second measurement light intensity) mutually corresponding for the same number of times in each of the plurality of cycles, and may acquire an addition value of the laser light intensities (including the first laser light intensity and the second laser light intensity) mutually corresponding for the same number of times in each of the plurality of cycles. The addition value is a value corresponding to the integration value or the average value. In this case, as the spectrum acquisition process, a process of acquiring an intensity value at a timing at which at least one of a maximum value and a minimum value appears in a temporal variation of the addition value of the laser light intensity from a temporal variation of the addition value of the measurement light intensity, acquiring a relationship between the optical path difference and the intensity value on the basis of the wavelength of the laser light L10, and acquiring the spectrum of the measurement light L0 by the Fourier transformation is performed.

REFERENCE SIGNS LIST 1A, 1B, 1C, 1D: optical module, 4: light incident unit, 5: first light source. 6: first light detector, 7: second light source, 8: second light detector, 16: fixed mirror, 16a: mirror surface, 20: mirror device, 21: base, 22: movable mirror, 22a: mirror surface, 26: first elastic support portion (elastic support portion), 27: second elastic support portion (elastic support portion), 281, 283: fixed comb electrode (first comb electrode), 281a, 283a: fixed comb fingers (first comb fingers), 282, 284: movable comb electrode (second comb electrode), 282a, 284a: movable comb fingers (second comb fingers), 30: beam splitter, 31: first mirror surface (beam splitter), 200: signal processing unit, 201: voltage signal control unit, 202: intensity acquisition unit, 300: storage unit, 301: first storage region, 302: second storage region, 303: third storage region, 500: PC (signal processing device), 700: signal processing system, L0: measurement light, L1: interference light of measurement light, L10: laser light, L11: interference light of laser light.

The invention claimed is:

1. An optical module comprising:
a mirror device that includes a base, a movable mirror including a mirror surface, an elastic support portion that is connected between the base and the movable mirror and supports the movable mirror so that the movable mirror is movable along a direction intersecting the mirror surface, a first comb electrode that is provided in the base and includes a plurality of first comb fingers, and a second comb electrode that is provided in at least one of the movable mirror and the elastic support portion and includes a plurality of second comb fingers arranged alternately with the plurality of first comb fingers;
at least one fixed mirror;
at least one beam splitter that constitutes an interference optical system in combination with the movable mirror and the at least one fixed mirror;
a first light detector that detects interference light of measurement light emitted from the interference optical system;
a second light detector that detects interference light of laser light emitted from the interference optical system; and
a processor that is electrically connected to each of the mirror device, the first light detector, and the second light detector,
wherein the processor is configured to,
control a voltage signal having a frequency for causing the movable mirror to resonate in the mirror device, so that the voltage signal is applied between the first comb electrode and the second comb electrode, and
perform an intensity acquisition process of acquiring a measurement light intensity of the interference light of the measurement light M times (M is an integer of two or greater) at a first time interval based on the frequency in each of a plurality of cycles among P cycles (P is an integer of two or greater) continuous in the voltage signal, acquiring an addition value of a plurality of the measurement light intensities mutually corresponding for the same number of times, acquiring a laser light intensity of the interference light of the laser light N times (N is an integer of two or greater) at a second time interval based on the frequency in each of the plurality of cycles, and acquiring an addition value of a plurality of the laser light intensities mutually corresponding for the same number of times.

2. The optical module according to claim 1,
wherein the processer performs at least one of a first intensity acquisition process and a second intensity acquisition process as the intensity acquisition process,
the first intensity acquisition process is a process of acquiring a first measurement light intensity the M times at the first time interval in each of odd-numbered cycles among P cycles (P is an integer of four or greater) continuous in the voltage signal as the measurement light intensity, acquiring an addition value of a plurality of the first measurement light intensities mutually corresponding for the same number of times, acquiring a first laser light intensity the N times at the second time interval in each of the odd-numbered cycles as the laser light intensity, and acquiring an addition value of a plurality of the first laser light intensities mutually corresponding for the same number of times, and
the second intensity acquisition process is a process of acquiring a second measurement light intensity the M times at the first time interval in each of even-numbered cycles among the P cycles (P is an integer of four or greater) as the measurement light intensity, acquiring an addition value of a plurality of the second measurement light intensities mutually corresponding for the same number of times, acquiring a second laser light intensity the N times at the second time interval in each of the even-numbered cycles as the laser light intensity, and acquiring an addition value of a plurality of the second laser light intensities mutually corresponding for the same number of times.

3. The optical module according to claim 2, further comprising:
a storage that includes at least one of a first storage region and a second storage region,
wherein the first storage region is a region that stores values obtained by integrating or averaging each of the first measurement light intensity and the first laser light intensity acquired in each of the odd-numbered cycles for every one cycle in a case where the first intensity acquisition process is performed, and
the second storage region is a region that stores values obtained by integrating or averaging each of the second measurement light intensity and the second laser light intensity acquired in each of the even-numbered cycles for every one cycle in a case where the second intensity acquisition process is performed.

4. The optical module according to claim 3,
wherein the storage further includes a third storage region, and
the third storage region is a region that stores each of the first measurement light intensity and the first laser light intensity acquired in the latest one cycle among the P cycles (P is an integer of four or greater) until transmitting the first measurement light intensity and the first laser light intensity to the first storage region in a case where the first intensity acquisition process is performed, and stores each of the second measurement light intensity and the second laser light intensity acquired in the latest one cycle among the P cycles (P is an integer of four or greater) until transmitting the second measurement light intensity and the second laser light intensity to the second storage region in a case where the second intensity acquisition process is performed.

5. The optical module according to claim 2,
wherein a zero optical path difference position of the movable mirror, at which an optical path length on the movable mirror side with which the interference light of the measurement light is caused to occur becomes the same as an optical path length on the at least one fixed mirror side with which the interference light of the measurement light is caused to occur, deviates from a central position of the resonance operation of the movable mirror, and
the processor,
performs a process of acquiring the addition value of the plurality of first measurement light intensities mutually corresponding for the same number of times, and acquiring the addition value of the plurality of first laser light intensities mutually corresponding for the same number of times as the first intensity acquisition process in a first half or a second half in each of the odd-numbered cycles, and
performs a process of acquiring the addition value of the plurality of second measurement light intensities mutually corresponding for the same number of times, and acquiring the addition value of the plurality of second laser light intensities mutually corresponding for the same number of times as the second intensity acquisition process in a first half or a second half in each of the even-numbered cycles.

6. The optical module according to claim 1,
wherein the first time interval and the second time interval are the same time interval.

7. The optical module according to claim 1,
wherein the processer adjusts the frequency of the voltage signal on the basis of a temporal variation of capacitance which occurs between the first comb electrode and the second comb electrode.

8. A signal processing system comprising:
an optical module; and
a signal processing device that is electrically connected to the optical module,
wherein the optical module includes,
a mirror device that includes a base, a movable mirror including a mirror surface, an elastic support portion that is connected between the base and the movable mirror and supports the movable mirror so that the movable mirror is movable along a direction intersecting the mirror surface, a first comb electrode that is provided in the base and includes a plurality of first comb fingers, and a second comb electrode that is provided in at least one of the movable mirror and the elastic support portion and includes a plurality of second comb fingers arranged alternately with the plurality of first comb fingers,
at least one fixed mirror,
at least one beam splitter that constitutes an interference optical system in combination with the movable mirror and the at least one fixed mirror,
a first light detector that detects interference light of measurement light emitted from the interference optical system, and
a second light detector that detects interference light of laser light emitted from the interference optical system, and
the signal processing device includes a processer configured to,
control a voltage signal having a frequency for causing the movable mirror to resonate in the mirror device, so that the voltage signal is applied between the first comb electrode and the second comb electrode, and
perform an intensity acquisition process of acquiring a measurement light intensity of the interference light of the measurement light M times (M is an integer of two or greater) at a first time interval based on the frequency in each of a plurality of cycles among P cycles (P is an integer of two or greater) continuous in the voltage signal, acquiring an addition value of a plurality of the measurement light intensities mutually corresponding for the same number of times, acquiring a laser light intensity of the interference light of the laser light N times (N is an integer of two or greater) at a second time interval based on the frequency in each of the plurality of cycles, and acquiring an addition value of a plurality of the laser light intensities mutually corresponding for the same number of times.

9. A signal processing method that is carried out to detect interference light of measurement light emitted from an interference optical system and interference light of laser light emitted from the interference optical system, the interference optical system being constituted by a mirror device that includes a base, a movable mirror including a mirror surface, an elastic support portion that is connected between the base and the movable mirror and supports the movable mirror so that the movable mirror is movable along a direction intersecting the mirror surface, a first comb electrode that is provided in the base and includes a plurality of first comb fingers, and a second comb electrode that is provided in at least one of the movable mirror and the elastic support portion and includes a plurality of second comb fingers arranged alternately with the plurality of first comb fingers, at least one fixed mirror, and at least one beam splitter, the method comprising:
- a step of controlling a voltage signal having a frequency for causing the movable mirror to resonate in the mirror device, so that the voltage signal is applied between the first comb electrode and the second comb electrode; and
- a step of performing an intensity acquisition process of acquiring a measurement light intensity of the interference light of the measurement light M times (M is an integer of two or greater) at a first time interval based on the frequency in each of a plurality of cycles among P cycles (P is an integer of two or greater) continuous in the voltage signal, acquiring an addition value of a plurality of the measurement light intensities mutually corresponding for the same number of times, acquiring a laser light intensity of the interference light of the laser light N times (N is an integer of two or greater) at a second time interval based on the frequency in each of the plurality of cycles, and acquiring an addition value of a plurality of the laser light intensities mutually corresponding for the same number of times.

10. The signal processing method according to claim 9, wherein in the step of performing the intensity acquisition process, at least one of a first intensity acquisition process and a second intensity acquisition process is performed as the intensity acquisition process,
the first intensity acquisition process is a process of acquiring a first measurement light intensity the M times at the first time interval in each of odd-numbered cycles among P cycles (P is an integer of four or greater) continuous in the voltage signal as the measurement light intensity, acquiring an addition value of a plurality of the first measurement light intensities mutually corresponding for the same number of times, acquiring a first laser light intensity the N times at the second time interval in each of the odd-numbered cycles as the laser light intensity, and acquiring an addition value of a plurality of the first laser light intensities mutually corresponding for the same number of times, and
the second intensity acquisition process is a process of acquiring a second measurement light intensity the M times at the first time interval in each of even-numbered cycles among the P cycles (P is an integer of four or greater) as the measurement light intensity, acquiring an addition value of a plurality of the second measurement light intensities mutually corresponding for the same number of times, acquiring a second laser light intensity the N times at the second time interval in each of the even-numbered cycles as the laser light intensity, and acquiring an addition value of a plurality of the second laser light intensities mutually corresponding for the same number of times.

11. The signal processing method according to claim 10, wherein a zero optical path difference position of the movable mirror, at which an optical path length on the movable mirror side with which the interference light of the measurement light is caused to occur becomes the same as an optical path length on the at least one fixed mirror side with which the interference light of the measurement light is caused to occur, deviates from a central position of the resonance operation of the movable mirror, and
in the step of performing the intensity acquisition process,
a process of acquiring the addition value of the plurality of first measurement light intensities mutually corresponding for the same number of times, and acquiring the addition value of the plurality of first laser light intensities mutually corresponding for the same number of times is performed as the first intensity acquisition process in a first half or a second half in each of the odd-numbered cycles, and
a process of acquiring the addition value of the plurality of second measurement light intensities mutually corresponding for the same number of times, and acquiring the addition value of the plurality of second laser light intensities mutually corresponding for the same number of times is performed as the second intensity acquisition process in a first half or a second half in each of the even-numbered cycles.

12. The signal processing method according to claim 9, wherein the first time interval and the second time interval are the same time interval.

13. The signal processing method according to claim 9, wherein in the step of controlling the voltage signal, the frequency of the voltage signal is adjusted on the basis of a temporal variation of capacitance which occurs between the first comb electrode and the second comb electrode.

14. The signal processing method according to claim 9, further comprising:
a step of performing a spectrum acquisition process of acquiring an intensity value from a temporal variation of the addition value of the measurement light intensity at timing at which at least one of a maximum value and a minimum value appears in a temporal variation of the addition values of the laser light intensity, acquiring a relationship between an optical path difference and the intensity value on the basis of the wavelength of the laser light, and acquiring a spectrum of the measurement light by Fourier transformation.

* * * * *